Oct. 3, 1944.  A. H. DICKINSON  2,359,631
DIVIDING MACHINE
Filed April 15, 1941   24 Sheets-Sheet 1

INVENTOR.
A. H. Dickinson
BY
ATTORNEYS.

Oct. 3, 1944.  A. H. DICKINSON  2,359,631
DIVIDING MACHINE
Filed April 15, 1941  24 Sheets-Sheet 2
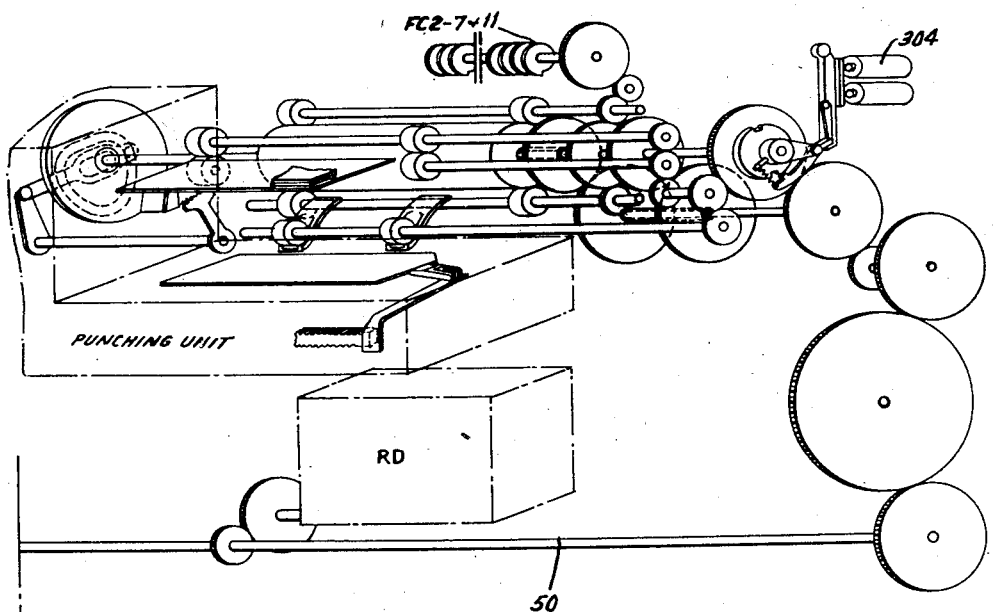
FIG.1a.
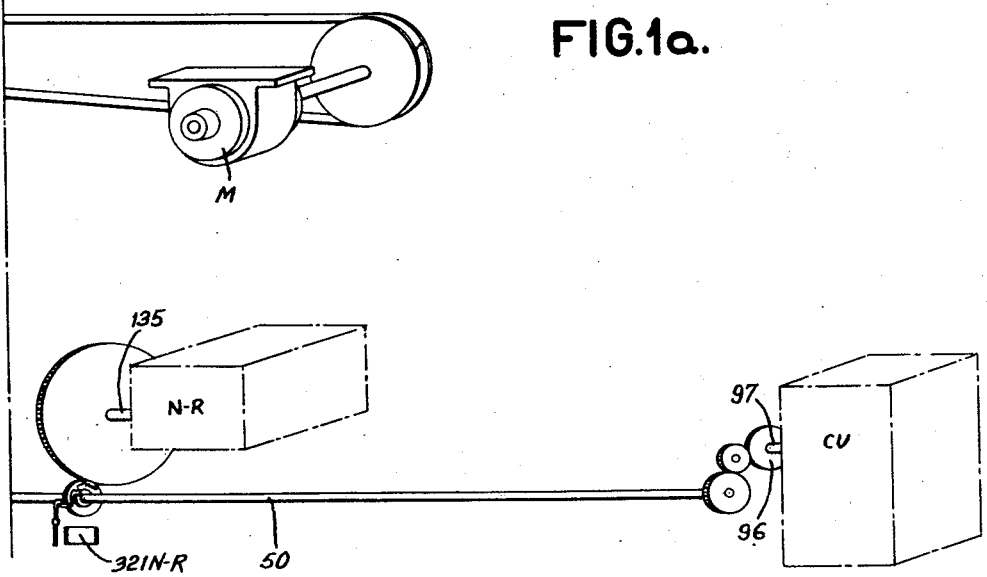
INVENTOR.
A. H. Dickinson
BY
W. M. Wilson
ATTORNEYS.

Oct. 3, 1944.    A. H. DICKINSON    2,359,631
DIVIDING MACHINE
Filed April 15, 1941    24 Sheets-Sheet 3

INVENTOR.
A. H. Dickinson
BY
W. M. Wilson
ATTORNEYS.

Oct. 3, 1944.   A. H. DICKINSON   2,359,631
DIVIDING MACHINE
Filed April 15, 1941   24 Sheets-Sheet 4

INVENTOR.
A. H. Dickinson
BY
ATTORNEYS.

Oct. 3, 1944. A. H. DICKINSON 2,359,631

DIVIDING MACHINE

Filed April 15, 1941 24 Sheets-Sheet 5

INVENTOR.
A. H. Dickinson
BY
W. M. Wilson
ATTORNEYS.

Oct. 3, 1944.　　　A. H. DICKINSON　　　2,359,631
DIVIDING MACHINE
Filed April 15, 1941　　24 Sheets-Sheet 6

Oct. 3, 1944.  A. H. DICKINSON  2,359,631
DIVIDING MACHINE
Filed April 15, 1941  24 Sheets-Sheet 7

INVENTOR.
A. H. Dickinson
BY
ATTORNEYS.

Oct. 3, 1944.  A. H. DICKINSON  2,359,631
DIVIDING MACHINE
Filed April 15, 1941  24 Sheets-Sheet 8

INVENTOR.
A. H. Dickinson
BY
W. M. Wilson
ATTORNEYS.

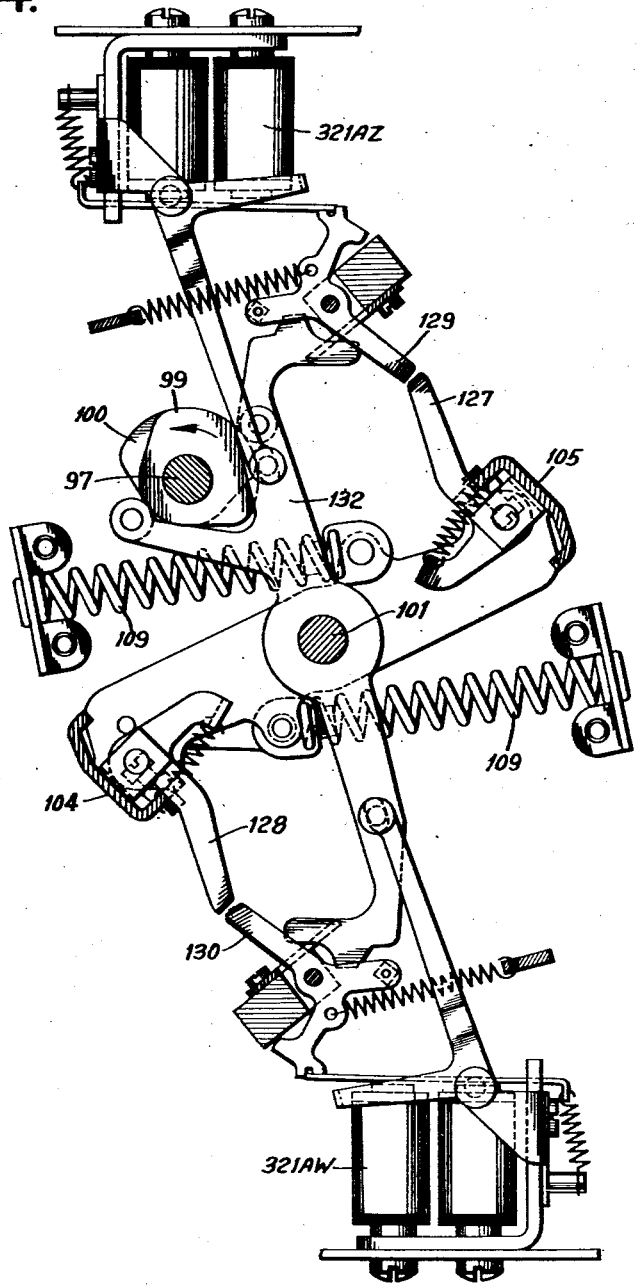

Oct. 3, 1944.  A. H. DICKINSON  2,359,631
DIVIDING MACHINE
Filed April 15, 1941  24 Sheets-Sheet 10

INVENTOR.
A. H. Dickinson
BY
ATTORNEYS.

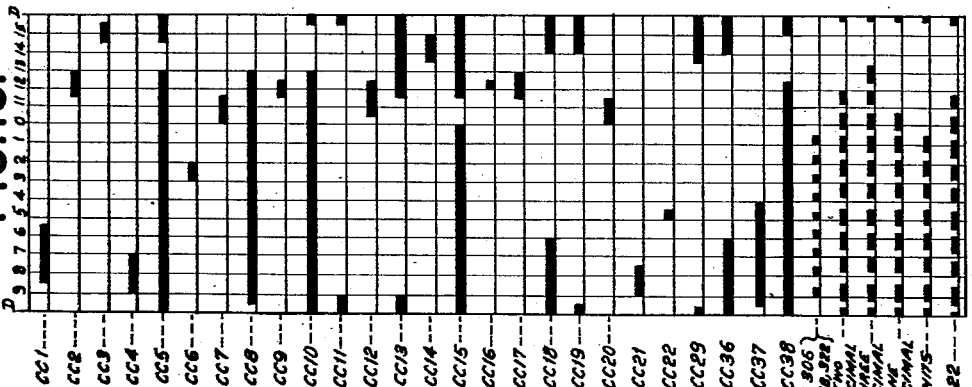
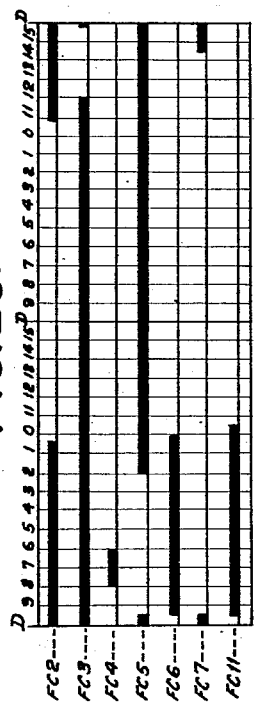
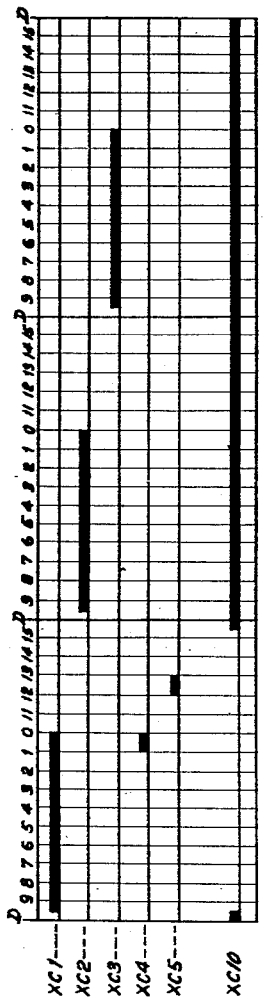

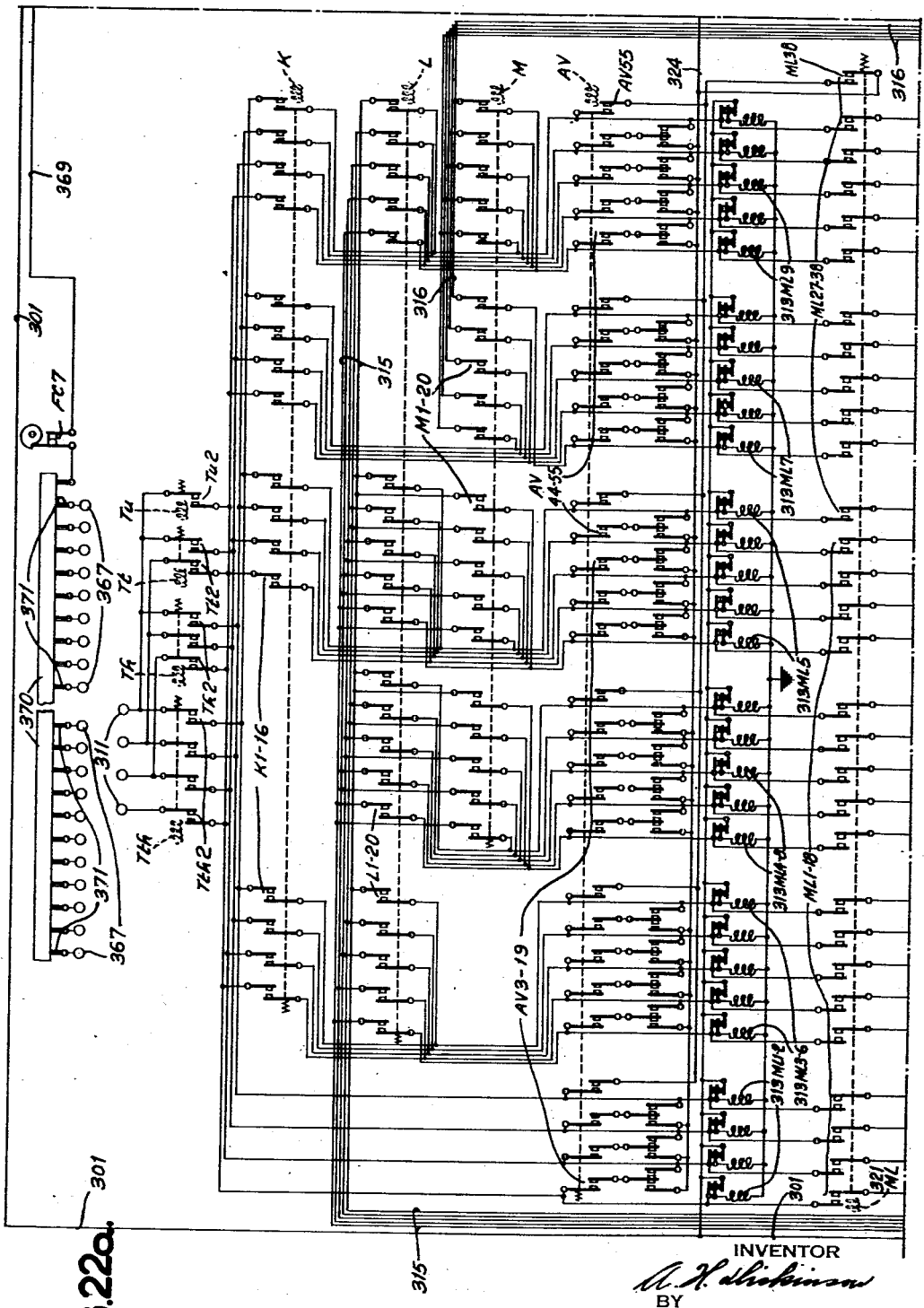

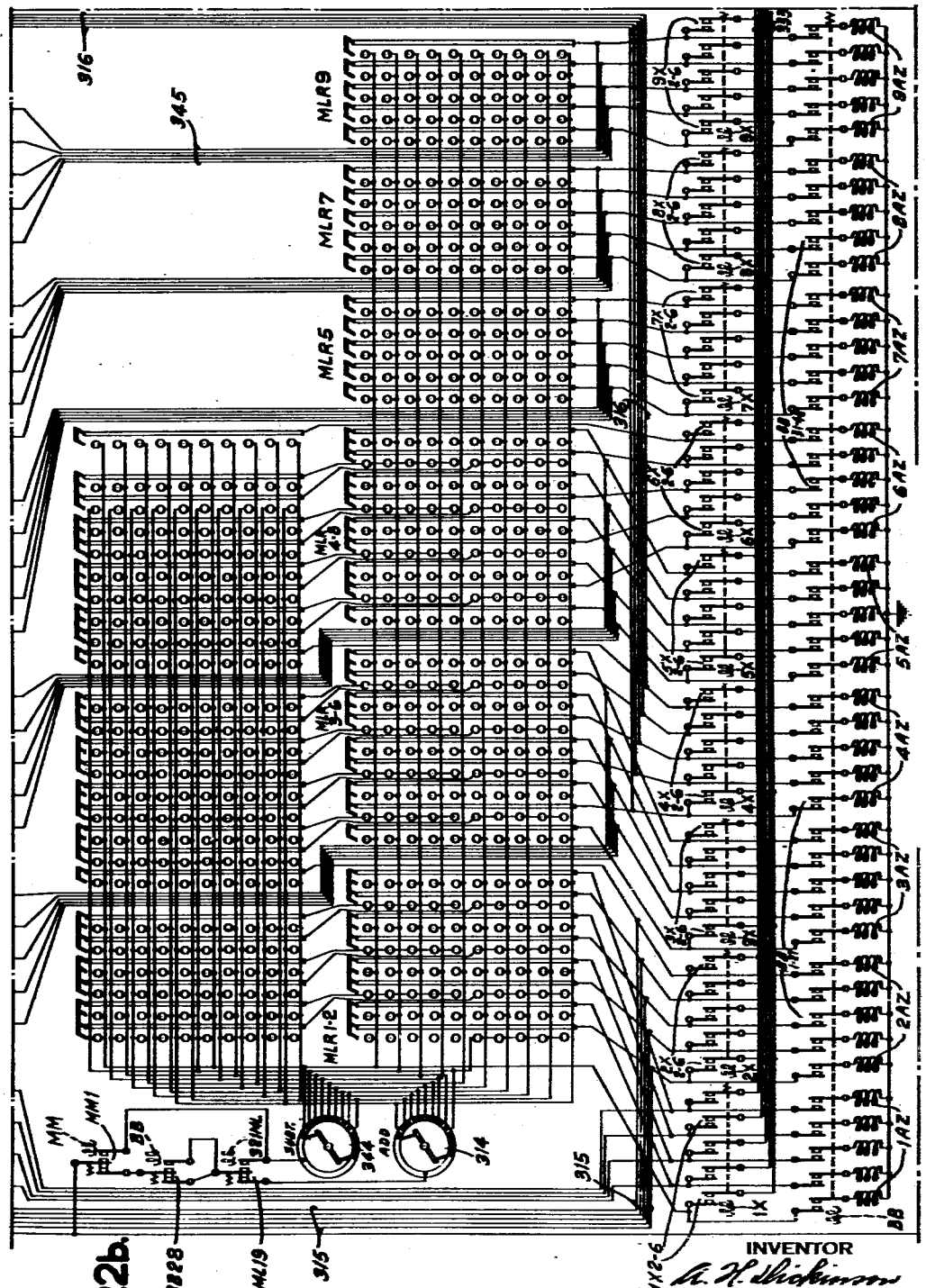

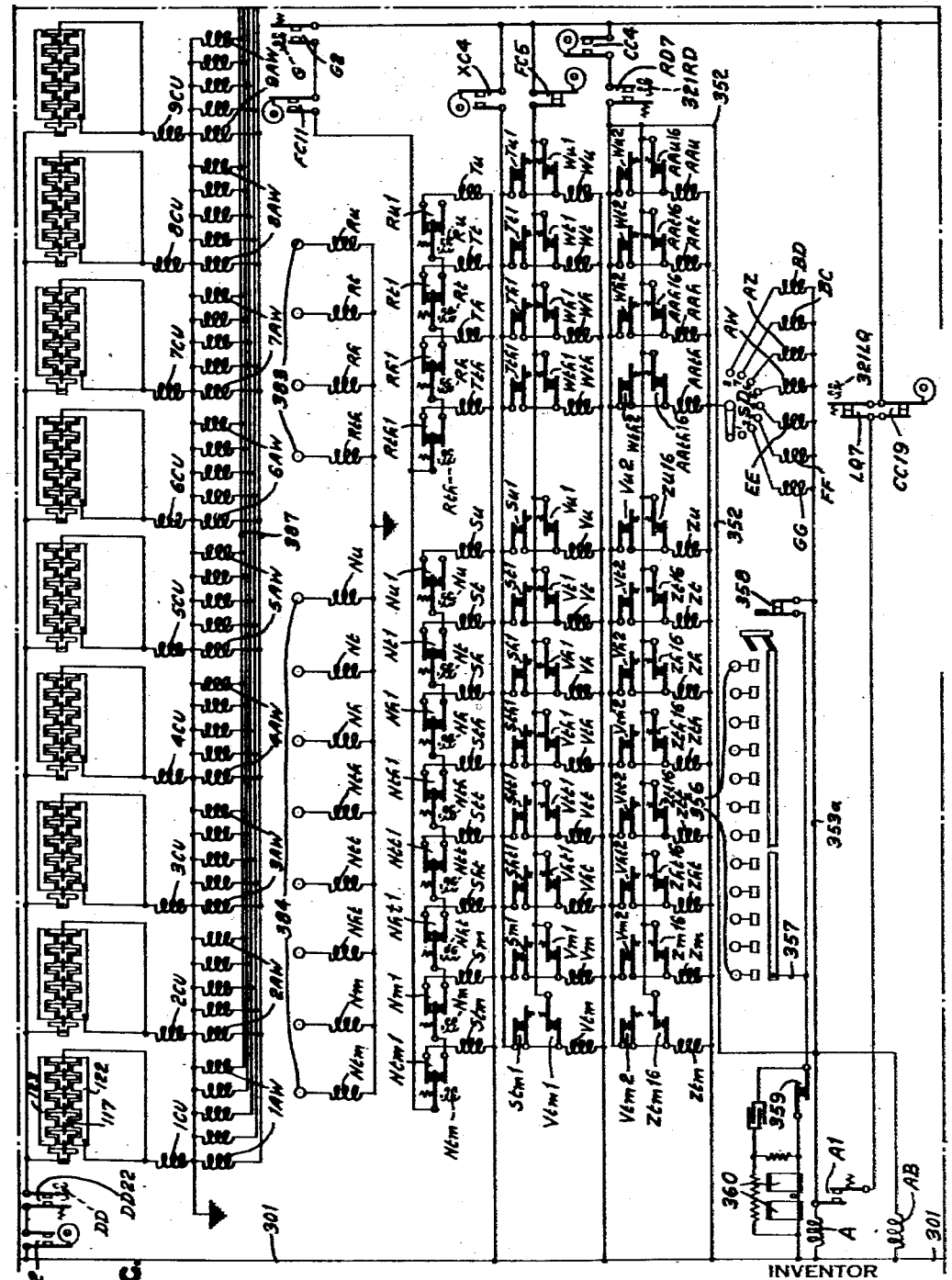

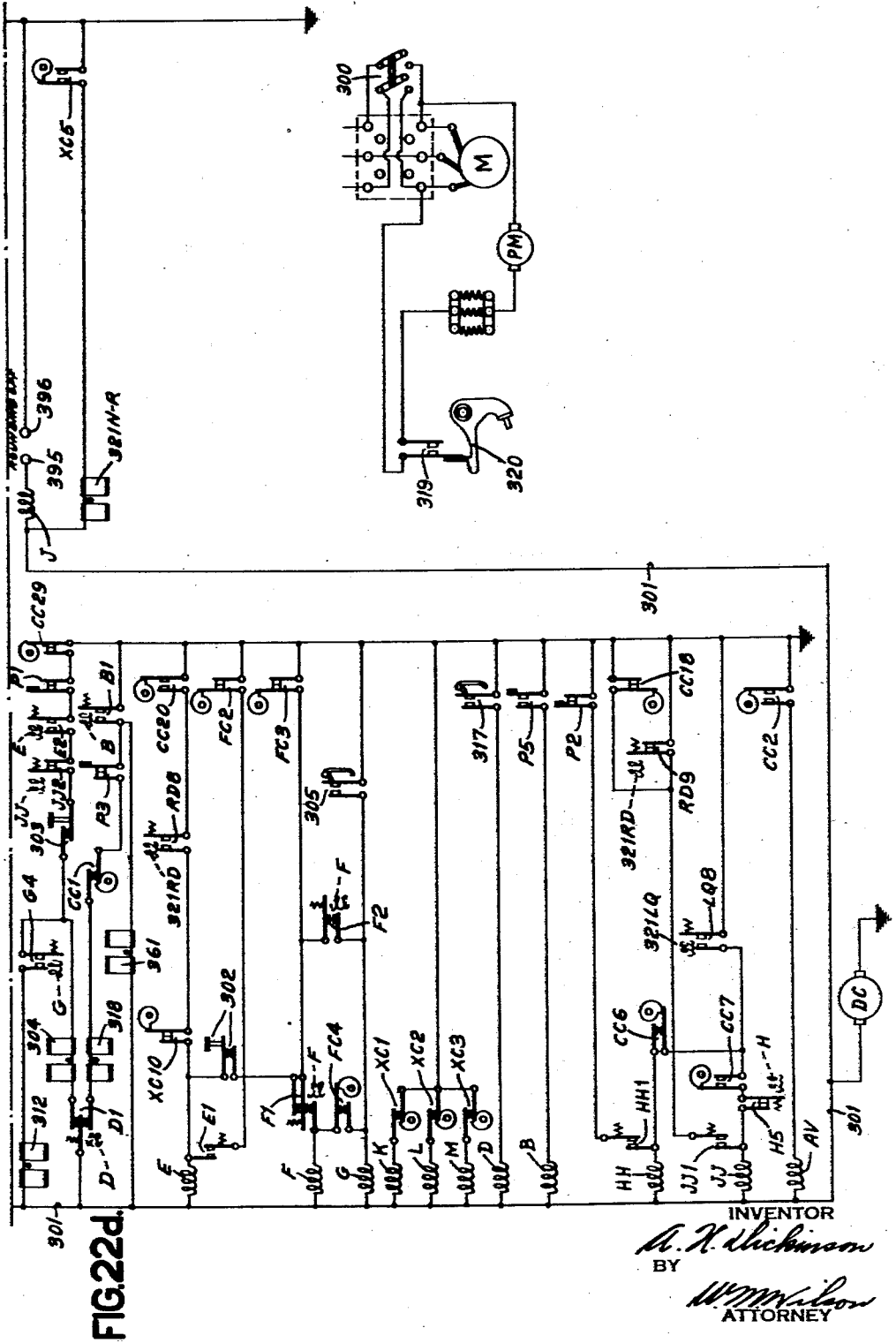

Oct. 3, 1944.  A. H. DICKINSON  2,359,631
DIVIDING MACHINE
Filed April 15, 1941  24 Sheets-Sheet 16

INVENTOR
A. H. Dickinson
BY
W. M. Wilson
ATTORNEY

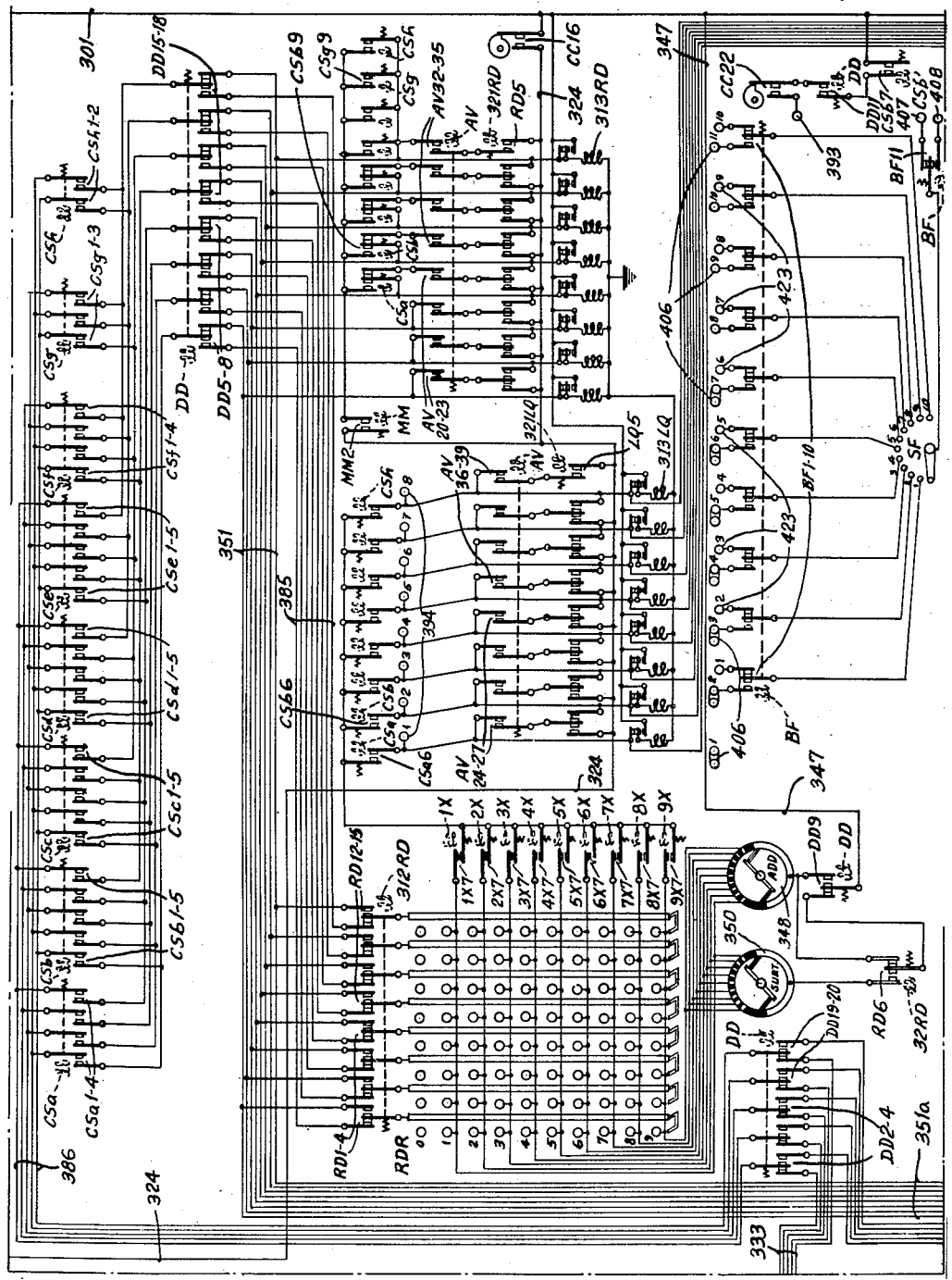

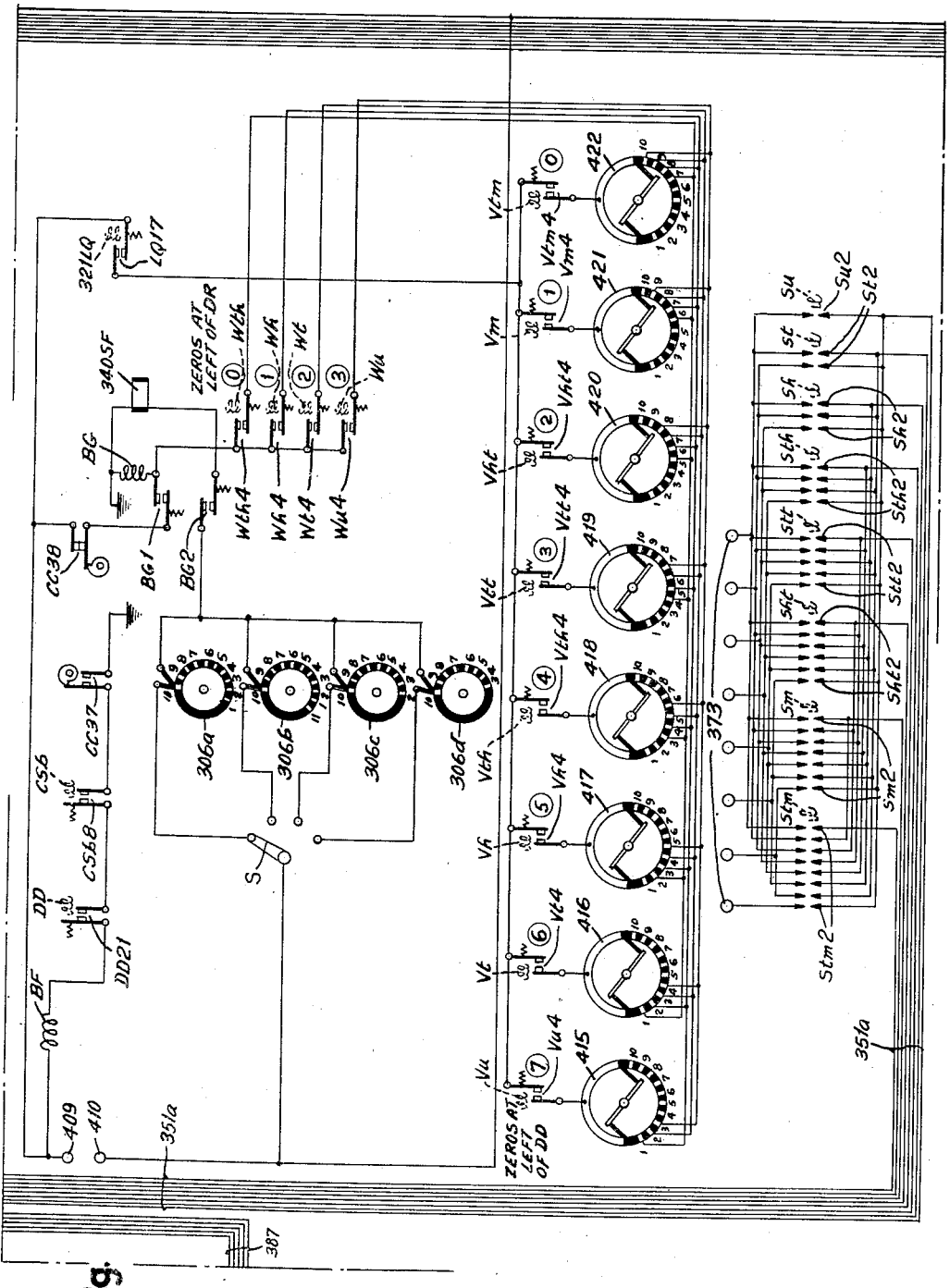

Oct. 3, 1944.  A. H. DICKINSON  2,359,631
DIVIDING MACHINE
Filed April 15, 1941  24 Sheets-Sheet 19

Oct. 3, 1944.  A. H. DICKINSON  2,359,631
DIVIDING MACHINE
Filed April 15, 1941  24 Sheets-Sheet 20

FIG. 28.

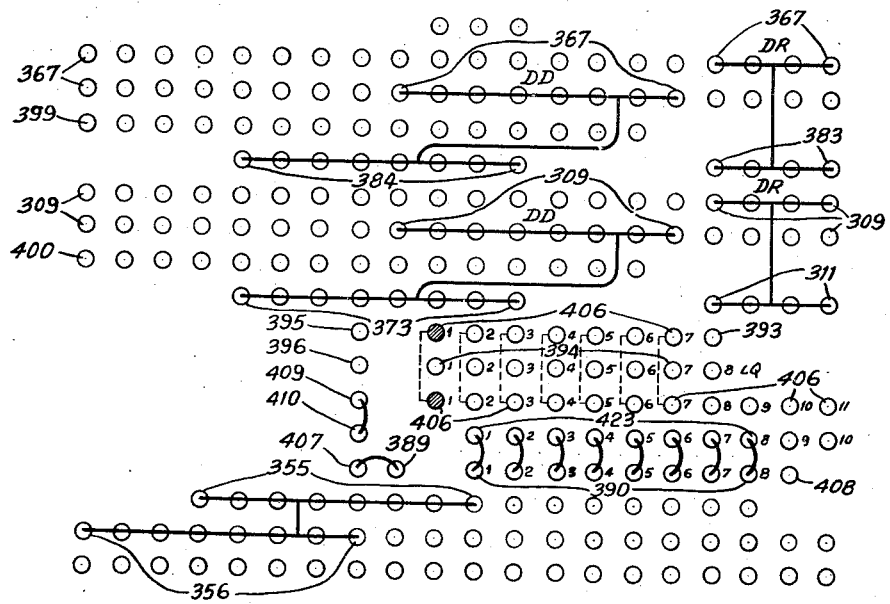

FIG. 23.

| CARD FEED STARTING UP | CARD FEED | | | | | | | |
|---|---|---|---|---|---|---|---|---|
| | | | | | DIVIDING | | | |
| | PRESENCE DR AND DD FIELDS | READ DR INTO ML1-2 3-6,5,7,9 | READ ML-2 INTO 3-6 4-8,5,9 | READ ML-2 INTO 4-8,5 ML-6 INTO 7-9 | COMPARE | MLR TO RD (SUBTRACT) | COMPARE | MLR TO RD (SUBTRACT) | RESET ML'S |
| | READ DD INTO RD | PRESENCE DR AND DD FIELDS OF FOLLOWING CARD | RESET LQ SET SWITCH SF | | Q DIGIT TO LQ | ENTERS 5 INTO LQ | Q DIGIT TO LQ | RESET RD |
| | | | | ←FEED CARD TO FIRST PUNCHING POSITION | | | | SET UP AA+Z RELAYS ←START PUNCHING |

INVENTOR
A. H. Dickinson
BY
W. M. Wilson
ATTORNEY

Oct. 3, 1944.  A. H. DICKINSON  2,359,631
DIVIDING MACHINE
Filed April 15, 1941  24 Sheets-Sheet 21

DIVIDING—FINAL BUT NOT FIXED PLACE DIGIT CORRECTION

DIVIDING—FIXED AND FINAL PLACE CORRECTION
THREE DECIMALS  NEAREST MILL

INVENTOR
A. H. Dickinson
BY
W. M. Watson
ATTORNEY

Oct. 3, 1944.   A. H. DICKINSON   2,359,631
DIVIDING MACHINE
Filed April 15, 1941   24 Sheets-Sheet 22
FIG. 26.   DIVIDING—FIXED AND FINAL PLACE CORRECTION
TWO DECIMALS NEAREST CENT
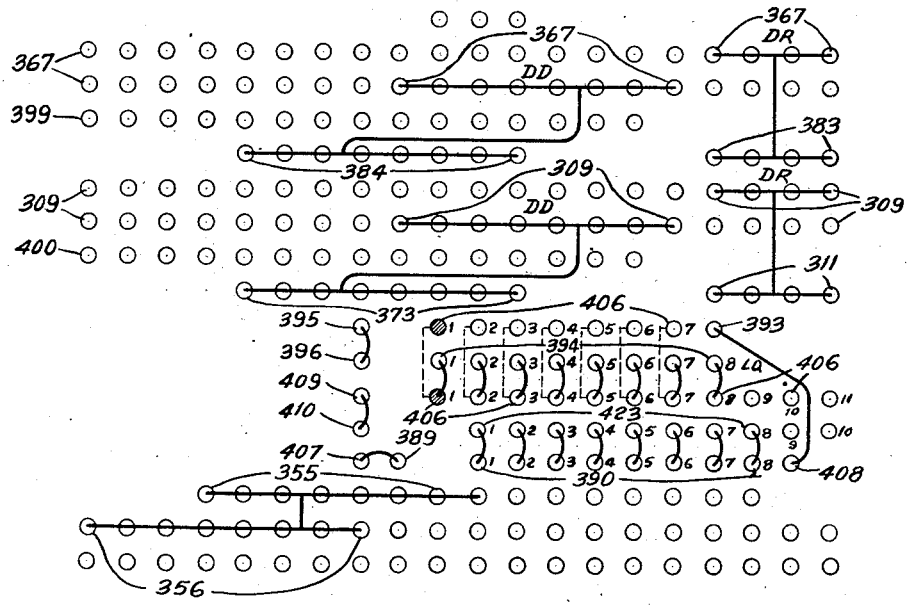
FIG. 27.   DIVIDING—FIXED AND FINAL PLACE CORRECTION
FOR UNITS NEAREST DOLLAR
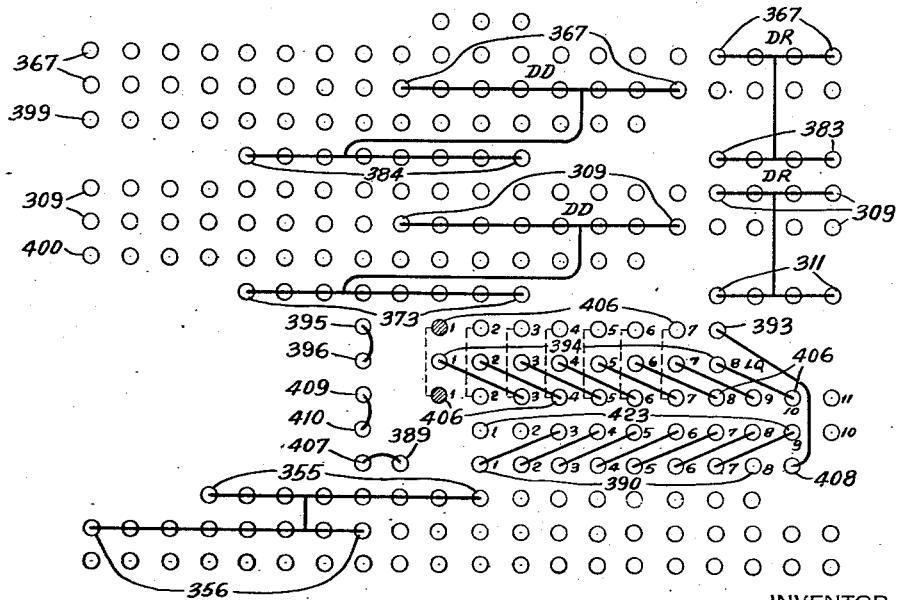
INVENTOR
A. H. Dickinson
BY
W. M. Wilson
ATTORNEY Oct. 3, 1944.  A. H. DICKINSON  2,359,631
DIVIDING MACHINE
Filed April 15, 1941  24 Sheets-Sheet 23

FIG. 29. FINAL BUT NOT FIXED PLACE CORRECTION 4 PLACE QUOTIENT SELECTED PLUGBOARD OF FIG. 24

```
PROBLEM
 No.1  00005375 ÷ 0018   298611     = 00298.610
                         5
                         ─────
                         298611(6)
TWO DECIMALS
NEAREST CENT
 No.2  00053750 ÷ 0018   298611     = 02986.110
                         5
                         ─────
                         298611(6)
FIG. 26
PLUGBOARD
 No.3  00537500 ÷ 0018   2986111    = 29861.110
                         5
                         ─────
                         2986111(6)
THREE DECIMALS
NEAREST (MILL)
 No.4  00005375 ÷ 0018   298611     = 00298.611
                         5
                         ─────
                         298611(6)
FIG. 25
PLUGBOARD
 No.5  08439721 ÷ 0821   1027980    = 00102.798
                         5
                         ─────
                         1027980(5)
NEAREST UNIT
(DOLLAR)
 No.6  00005375 ÷ 0018   2986       = 00299.000
                         5
                         ─────
                         299(1)
FIG. 27
PLUGBOARD
 No.7  08439721 ÷ 0821   102798     = 10280.000
                         5
                         ─────
                         10280(3)
```

FIG. 31. NUMBER OF QUOTIENT DIGITS AND PLACE RECORDING DETERMINED AUTOMATICALLY BY SIZES OF DD ÷ DR NO ROUNDING OFF

```
00238649 ÷ 0392    060871   = 00608.710
00000053 ÷ 0018    291      = 00002.910
00084397 ÷ 0821    10279    = 00102.790
```

FIG. 34. DIVIDING—FIXED PLACE UTILIZED
WITHOUT ADDING "5"—ONE DECIMAL

COMPUTATION 238649 ÷ 392 = 608.7

```
              00238649           0329
                 │                 │
                 ▼                 ▼
             ENTRY SHIFT       ENTRY SHIFT
  ┌───────┬───────┬───────┬───────┬───────┐
  │ ML1-2 │ ML3-6 │ ML4-8 │ ML-5  │ ML-7  │ ML-9
  │ 3920  │ 03920 │ 07840 │ 03920 │ 03920 │ 03920
  │ 7840  │ 7840  │       │ 7840  │ 7840  │ 7840
  │       │       │       │       │ 23520 │ 23520
  ├───────┼───────┼───────┼───────┼───────┼───────┤
  │ MLR1-2│ MLR3-6│ MLR4-8│ MLR-5 │ MLR-7 │ MLR-9
  │ 3920  │ 11760 │ 15680 │ 19600 │ 27440 │ 35280
  │ 7840  │ 23520 │ 31360 │       │       │
  └───────┴───────┴───────┴───────┴───────┘
        │                                  │
        ▼                                  │
       CU                                  │
        │                                  ▼
        ▼                                  RD
       CS ◄──────────────┐              23864900
        │                │                 │
        ▼                │        COMPARE  76479
    Q DIGIT              │        COMPARE  00344900
        │                │                 │
        ▼                │        COMPARE  68639
       CS ──────┐        │                 011103860
        │       │        │        COMPARE
        ▼       ▼        │                 72559
       LQ   FIXED PLACE  │                 011103860
            CORRECTIVE   │                    RDR
            DEVICE       │
                         │
             7─TERMINATES COMPUTING
       6
      ───
       06
       8
      ────
      0608
       ┌────┐
       │06087│   LQR ──► RESULT SHIFT ──► PUNCH
       └────┘
```

INVENTOR
A. H. Dickinson
BY
ATTORNEY

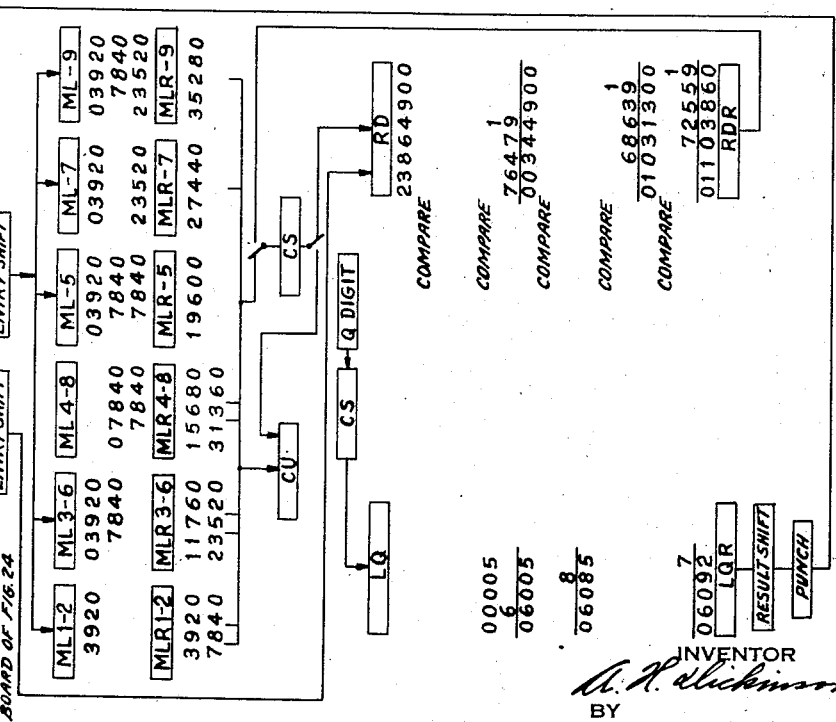

Patented Oct. 3, 1944

2,359,631

UNITED STATES PATENT OFFICE 2,359,631

DIVIDING MACHINE

Arthur H. Dickinson, Scarsdale, N. Y., assignor to International Business Machines Corporation, New York, N. Y., a corporation of New York Application April 15, 1941, Serial No. 388,624

12 Claims. (Cl. 235—61.6)

This invention relates to calculating machines, particularly of the record controlled type which are especially adapted to effect the computing operation of division and, in addition, to record the derived quotient on a record card which may be the same control member controlling the computation. The present application discloses features which are common with respect to the application of J. W. Bryce et al., Serial No. 213,044, filed June 10, 1938, and in addition this application shows and claims other features not disclosed in the Bryce et al. application and it should, therefore, be considered as an improvement.

It is a main object of the present invention to provide an automatic place limiting mechanism which will automatically determine the number of quotient digits which are to be obtained and which is dependent upon the denominational magnitude of both the dividend and divisor which are pre-sensed before the computing operation is effected. Such mechanism includes a common control which is set up according to the denominational magnitude of the dividend and the divisor to determine the number of quotient digits which are to be obtained and also to concomitantly control the place of recording so that not only will the quotient digits be obtained to a predetermined number but the place of recording will be so determined and selected that recording of the quotient amount will be effected with regard to the decimal point. The machine, therefore, further provides for the recording of such quotient digits with regard to the decimal point, the place of recording being determined and controlled by the denominational magnitude of the dividend and divisor.

It is a further object of the present invention to incorporate in the machine a "rounding off" device which is also known as "½ cent pickup," such object being attained in the present machine by modifying the quotient digit limiting device to cause the quotient computing mechanism to go through an additional quotient digit computing operation over that selected by the prior established quotient digit limiting device. The effect of this is to cause the computation of an additional quotient digit which is augmented by the invariable entry of 5 in such order, thereby correcting the next order to the left which is the particular order which is of concern in the calculation.

While the present dividing machine provides a control whereby the number of quotient digits obtained will be directly dependent upon the denominational magnitude of the dividend and divisor it is a still further object of the present invention to modify such control so that the quotient computing operation will be additionally carried out to the selected quotient place, to the right of the decimal point.

In connection with the above, a subordinate object of the present invention is to modify the quotient place limiting control of the machine so that an additional quotient digit will be derived over that which is determined by the denominational magnitude of the dividend and divisor, and arranged to obtain correction of quotient digits at the selective quotient place. This additional computation is preferably carried out so that the increment of 5 may be applied for "rounding off" the quotient digit at the selected place.

For a further understanding of the function performed by the "rounding off" device, it is understood that, in securing quotient digits, such digits are successive and accordingly it is universal practice to disregard the figures appearing below a certain order place. However, in making out computations according to the U. S. currency system, the quotient recording is effected with relation to the decimal point. In some accounting operations, the dollars place may be of material consequence and in other forms of accounting operations the calculation should proceed to the dimes, the cents, the mills place, etc., according to the predetermined requirements. While the quotient digit obtained in a particular order is of material consequence, it is frequently desirable that this particular order be corrected by a unit and accordingly it is an object of the present invention to provide the operation of the "rounding off" mechanism for the final order so as to increase by a unit the order receiving the final digit of the computation.

The mechanism which provides for the above is widely diversified as to its capabilities so that illustration of all the capabilities of the machine will not be within the scope of the present disclosure. Three types of problems, however, are specifically illustrated which indicate how quotient computing operations may be carried out to two decimal places, three decimal places, or to the nearest units in which in terms of U. S. currency means carrying the quotient computation to the cents place, the mills place, or to the nearest whole unit to the left of the decimal point, which is the dollars place.

It is to be understood that the hereinbefore described novel automatic place limiting mechanism can be utilized in connection with or without the "rounding off" feature and this is to be regarded as a separate and independent feature.

While the present improvements have been shown as applied to a dividing machine which is shown in the patent to J. W. Bryce et al., No. 2,328,610, dated September 7, 1943, and Patents No. 2,295,448, dated September 8, 1942, and No. 2,328,611, dated September 7, 1943, both of which are divisions of the first named, it is to be understood that some or all of the features of the present invention may be incorporated in dividing machines of other forms and types, irrespective of whether controls therefor are effected by records, manually controlled means such as keys, and the like. It is to be understood, therefore, that the present invention is merely illustrative and not restrictive, since it can be readily incorporated in dividing machines of other forms with or without modification.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1 and 1a, taken together with Fig. 1a to the right of Fig. 1, show the somewhat diagrammatic view of the various units of the machine and the drive therefor;

Fig. 11 is a somewhat diagrammatic view showing the card handling and sensing section of the machine. The card handling section is shown diagrammatically in Fig. 1a;

Fig. 14 is another detail sectional view of certain parts of the comparing unit, the section being taken substantially on line 14—14 of Fig. 12, looking in the direction of the arrows;

Fig. 19 is a cam timing diagram showing the timing of the various CC cams;

Fig. 20 is a cam timing diagram of the FC cams; and

Fig. 21 is a cam timing diagram of the XC cams;

Figs. 22a, 22b, 22c, 22d, 22e, 22f, 22g and 22h, taken together, show the complete circuit diagram of the machine. In arranging these figures, Figs. 22a to 22d are arranged vertically in the order named with Fig. 22a at the top. Figs. 22e to 22h are also arranged vertically in the order named with Fig. 22e at the top and such figures are placed to the right of Fig. 22a to Fig. 22d respectively.

Fig. 23 is a sequence of operation diagram for the dividing calculation which the machine is capable of performing.

Figs. 24 to 28 inclusive, show the plugging on the insertible plugboard for different calculations which the machine is adapted to perform. Accompanying each figure is a suitable descriptive legend designating the particular types of rounding off operations for which the plugboard is plugged;

Figs. 29 to 31 inclusive, are diagrams showing the recording made for different typical calculations which the machine is adapted to perform. These diagrams show the recording for final place correction, fixed place correction for two decimals, and one decimal without rounding off. The respective diagrams also bear suitable designating legends indicating the type of computation to which the diagram relates;

Figs. 32 to 34 inclusive, show flow diagrams of typical computations as performed by the machine. These show illustrative problems and the manner of effecting entry into the various receiving devices and how the machine performs different typical computations. Each diagram is accompanied by a designating legend giving the particular calculation which is illustrated in the diagram.

Machine drive

Figure 1:
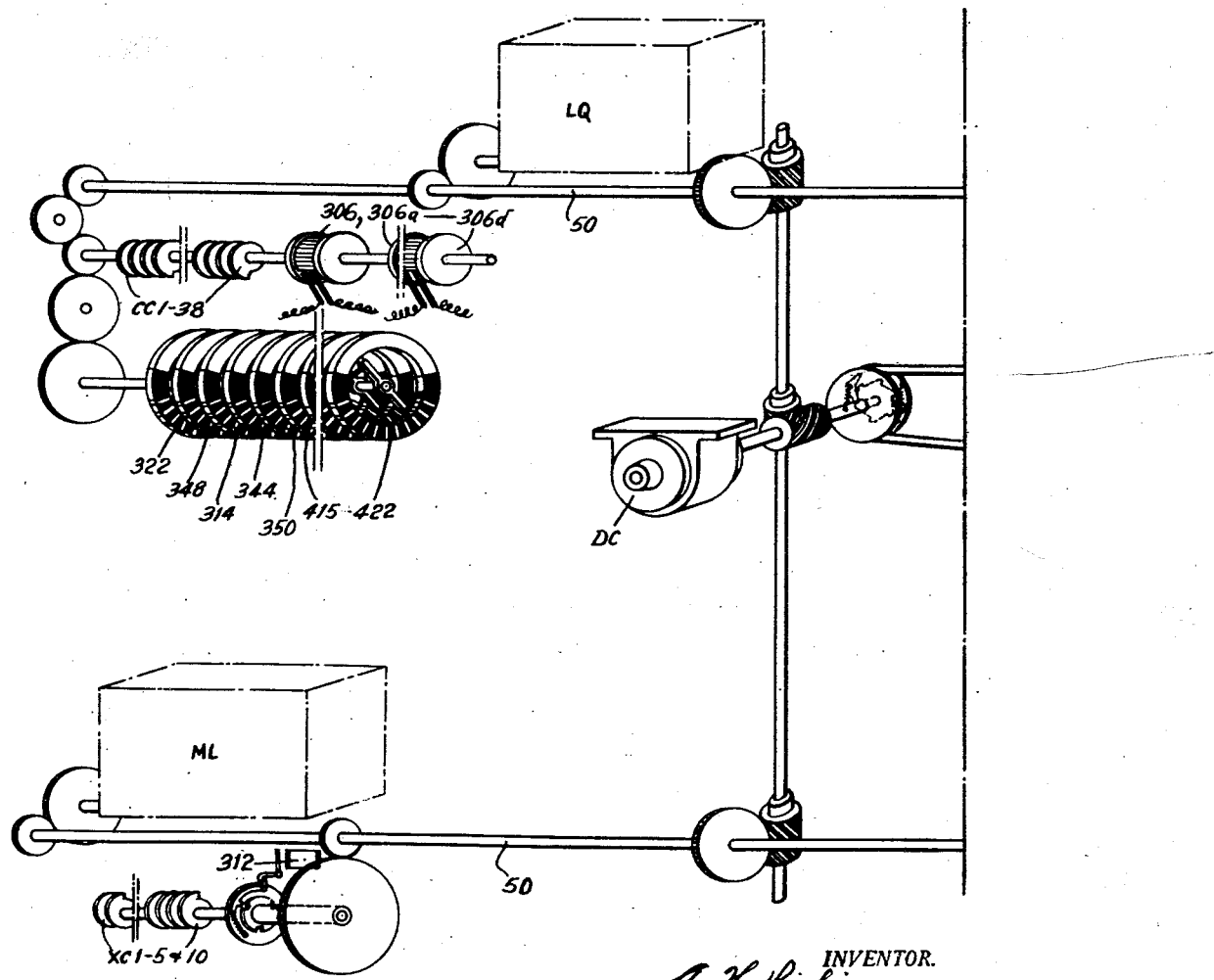
Figure 2:
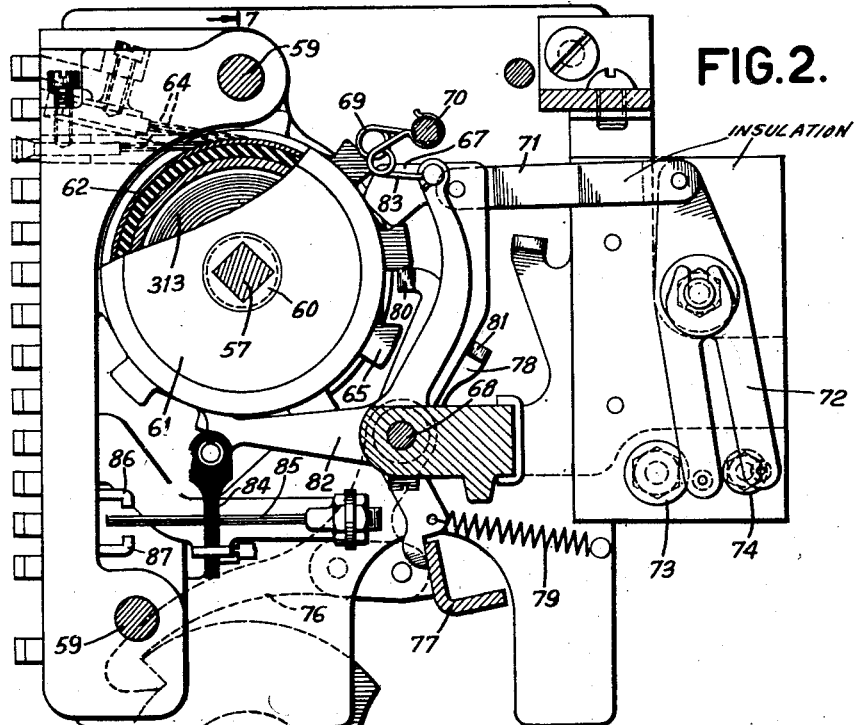
Fig. 2 is a detail sectional view of the accumulator taken along the dividing line between two adjacent denominational orders of such accumulator or entry receiving devices.

Referring first to Figs. 1 and 1a, in general the machine comprises three accumulating units which are respectively designated LQ, RD, and ML. It may be explained that the unit ML contains accumulators and readouts from which all of the nine digital multiples of the divisor can be derived when the machine is used for division. The accumulating unit LQ receives the quotient amount and RD the dividend. The various accumulating units are driven by the gearing delineated from the driving motor M. The machine is also provided with a direct current generator DC. The card handling and feeding section of the machine is of customary form like that shown in Daly Patent No. 2,045,437 and is driven in the usual manner. The FC cam contacts are also driven in the customary manner in synchronism with the drive of the card handling section of the machine. The unit designated N—R is an electromechanical relay setup unit of the general construction shown in Figs. 16 and 17. This is adapted for reset from the constantly running drive shaft by the customary one revolution clutch arrangement. The reset magnet for the N—R unit is designated 321N—R. The comparing units are shown diagrammatically at CU. These comparing units are of the form shown in Figs. 12 to 15 inclusive, and such units in the present machine are adapted to be continually driven from the drive shaft 94.

Also driven from the main drive shaft are the usual CC cams, designated CC1—38, impulse distributors 306, 306a, and in addition there are also provided impulse emitters which are designated 314, 344, 322, 348, 350 and 415—422.

Referring now to the XC1—5 and 10 cam contacts, such cam contacts are driven from the drive shaft through a one revolution clutch which is controlled by magnet 312. The driven side of the one revolution clutch receives its drive from the main drive shaft through the gearing shown, which drives the XC cams one revolution for each three revolutions of the main drive shaft.

For clarity and subsequent description, the upper and lower drive shafts will be given a like reference numeral 50.

*Accumulators and entry receiving devices*

As stated, the LQ, RD and ML units are accumulators of electromechanical type. These accumulators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in U. S. Patent No. 1,834,767 and suitable readout structure may be that shown in U. S. Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in Lake and Pfaff Patent No. 2,232,006, dated February 18, 1941. This accumulator will now be briefly described.

In lieu of driving the accumulator by the customary jaw clutch, the present accumulator which is shown in Figs. 2 to 10 inclusive, is of the form in which a magnetic clutch is used for driving the accumulator element. Suitable circuit making and breaking devices are provided to enable the differential clutch action to take place at a differential time of the cycle depending upon the time of sensing. These devices cause the magnetic clutch to remain in action until a definite point in the cycle whereby definite amounts of rotation of the accumulating wheel are obtained in accordance with the initiating differential impulse.

Figure 10:
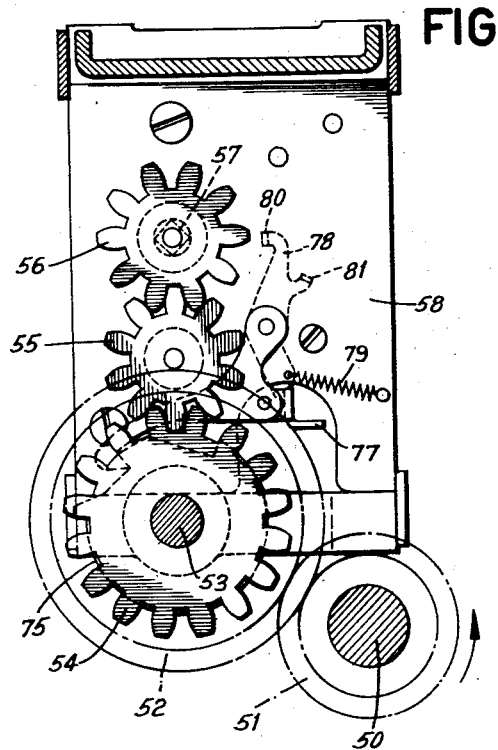
Fig. 10 is an outside view of the accumulator, viz. the view taken from the right of Fig. 8 and looking to the left and which view shows the gear drive for the accumulator unit.
Figure 9:
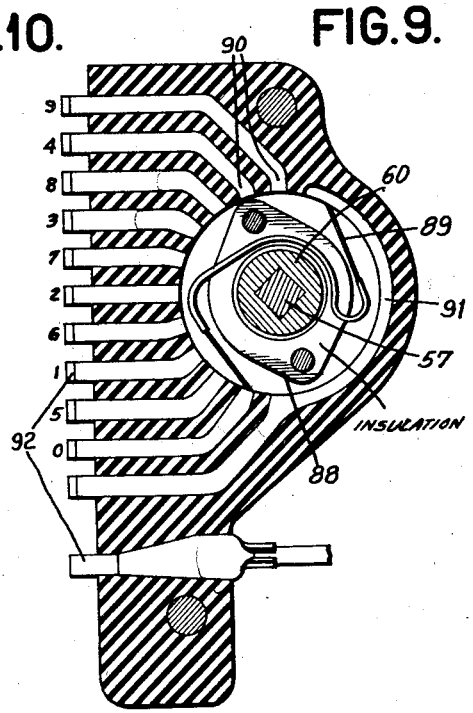
Fig. 9 is a detail view of the readout commutators and wiring to the plug prongs, the section is taken substantially on line 9—9 of Fig. 8.

Referring to Fig. 10, 50 is the drive shaft which is in constant rotation. This drive shaft, through suitable gears such as 51 and 52, drives an accumulator drive shaft 53. Shaft 53 carries a gear 54 which, through an idler 55, drives a gear 56 carried by a square shaft 57 which is thus also in constant rotation. The shaft 57 is suitably supported in bearings carried in the side plates 58 of the accumulating unit. Between the side plates are suitable spacing cross bars 59 (see Figs. 2 and 7), holding the plates in spaced relationship and aiding in the support of the accumulator mechanism. The accumulator units may be made in any desired number of orders. On the square driving shaft is a fitted bushing 60 (see Figs. 7 and 9). Around this bushing 60 there is rigidly secured a magnet yoke 61.

Figure 7:
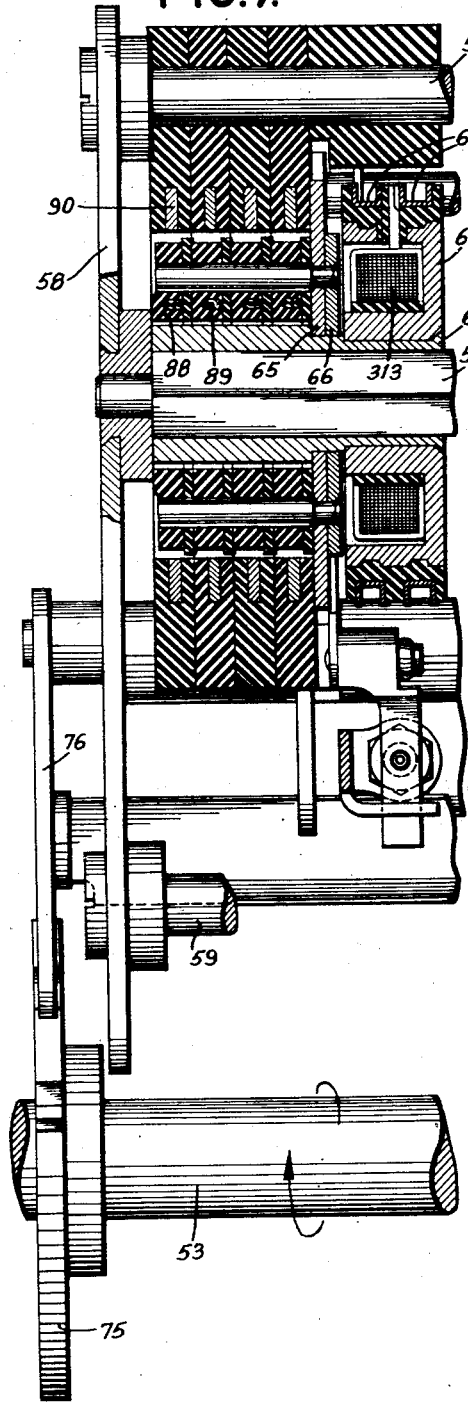
Fig. 7 is another fragmentary sectional view of the accumulator unit of Fig. 2, the view being taken substantially along line 7—7 of Fig. 2 looking in the direction of the arrows. This view in particular shows the readout structure in cross section.
Figure 8:
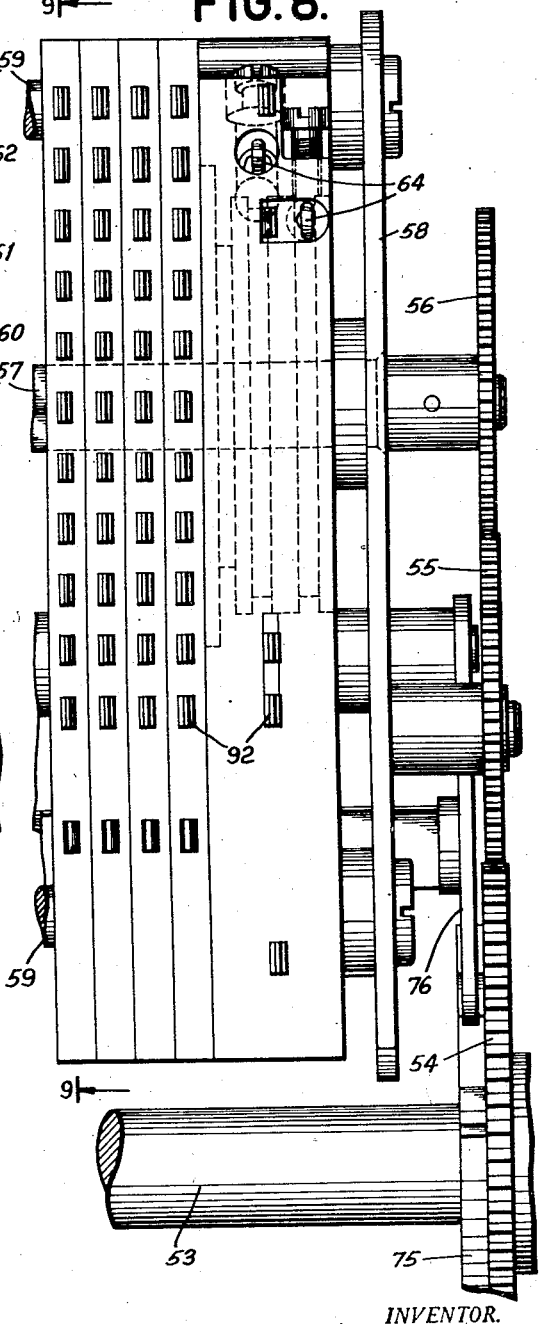
Fig. 8 is an elevational outside rear view of the accumulator unit of Fig. 2, the view being taken from the left of Fig. 2, looking to the right.

Carried about the periphery of yoke 61 and insulated therefrom and from each other there are a pair of channel shaped collector rings 62 to each of which is connected one end of a magnet winding 313 secured and positioned within the yoke. Trailing against each ring 62 there is a brush 64 which is carried in a suitable brush holder. The yoke with its winding rings constitute the driving element of the accumulator clutch whose driven elements include the toothed wheel 65 and tens carry cam 66. The wheel and cam are riveted together as indicated in Fig. 7 and the rivet fastenings also afford driving means for the readout brush holders. Such parts are mounted for free rotation on the bushing 60. As shown there is a slight air gap between the end of the yoke 61 and the carry cam 66. Wheel 65 is provided with ten teeth (see Figs. 3 and 4), between two of which, when the wheel is at rest, there extends the nose of a lever 67. Such lever is freely pivoted on a rod 68. Such lever is held in the position shown in Figs. 2 and 4 by a looped wire spring 69 connected at one end to a rod 70 and its other end to a pin in the nose of lever 67. The spring 69 and the lever 67 form a toggle with the pin urging the nose in contact with the wheel 65. When the clutch magnet winding is energized, the wheel 65 and the cam member 66 are magnetically clutched to the yoke 61 and commences to rotate therewith.

Figure 3:
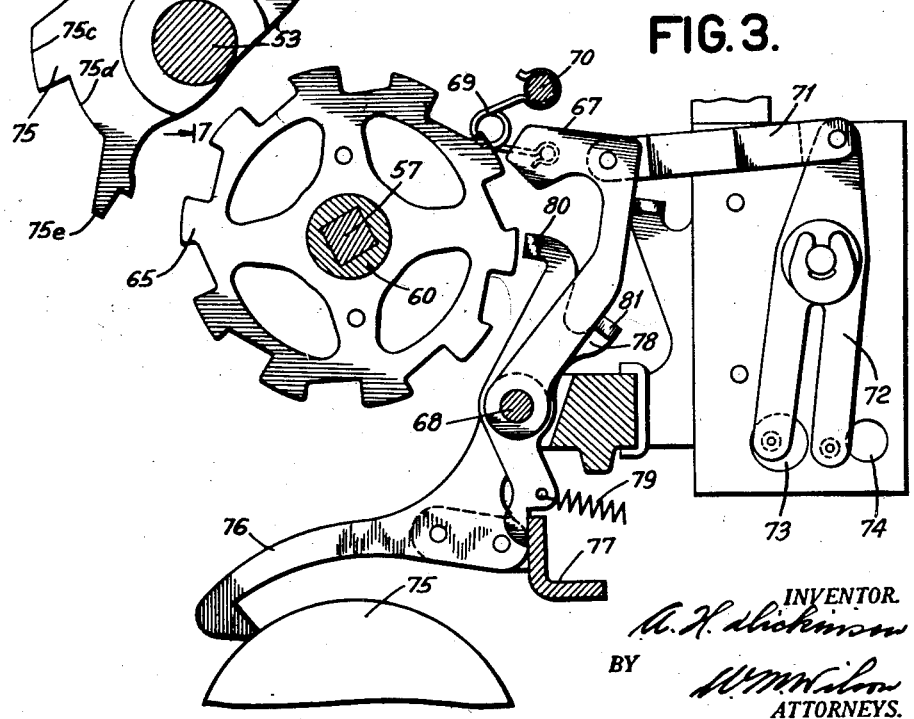
Fig. 3 shows certain parts of Fig. 2 in a different position.

Energization of the clutch magnet is afforded by the usual differentially timed impulse which may be received from the sensing section of the machine or from other controls affording an initiating time of impulse. As the wheel 65 commences to turn, the edge of one of its teeth bears against the upper inclined edge of the nose on lever 67 and cams the lever clockwise as viewed in Fig. 2 about its pivot 68 carrying the lower end of the spring 69 to the right of a line between centers 68 and 70. This position of the parts is shown in Fig. 3. The parts will remain in such position until wheel 65 is again disengaged from the driver. Lever 67, when rocked by a tooth, shifts an insulated link 71, thus shifting a contact member 72 to a position shown in Fig. 3. When in this position a circuit is completed through the forked member and a contact spot 73. This established a holding circuit to maintain the clutch magnet energized.

It may be mentioned that before shifting, an arm of member 72 was establishing contact with a contact point 74. The arrangement is such that a make before break action occurs as the lever shifted. It will be understood that the clutch magnet is energized at a differential time and that the amount that the wheel 65 is rotated is dependent upon the differential time of receiving an impulse. Declutching action at a fixed time in the cycle is brought about as follows: on shaft 53 there is a cam 75 with which a follower 76 cooperates. The follower is integral with a bail 77 which extends across a plurality of units of different denominational orders. For each order there is a lever 78 pivoted on rod 68 and having a lower tail portion bearing against the bail 77 (see Figs. 2, 3 and 4). Each lever is provided with a spring 79 which urges the follower 76 against its cam 75. Each lever 78 has lateral extensions 80 and 81, the former lying in the plane of the wheel 65 and the latter extending behind lever 67.

Figure 4:
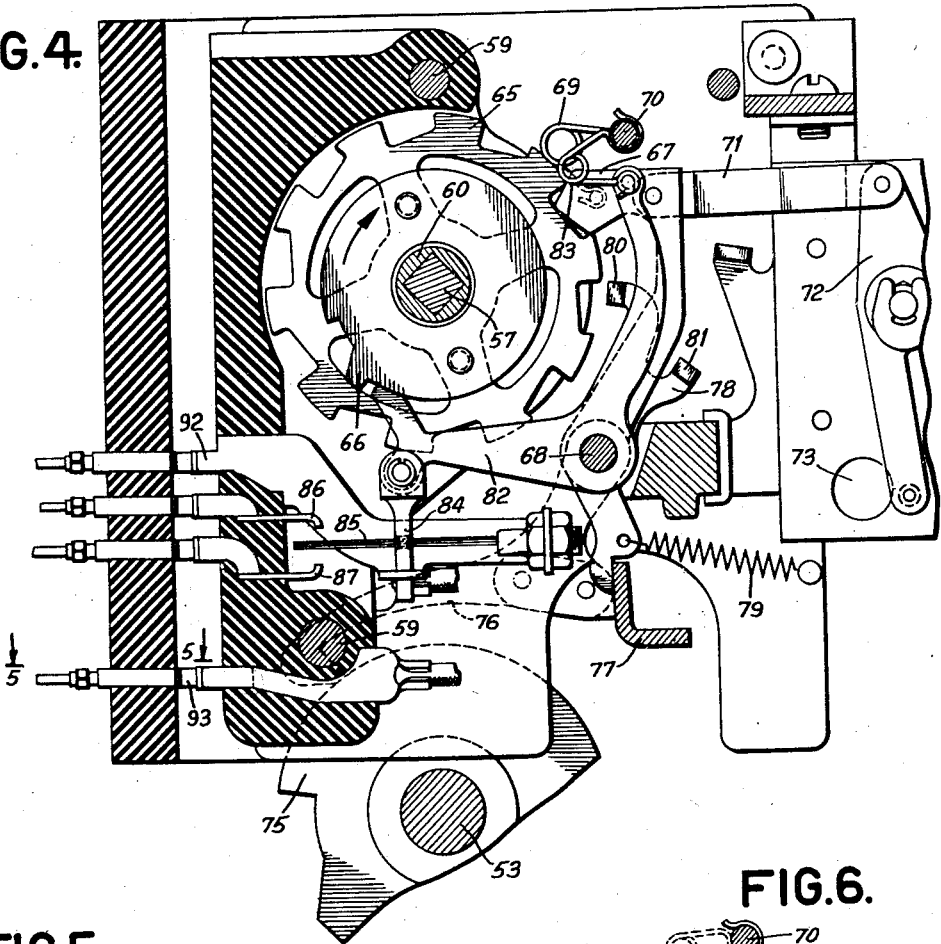
Fig. 4 is another sectional view of one of the accumulator units, the view being generally similar to Fig. 2, but taken on a somewhat different vertical plane.
Figures 5, 6:
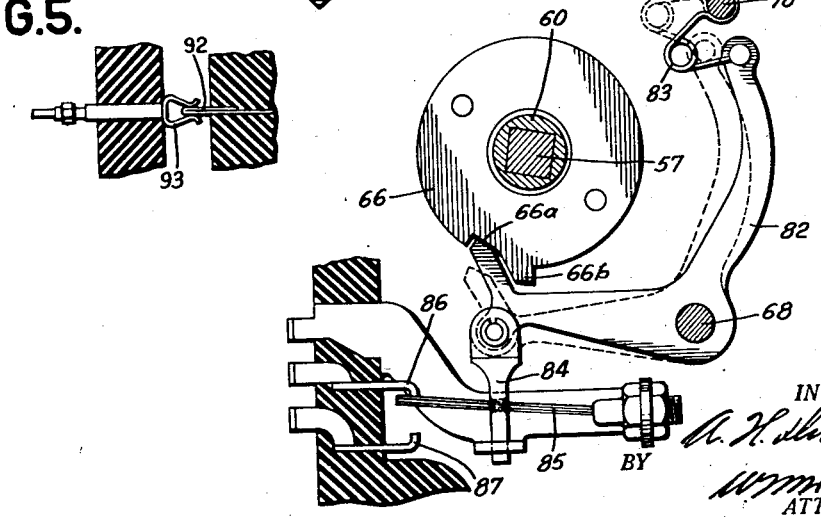
Fig. 5 is a detail view taken substantially along line 5—5 of Fig. 4.
Fig. 6 is a detail view of the tens transfer or carry cam and related parts.

The operation is such that during the entering period of the cycle the follower 76 rides on the intermediate concentric portion of cam 75 holding bail 77 and through it the lever 78 in the position shown in Figs. 3 and 4. At the zero index point in the cycle, the follower 76 drops off the cam and the bail 77 allows the lever 78 to rock rapidly in a counterclockwise direction bringing projection 80 into the space between two of the teeth of the wheel 65. At the same time projection 81 engages the lever 67, swinging it back from the position of Fig. 3 to that of Fig. 2 thus causing the holding circuit of the clutch magnet to be broken. It may be mentioned that the clutch magnet circuit is established by the member 73 and is broken when 72 moves off this contact.

When the clutch magnet circuit is interrupted, projection 80 will engage the leading edge of a tooth on the wheel 65 and positively interrupt further rotation of the now released accumulating wheel. At the same time the trailing edge of the engaged tooth is overlapped by the nose of the lever 67 to prevent retrograde movement of the parts. Continued rotation of the cam 75 will, through portion 75c thereof, again release wheel 65 for a possible tens carry operation and portion 75d will again interrupt the wheel after a single step of movement. Finally the highest portion 75e of cam 75 will cause lever 76 to rock an additional amount in a clockwise direction to restore the tens carry lever 82, if the same had previously been rocked counterclockwise by the carry devices now to be described.

Carry mechanism

Carry cam 66 (Fig. 6) is provided with a notch 66a and a rise 66b. The carry lever 82 pivoted at 68 has its nose held against the carry cam by means of a looped spring 83, which urges the carry lever 82 clockwise. The lever 82 carries an insulating depending member 84 through which the brush 85 extends to make contact with either of contacts 86 or 87. Normally the parts occupy the relation of Fig. 4 with the brush lying intermediate the contacts. When the wheel 65 has been advanced to a "9" position, cam 66 is in the position shown in Fig. 6, wherein the nose of the lever 82 is in the notch 66a, thereby affording contact between brush 85 and contact 86. When the wheel 65 passes through "0," rise 66b on cam 66 will rock the lever 82 to its dotted line position in which position spring 83 will now hold it since the point connection between the spring 83 and the lever 82 is now to the left of the line between centers 70 and 68. As a result, the brush 85 is shifted to engage contact 87 and will remain in such position until after the carry portion of the cycle when the high portion 75e of cam 75 will cause lever 76 to rock lever 82 back to the position of Fig. 4.

Readout structure

Attached to each accumulator wheel is the readout mechanism. It will be understood that any desired number of brush sections can be provided driven by a single accumulating wheel 65 (see Fig. 7). According to the present invention in some instances four brush structures are driven by a single accumulator wheel and in other instances two brush structures are driven by a single wheel. Fig. 7 shows the four brush structure arrangement. Such structure comprises a holder 88 of insulating material having a wire brush 89 fitted within a groove in the holder. The groove, it will be understood, conforms with the general shape of the center part of the brush. In the plane of each brush 88 there are commutator segments 90 and a common arcuate segment 91. Each brush 89 serves to make electrical connection between the related common segment 91 and each of the segments 90 according to the position of the brush upon advance of the accumulating wheel 65. Since the wheel 65 has ten teeth, it moves a tenth of a revolution for each unit entered. Segments 90 are spaced one-twentieth of 360 degrees apart so that the brush 89 stops at the segments in the order in which they are numbered in Fig. 9. In the position shown, zero segment 90 is connected with the common segment 91.

The segments 90 and 91 as well as the circuit to the carry brush 85 terminate in beveled contacts 92 (see also Fig. 5) so that ready connection can be made to the unit by means of the bifurcated blades 93.

Comparing units

The comparing units of the present machine are of the form more fully described in the co-pending U. S. application of Ralph E. Page, Serial No. 117,493, filed December 24, 1936. As shown in Fig. 1a, one of the comparing units is illustrated, and designated CU. These comparing units receive their drive from the drive shaft 50. It may be explained that for dividing calculations the comparing unit drive is constantly maintained.

Comparing units will now be more specifically described. Each comparing unit comprises supporting side plates 95 which are secured together by suitable cross members which also afford support for various parts such as magnets, bails and springs. Each comparing unit is provided with a drive gear 96 (see Figs. 12 and 1a). Such gear 96 is fast to the comparing unit drive shaft 97 (see also Figs. 12, 13 and 14). Each shaft 97 has secured to it a pair of bail operating cams 98 and a pair of restoring cams 99 and 100. Suitably secured in the side plates is a cross shaft 101 on which are pivotally mounted in interspersed relation two series of sectors, one of which is designated 102 (Fig. 13) and the other of which is designated 103. It will be understood that there is a pair of such sectors 102 and 103 for each denominational order in which comparison is to be effected. The sectors are adapted for pivotal rocking movement on the supporting shaft 101 and timed rocking movement is imparted to the sectors by bails 104 and 105 which bails are each connected to their respective sectors by springs 106.

Figure 13:
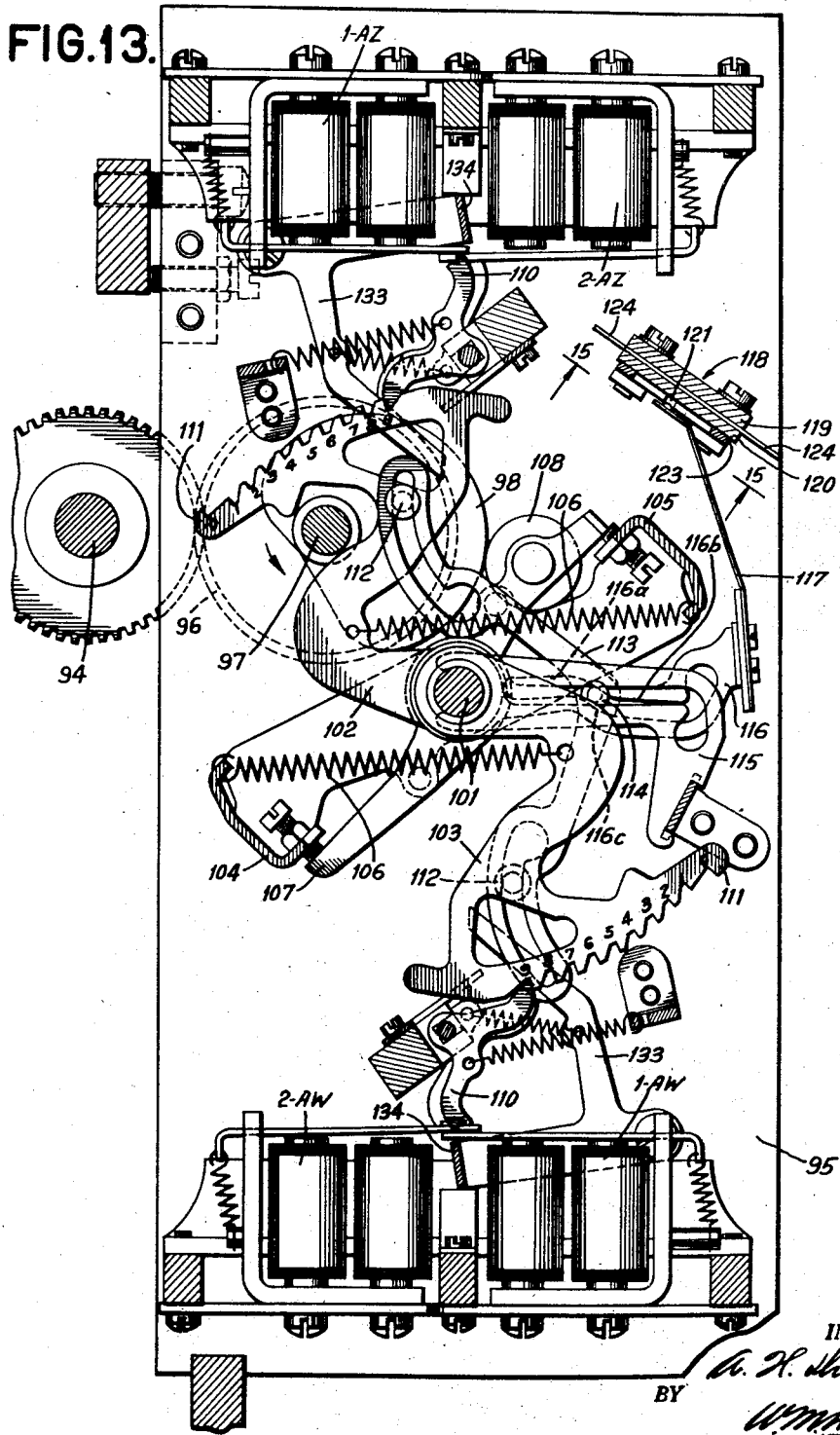
Fig. 13 is a detail sectional view of the parts for one order of a comparing unit, the section being taken along line 13—13 of Fig. 12.

Rocking movement is imparted to the bails by bail actuating levers 107 (one of which only is shown in Fig. 13). Each of such levers carries a cam follower roller 108 which cooperates with a cam 98. The cam follower rollers 108 are maintained in cooperation with cams 98 by means of springs 109 which are attached to the bail arms and to a fixed support as shown in Fig. 14. Differential movement of the sectors is determined by magnetically tripped stop pawls 110 (see Fig. 13). Such stop pawls are normally latched by their related magnet armatures out of the path of the ratchet teeth on the sectors. The comparing magnets are generally designated AW and AZ. It will be understood that the AZ magnets control the related upper sets of sectors 102 and the lower comparing magnets AW control the movement of the lower sectors 103. For compactness of construction the magnets are disposed in a somewhat staggered relation, which will be apparent by inspection of Fig. 12. In Fig. 13, the two lower comparing magnets 2AW and 1AW are adapted to control two adjacent sectors one of which is behind the other.

Upon energization of a comparing magnet such as 1AW at a differential time its armature will release the stop pawl 110 which will swing under the influence of its spring to engage the sector ratchet and differentially stop it in a position corresponding to the differential time at which an impulse is received to energize the comparing magnet. In Fig. 13 the sector 103 is shown as stopped at the "9" index point position and likewise the sector 102 is also shown stopped at the "9" index point position. In the event that there is no energization of a comparing magnet the stop pawl 110 will stop its related sector at the "0" index point position due to the high shoulder 111 beyond the zero position.

Each sector 102 and 103 carries a pin 112 and each of these pins extends through slots in a differentially floating link 113. Each differential link has a pin 114 carried thereby and extending therethrough. Each such pin 114 is slidably guided for in and out movement with respect to the shaft 101 by means of a slotted member 115. Also cooperating with each pin 114 is a member 116. Member 116 has a cam slot portion 116a comprising a straight portion, another straight portion 116b and a connecting sloping portion 116c. The relation of parts is such that if sector 103 has the same setting as sector 102, for example at the "9" index point position as shown in Fig. 13, the pin 114 will remain at the center in the sloping cam portion 116c. Under this condition, there will be no movement of the arm 116. On the other hand, when pin 114 is caused to move to the right as is the case when sector 102 moves to a greater extent than sector 103, then member 116 will be rocked upwardly or counterclockwise about 101 as a pivot. This counterclockwise movement of 116 occurs when the amount set in sector 102 is less than the amount set in sector 103. On the other hand when the amount set in sector 102 is greater than the amount set in sector 103, the pin 114 will move to the left or into the 116a cam slot portion of 116. This will cause clockwise swinging of 116 about 101 as a center.

By the above mechanism for any order of the comparing unit, it is possible to compare two numbers in a given order and to get three selective settings of 116. One setting is made when the members are equal in which case there is no movement imparted to 116, and it remains in the center position. The other conditions are in upward or downward displacement of 116.

Figure 15:
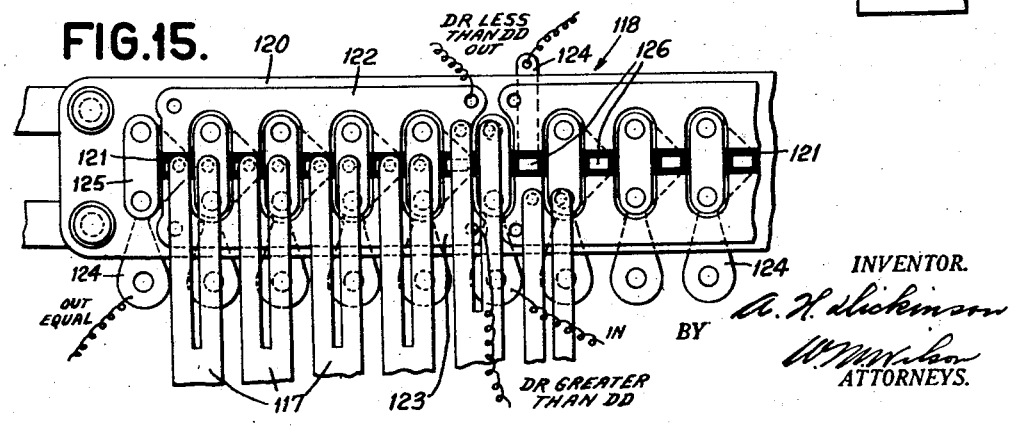
Fig. 15 is a fragmentary detail view of the comparing commutator and brush devices of the comparing unit, the view being taken substantially on line 15—15 of Fig. 13, looking in the direction of the arrows.

It will be understood that in order to provide for comparison of multidenominational members that there are a pair of sectors 102 and 103 for each order and further that there is a member 116 for each order. Each member 116 has secured to it a brush contact bifurcated wiping member 117 (see Fig. 15). In Fig. 15 there are shown four wiping members 117. The two to the extreme left are in non-shifted or middle position. The second from the right is in upper position indicating that its sector 103 has moved to a less extent than its related sector 102 and the extreme right hand wiping member is in down position, indicating the reverse sector condition.

Suitably mounted upon the side plates in cooperation with the brush members 117 is a comparing commutator generally designated 118. This comparing commutator comprises a base plate 119 and a face strip 120 of insulating material supported by other strips of insulating material 121. Suitable fastening rivets secure the parts together and secured to the face of 120 are common contact strips 122 and 123. Located between the strips 119 and 120 are a series of terminal plates 124 having portions which extend beyond the edges of the commutator for circuit connections. Parts of terminal plates 124, to a certain extent, resemble triangles with their points extending to the right, note the dotted line extension in Fig. 15. Carried on the face of the strip 120 are a number of contact plates 125, each of which is connected to a related terminal plate 124. The contact strips 122 and 123 are serrated and arranged so that the serrations pass each other and extend into the spaces between the contact plates 125. The ends of the serrations of 122 and 123 and between 125 are blocks of insulating material 121 having contact rivets 126 which connect with the respective terminal blocks 124.

It may be explained that the comparing commutator is sectionalized for making comparison of five orders with five orders. With the setting shown for the five brushes to the extreme left in Fig. 15, the circuit will come in at the wire marked "In" to block 124. It will extend through 125, through the brush 117, thence to plate 122 and out on the circuit labeled "DR less than DD." However, assume that the right hand brush is in the middle position. In this event, the circuit would extend from the "In" wire to contact block 125, through brush 117, through the segment 126 of the next order to the left, thence through contact block 125, through the brush 117 of this order, again through 126 and 125 pertaining to the next order, through the brush 117 of this order, through the block 126 and 125 and so on for the next two orders and out on the "Out equal" wire. On the other hand assume the right hand 117 brush of the five order unit in down position. The circuit comes in on the "In" wire, through the contact block 125, through the brush 117, and is then completed through the lower serrated member 123 to an out line labeled "DR greater than DD."

With reference to the comparing commutator, it may be explained that the first brush from the right in any group which has moved off from the central or equal position effects the control. For example, assume that the fifth brush 117 from the left in Fig. 15 is in middle position and the fourth brush from the left is in upper position, then in that event the circuit would be completed from the "In" line, through the terminal block 124, through block 125, through the brush 117 in say the tens thousands order, through spot 126, through block 125, through brush 117 to contact plate 122 and out. In short, it may be stated that it is the highest order shifted brush which is controlling for purposes of comparison.

In the use of the comparing units it is desirable to set up one side of the comparing unit once and then hold the setting and it is also desirable that the other side of the comparing unit be set up, then restored and set up again for a following comparing cycle. In order to provide for this operation, certain bail movement controlling mechanisms are provided which will now be described.

Referring to Fig. 14, it will be noted that the bail 105 is provided with a spring pawl 127 and that bail 104 is provided with a spring pawl 128. Arranged to cooperate with 127 and 128 are pawls 129 and 130 which pawls may be considered as normally having the latched position as shown. Upon clockwise swinging of bails 104 and 105, the pawls 127 and 128 first yield and ride upon the face of pawls 129 and 130. When the end of the bail movement is reached, the pawls 127 and 128 snap into the position shown and thereafter both bails 104 and 105 will be latched against return movement. If it is desired, therefore, to retain the setting of an upper sector 102 (Fig. 13) magnet 321AZ (Fig. 14) is left deenergized. So long as this magnet is left deenergized, the previous setting of sector 102 or a plurality of such sectors will be retained.

Referring now to the lower sector 103, it is desired that this sector be reset on each comparing cycle. Accordingly, magnet 321AW (Fig. 14) is energized. Upon the attraction of its armature, pawl 130 will swing under the influence of its spring in an anticlockwise direction out of intercepting relation with pawl 128. Accordingly, bail 104 can have an anticlockwise restoring movement to restore the sector or sectors 103 cooperating therewith.

Arms 132 (Fig. 14) are oscillated by cams 99 and 100 once each machine cycle and such arms are provided for the purpose of knocking off the armatures of magnets 321AZ and 321AW whenever any armature has been tripped and such frame is also adapted to restore the pawls 130 and 129 to their latched position. When the bails 104 and 105 are swung counterclockwise to restore the sectors, the pawls 110 (Fig. 13) ride up on the smooth high parts of the sectors beyond the nine ratchet tooth position and thus displace the pawls out of the line of the ratchet teeth. At about this time the leading edge of a bail such as 104 engages a pivoted armature restoring member 133 and rocks it clockwise to displace the bail 134 and therefore knock off the armatures and relatch the stop pawls 110.

*Electromechanical relay unit*

Referring to Fig. 1a there is shown an electromechanical relay unit N—R. This unit has a drive shaft 135, and the drive shaft is adapted to make one-quarter of a revolution for each revolution of the main drive shaft 50 when the related one revolution clutch controlled by magnet 321N—R, Fig. 1, is operated.

Figure 17:
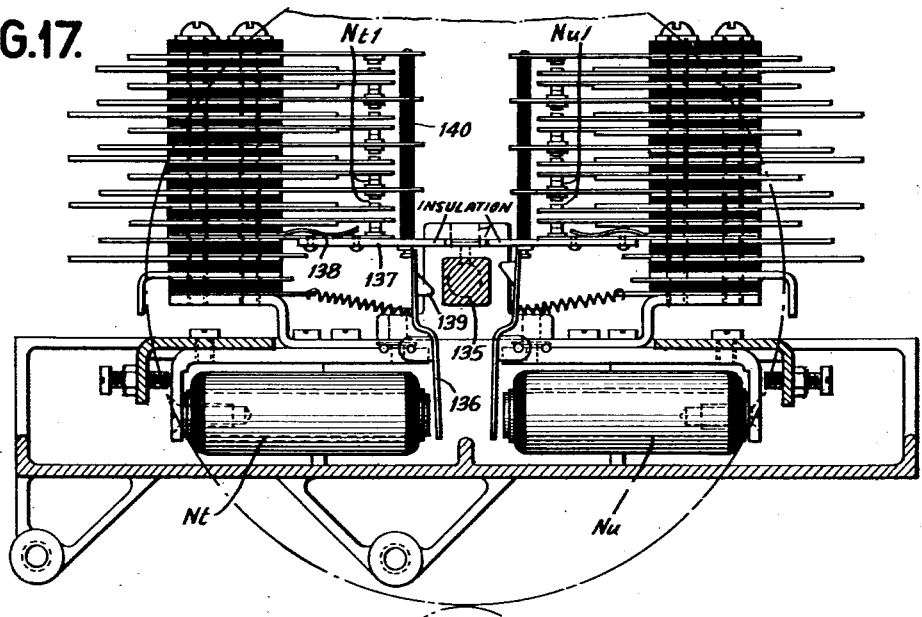
Fig. 17 is a detail sectional view of such unit, the section being taken substantially on line 17—17 of Fig. 16.
Figure 16:
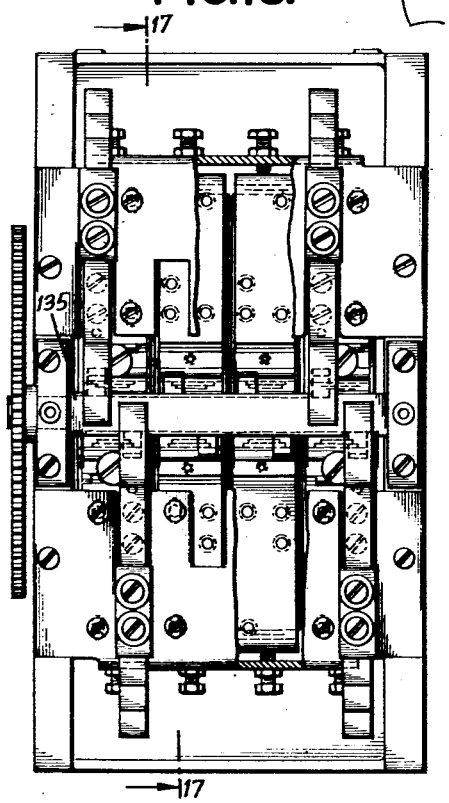
Fig. 16 is a top plan view of an electromechanical multicontact relay unit which is used in the machine for cycle control and presensing control purposes.

Referring now to Figs. 16 and 17, the shaft 135 is suitably journalled as shown and intermediate the journals the shaft is provided with a square cross section as clearly shown in Fig. 17. In general, the contact operation of this unit is as follows: The relay unit comprises the required contacts which may include normally closed contacts, transfer or shift contacts and normally open contacts. Each set of contacts has a tripping magnet associated therewith. Such tripping magnets are N$t$ and N$u$. Upon energization of either of these magnets their contacts will be tripped so that they shift to reverse position from that shown. Such contacts thereafter remain in such shifted position until the shaft 135 makes one-quarter of a revolution, whereupon the cam contacts are mechanically restored to their initial position. Such contacts are then latched in such position. The rotation of the shaft 135 also mechanically knocks off the armatures and also mechanically restores the contacts to their initial position.

The details of these electromechanical relay units are fully shown and described in the patent to James M. Cunningham, No. 2,161,614, dated June 6, 1939.

Referring to Fig. 17, N$t$ is one of the tripping magnets. Cooperating therewith is a spring retracted armature 136 which has its upper portion in contact with a latched piece riveted to an insulating strip 137 to which the lowermost contact blades are riveted. Suitable springs such as 138 bias lowermost contacts and the spring 137 downwardly. The insulating strip 137 extends along and overlies the square shaft 135. It will be self-evident that upon energization of a magnet N$t$ related contacts will shift to reverse position and remain in such position. Thereafter, upon one-quarter of a revolution of shaft 135 one square corner of the shaft will first abut the insulating strip 137 and lift it to upper position restoring the contacts and slightly later another corner of the square shaft intercepts a camming element 139 integral with the armature 136 and positively shifts the armature from the magnet into latching position.

The construction is substantially duplicated for the right hand section of the unit. It will be understood that the upper contacts of a set are shifted by insulating members 140.

*Insertible plugboards*

Figure 18:
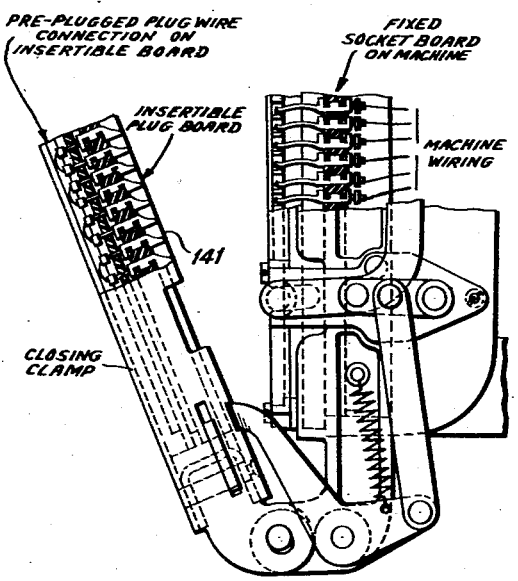
Fig. 18 is a detail view of one of the automatic plugboard units used in the machine, this view showing the plugboard unit in open position.

In order to quickly change the operation of the machine to effect a division computation with one mode of rounding off to another mode of rounding off, use is made of insertible plugboards. This insertible plugboard construction is of a type known in the art and the insertible plug unit is generally indicated at 141 in Fig. 18. Devices of this type are generally known as "automatic plugboards" and a suitable form of such board is shown and fully described in the patent to C. D. Lake, No. 2,111,118, dated March 15, 1938. Such automatic plugboard arrangement comprises a series of relative fixed machine sockets to which the fixed machine wiring is connected. Adapted for cooperation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be preplugged with a desired set of connections.

The manner in which the replaceable plugboard units 141 are wired and plugged for different computations is shown in Figs. 24 to 28 inclusive.

*Cam timing diagrams*

The cam timing diagrams, Figs. 19 to 21 inclusive, are self-explanatory. It should be noted that the CC cam contacts, emitters and impulse distributors make one revolution per machine cycle. The FC cam contacts of Fig. 20 on the other hand make one revolution per card feed cycle, which comprises two machine cycles. The XC contacts of Fig. 21 make one revolution for every three machine cycles.

*General operation of machine for dividing*

Before describing details of the circuit diagram and the operation of the machine, the general operation for an original run of records involving dividing will be explained. This explanation is necessary in order to properly trace the manner of dividing with rounding off wherein a series of computing steps are effected different from those effected during operations involving regular dividing. The features of the machine for effecting regular dividing does not form the subject matter of the present application since such features are claimed in the patent to J. W. Bryce et al., No. 2,298,448, dated September 8, 1942.

The circuit diagram herein shown includes the requisite controls adapting the instant machine for effecting division, calculations and the mode of operation of the machine for such calculations will later be described in detail with reference to the circuit diagram. The general mode of operation of the machine for dividing calculations will, however, be given briefly.

The operations of the machine shown herein involve regular dividing with (1) final digit rounding off wherein the quotient amount is recorded to the nearest whole unit, (2) rounding off at a fixed place and (3) fixed place result recording with or without rounding off.

Generally, the operation for regular dividing is as follows: The amount of the divisor and the amount of the dividend are read from each record (see Fig. 23). The divisor amount is entered into five accumulative type receiving devices. The amount of the dividend is entered into another receiving device. Following such entry cycles wherein amounts are derived from the record, there are a series of cycles utilized for building up multiples of the divisor.

Before explaining the manner in which these multiples are built up, it may be stated that certain of the entry receiving devices which receive the divisor amounts are provided with so-called doubling readouts. These doubling readouts are fully described in U. S. Patent No. 2,166,928, dated July 25, 1939.

In the machine cycle following the entry cycle, (Fig. 23) twice the amount of the divisor is read out from the doubling readout associated with the ML2 accumulator and such double divisor amount is entered into ML3—6, ML4—8, ML5 and ML9. On the following machine cycle, twice the divisor amount is again read out from the doubling readout MLR1—2 of ML1—2 and entered into ML4—8 and ML5. Concurrently and during this same cycle six times the divisor amount is read out from the doubling readout MLR3—6 associated with ML3—6 and such multiple is entered into ML7 and ML9. This completes the build-up operation of all digital multiples of the divisor.

It may be further explained on regular dividing calculations that upon the entry of the divisor amount from the record card into the receiving accumulators, the divisor entry is shifted by a column shift mechanism so that the highest significant digit is always entered into the left hand order of the receiving accumulator ML1—2, but in other ML devices which receive entries of the divisor from the card, there is one clear column of each receiving device at the extreme left in order to afford columnar capacity for building up operations. The dividend amount is entered into the RD accumulator in the card reading cycle. The dividend entry in such accumulator is also made in such a manner that the highest significant digit is entered into the highest order of the accumulator at the extreme left. The purpose of making the divisor and dividend entries in shifted relation on original runs is to save operating cycles during the dividing calculations which follow. Control of entry shift for both the divisor and dividend entries on original runs is made by presensing each record to ascertain the location of the highest order significant digit of both the divisor and dividend. Having ascertained the orders in which such digits of the divisor and dividend occur, a selective control is set up and upon entry there is a shift to the left into both receiving devices to an extent determined by the control which has been previously set up. When the machine is effecting division on original runs, certain comparing units are utilized. These comparing units are generally of the type previously described, and also in the copending application of R. E. Page, Serial No. 117,493, filed December 24, 1936. In the present machine, there are three such comparing units having potential comparing capacity of forty-eight columns. Forty-five columns are used and are divided into nine sections, each having a capacity of five orders. When dividing is to be effected, a comparison portion of the dividend, i. e., a determined number of orders thereof at the extreme left is derived from the RD accumulator and such dividend comparison portion is set up in each section of the comparing units. Concurrently and in the same machine cycle with such setup there is also set up in each of said sections a multiple of the divisor. Different multiples of the divisor are set up on different comparing unit sections.

Having set up the comparison portion of the dividend and the different digital multiples of the divisor in this manner, the comparing units proceed in operation and effect a comparison, such comparing being effected in the same cycle in which entries of amounts were made into the comparing unit sections. Comparing is initially effected after entry. This comparing operation of the comparing unit sections on original runs determines which multiple of the divisor is highest in value that is equal to or just less than the comparison portion of the dividend. Having made such a determination, a selective control is set up based on the comparison, that is to say, if the four divisor multiple is determined to be the highest going multiple there is a selective entry control related to a four quotient entry.

Following the comparing operation on original runs the complement of the highest going divisor multiple is read out from MLR4 readout and this complementary amount is entered into the RD accumulator to bring about a deduction of the highest going divisor multiple from the comparison portion of the dividend in such accumulator. Along with this deducting operation, the related quotient digit is entered into the LQ quotient receiving accumulator. The same operations are then repeated for a new comparison portion of the dividend. Before comparison is effected, of course, the dividend receiving sections of the comparing unit sections are restored to zero in order that a new comparison portion of the dividend may be introduced therein.

The foregoing operations continue with proper columnar shift after each operation until the dividing computation is completed on the original run.

It may be mentioned that the calculating machine for performing division shown in the application referred to and also herein is provided with manually set place limiting devices and controls to terminate operations when a certain number of quotient digits are derived, but the present application includes other automatic place limiting controls which terminate operations at a fixed place to provide for fixed place recording of the final quotient digit.

When dividing operations are completed, the machine records the quotient back on the record from which the divisor and dividend was derived. In such recording which is under the control of the LQ accumulator there is a relative shift back of the quotient entry on the record. This so termed "shift back" is made under control of devices which are set up according to the original shift of the divisor and dividend upon their entry.

It may be further explained that if none of the divisor multiples are contained in the comparison portion of the dividend which is being compared, there is a new comparison effected immediately with a newly selected comparison portion of the dividend and that there are no idle cycles taken up either with unnecessary subtractions or for the introduction of a zero or zeros in the quotient receiving device.

*Adjusting the machine for dividing operations with rounding off feature*

Figure 24:
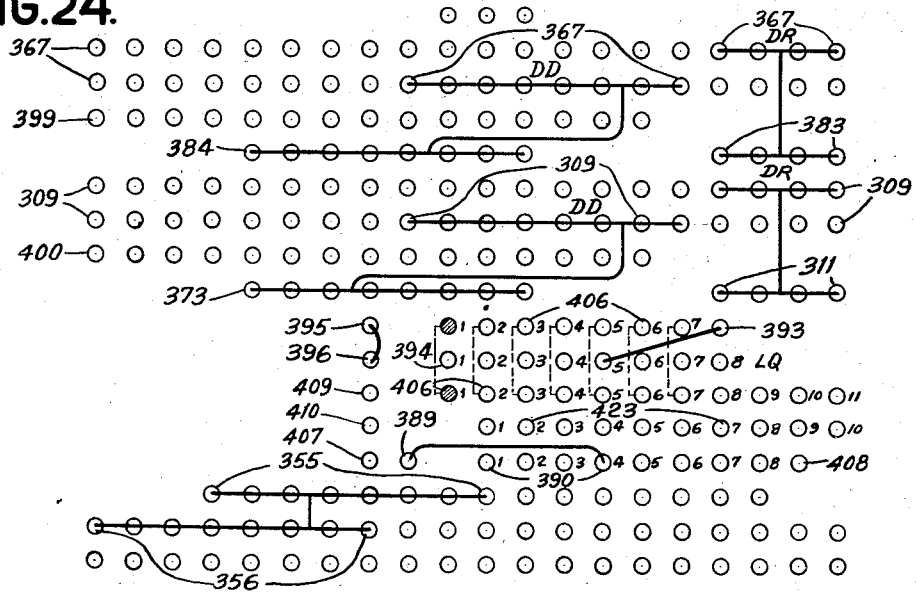

When the machine is to be utilized for dividing the insertible dividing plugboard of Fig. 24, is first properly plugged up or it may be preplugged for a typical computation and thereafter this plugboard is inserted in the plugboard unit. On such insertible board there is a plug connection between socket 395 (Fig. 22d) and socket 396. With such plug connection established, relay coil J becomes energized and such relay remains energized throughout all dividing computations. All of the various contacts controlled by relay coil J shift to reverse position from that shown on the circuit diagram.

*Presensing and entry shift controls*

Referring to Fig. 1a, the setup relay unit N—R is provided, whose general construction was previously described in connection with Fig. 17. In the N unit, the tripping magnet is designated N with suitable suffixes indicating columnar order.

The insertible plugboard affords plug connections between sockets 383 (Fig. 22c) and sockets 367 (Fig. 22a) for the divisor field and other plug connections are provided between 384 (Fig. 22c) and 367 (Fig. 22a) for the dividend field.

The foregoing plug connections route entries from the presensing brushes 371 to certain controls to be subsequently described.

Figure 22E:
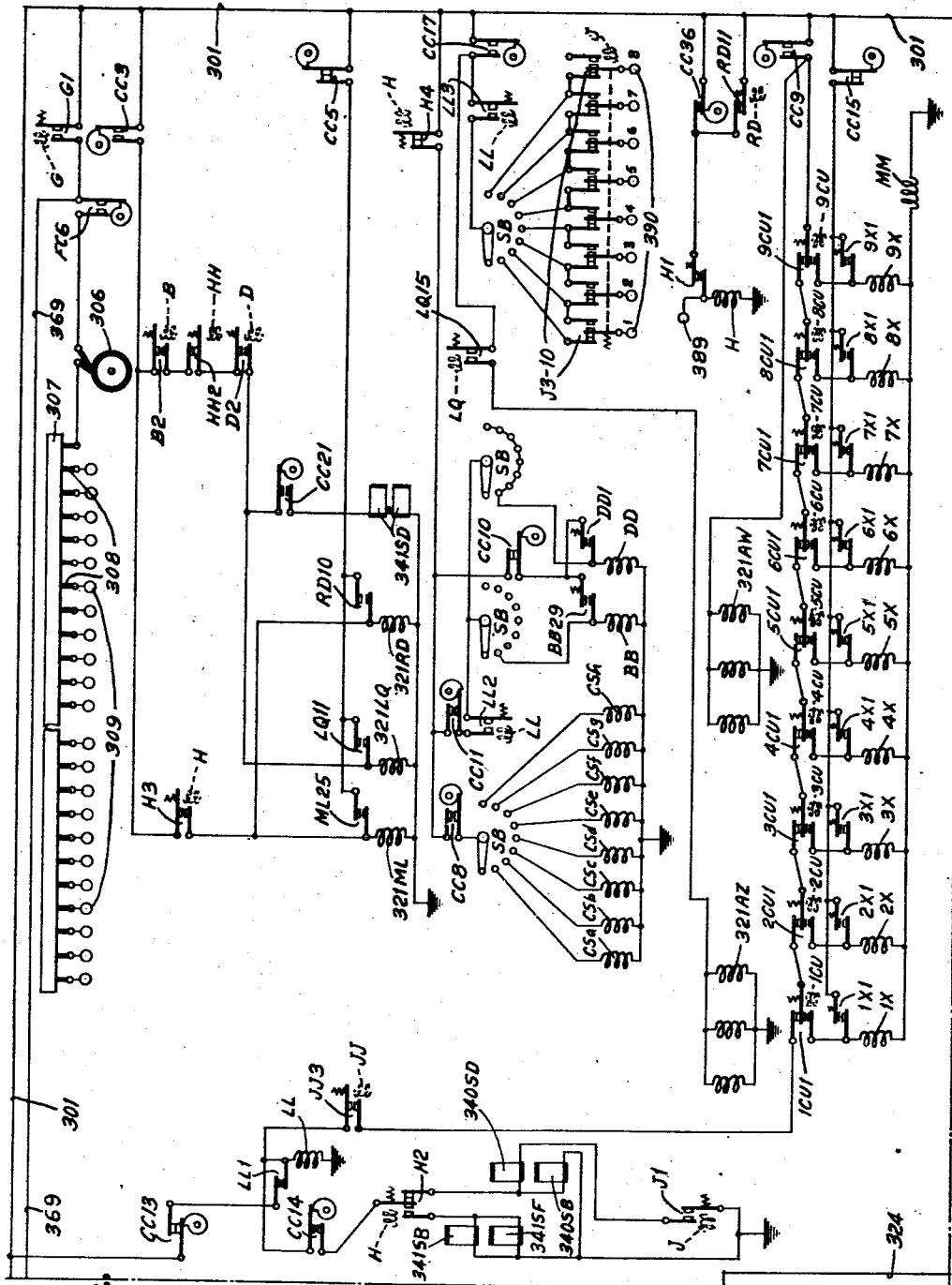
Figure 22H:
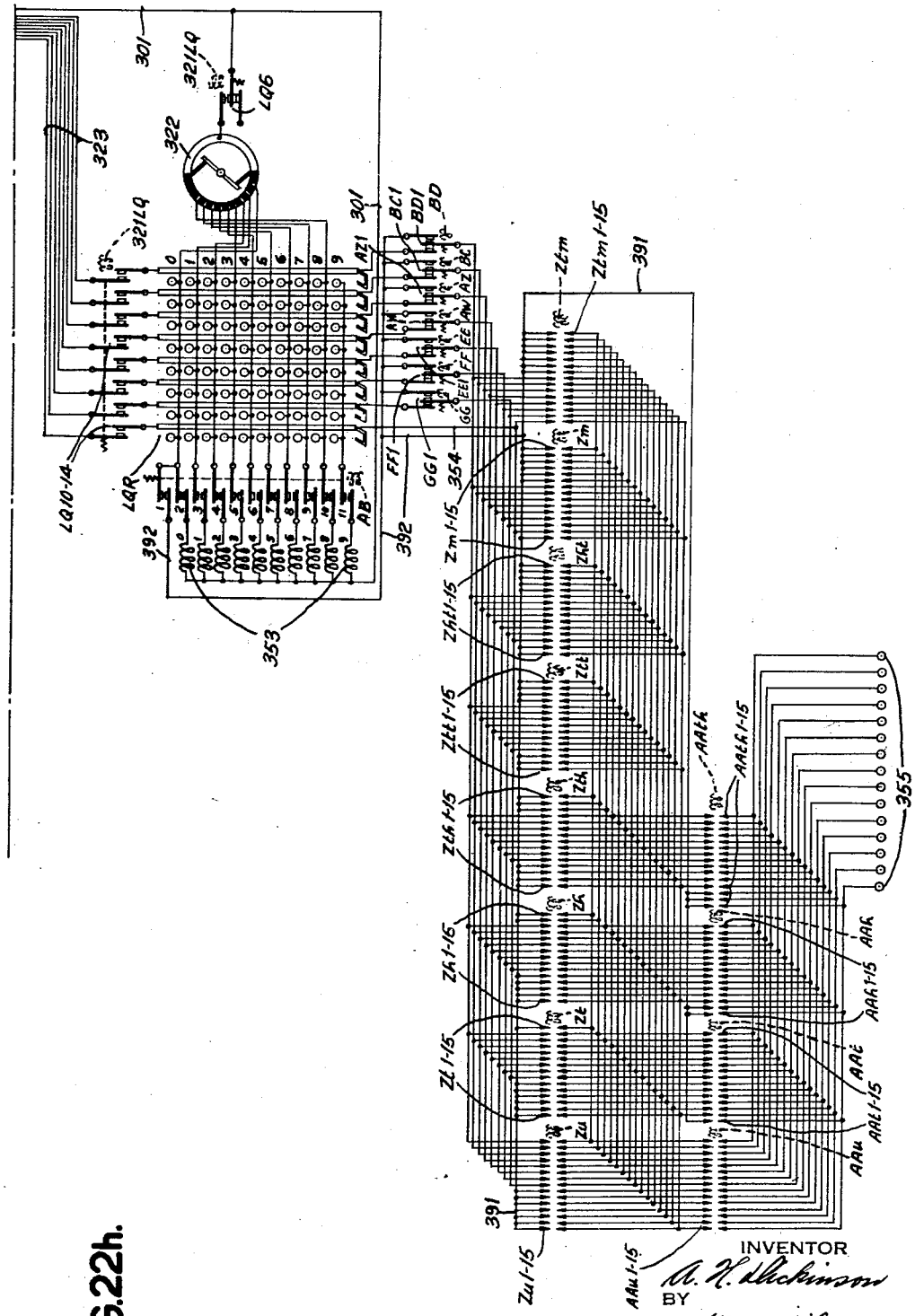

To effect entries of the dividend and divisor amounts, plug connections are established from sockets 309, (Fig. 22e) pertaining to the divisor field to sockets 311 (Fig. 22a) and connections are made between sockets 309 pertaining to the dividend field to sockets 373 (Fig. 22g). For setting up the proper place limiting control, a plug connection is also afforded by the insertible plugboard between socket 389 (Fig. 22e) and one of the sockets 390. As shown on Fig. 24, the machine is plugged to the fourth 390 socket from the left and accordingly, the control is set for a four place digit computing operation.

It will be assumed that a set of record cards are in place in the supply magazine of the machine. The operator then closes switch 300 (Fig. 22d) supplying current to driving motor M. With the main driving motor M in operation, the DC generator marked "D. C.," (Fig. 22d, lower left corner), is set in operation supplying current to ground and D. C. line 301. The operator now depresses the "start" key (Fig. 22d) and a circuit is completed from ground, through the FC3 contacts, through relay contacts F1, through the start key contacts 302 and through relay coil E to line 301. Relay coil E is maintained energized by a stick circuit through relay contacts E1 and cam contacts FC2. With E energized, relay contacts E2 close and a circuit is completed from ground through cam contacts CC29 (Fig. 22d) through the punch control contacts P1 and the E2 contacts now closed, through the JJ2 contacts, through the "Stop" key contacts 303 now closed, through the card feed clutch magnet 304, back through the unshifted D1 contacts to line 301. A card is now fed by the card feeding and handling section of the machine and it is advanced towards the reading brushes in the usual way.

In starting up the machine in a run of cards, the start key must be maintained depressed for two card feed cycles or it may be depressed, released and redepressed. Late in the second machine cycle of the card feed cycle, the card lever contacts 305 (Fig. 22d) close, causing energization of relay coil G. With relay G energized, relay contacts G1 (Fig. 22c) close, affording current supply to the FC6 contacts. These cam contacts, upon closure, permit current to be supplied to the impulse distributor 306 from which current impulses flow to the card feed and card contact roll 307. The usual regular reading brushes 308 are provided, which are connected to the plug sockets 309.

Upon redepression or maintained depression of the start key and with relay coil G energized, relay contacts G4 (Fig. 22d) will become closed and a branch circuit will be also established through the now closed G4 contacts to energize a supplemental clutch magnet 312 (see also Fig. 1). This supplemental clutch magnet causes the clutch of a drive shaft to effect the rotation of the group of XC cams which function once for every three machine cycles.

Figure 11:
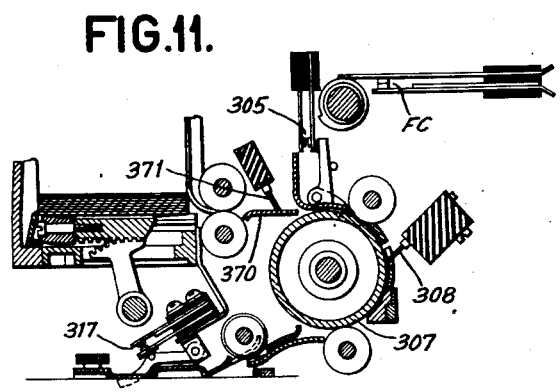
Figure 12:
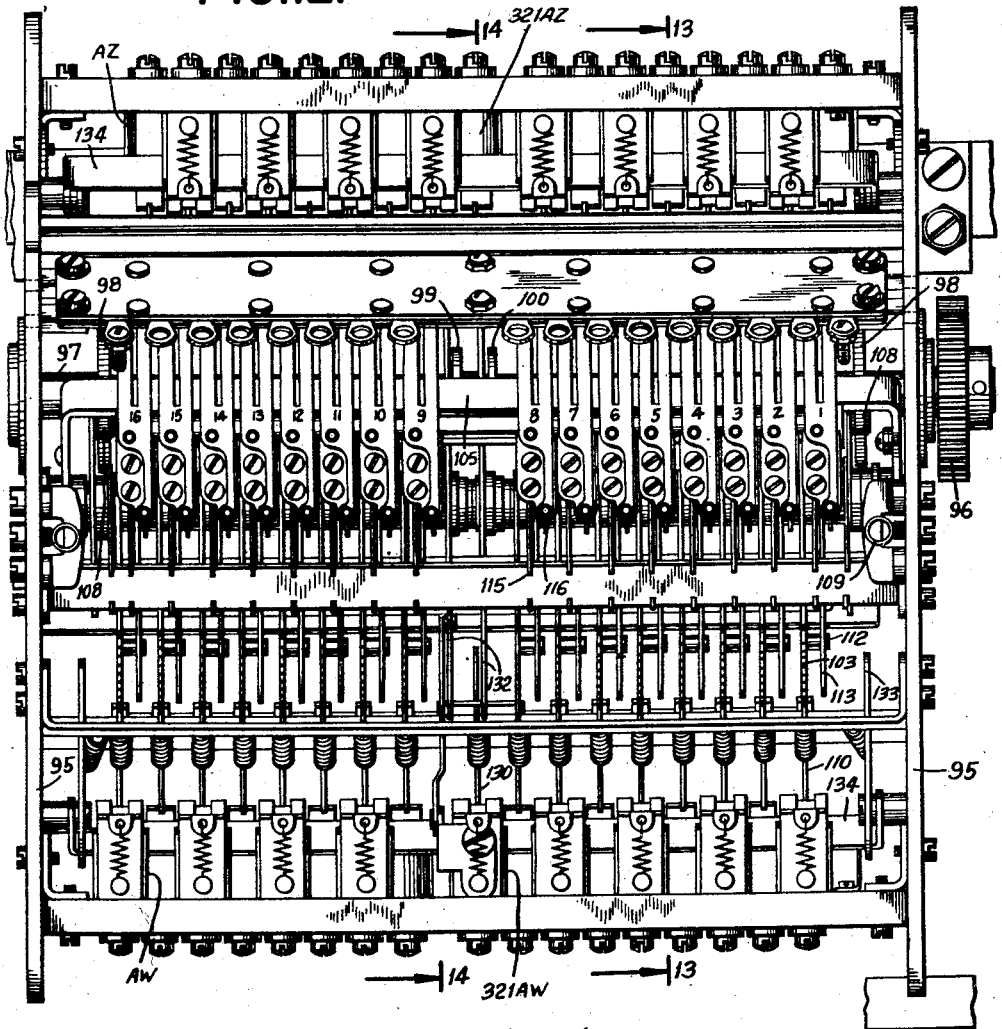
Fig. 12 is a rear elevational view of one of the so-called comparing units of the machine.

During the card feed cycle when the first card is brought to a position about to be traversed by the brushes 308 (Fig. 11) this first card will have traversed the advance presensing brushes 371 (Figs. 11 and 22a). The card will finally come to rest with such advance brushes on the "11" index point, but enroute to this point the brushes will have traversed the zero index point position of the card. During such transit, the brushes 371 presense the presence of zeros to the left of the highest order significant digit of the amount in the dividend and divisor fields.

It will be assumed that the machine is performing the calculation shown in Fig. 32. Here there are two zeros to the left in the dividend (00238649) and one to the left in the divisor (0392). Accordingly, on a transit of the card past the sensing brushes, circuits are established, traced as follows: From line 301 (Fig. 22e), through the G1 contacts now closed, via line 369, through cam contacts FC7 (Fig. 22a) which are closed at the time the zero index point in the card passes the presensing brushes, thence to common contact roll 370, through certain of the brushes 371, through plug connections between sockets 367 and sockets 383, 384, (Fig. 22c). The following electromechanical tripping coils will be energized with the machine computing the problem of Fig. 32; R*th*, N*m* and N*tm*. The energization of R*th* signifies that there is a zero in the thousands order of the divisor field. The other coils which are energized pertain to zeros in the dividend. During the following card feed cycle, the card which has been previously presensed traverses past the main sensing brushes 308 (Figs. 11 and 22e) and the amount of the divisor is entered into the divisor multiple receiving devices ML and the dividend is entered into RD.

During the second card feed cycle, relay coil G, having been energized, will close contacts G2 (Fig. 22c). Current flows from ground through the now closed G2 contacts, through cam contacts FC11, through the R*th*1 contacts in reverse position from that shown, through the non-shifted R*h*1 contacts, through the relay coil T*h* and back to line 301. The energization of relay T*h* causes closure of the group of contacts T*h*2 (Fig. 22a), these contacts remaining closed during the entry portion of this card feed cycle. Also during the entry portion of this cycle, cam contacts XC1 close to energize relay coil K (Fig. 22d). With relay coil K energized, the K1—16 contacts (Fig. 22a) become closed. The divisor amount is entered through the plug connections between sockets 309 and 311 (Fig. 22a), through the now closed T*h*2 contacts, down through the now closed K1—16 contacts. The amount of the divisor is entered into the following multiple receiving devices; ML1—2, ML3—6, ML5, ML7 and ML9. On the circuit diagram, the prefix reference numeral "313" refers to the accumulator magnets of these multiple receiving devices. The ML1—2, ML3—6 and ML4—8 receiving devices are provided with doubling readouts in addition to the usual straight readouts. The other multiple receiving devices are provided with straight readouts only. On the entry portion of the feed cycle as just explained, the amount of the divisor is entered into five of the multiple receiving devices concurrently.

Before describing how multiples of the divisor are built up, it may be stated that the dividend is also entered in the RD accumulator. Considering now the entry shift of the dividend amount, it has been previously explained that relay coil N*m* and N*tm* (Fig. 22c) were energized in the presensing cycle. Such relays when energized trip the N*m*1 and N*tm*1 contacts (Fig. 22c) to a reverse position from that shown. On the cycle when the card is analyzed and the dividend entry is made, a circuit is established from ground through the now closed G2 contacts, through FC11 to and through the tripped N*m*1 and N*tm*1 contacts, through the non-tripped N*ht*1 contacts to the S*ht* relay magnet and back to line 301. Energization of S*ht* (Fig. 22c) will close the S*ht*2 (Fig. 22g) contacts and will establish a shifted entry relation for the dividend entry between sockets 373 and lines 351a, which lines 351a (see Fig. 22f) ultimately lead to the 351 lines, which lead to the 313RD accumulator magnets. By reason of the column shift contacts S*ht*2 (Fig. 22g), the dividend amount will be entered as far to the left as possible in the RD accumulator.

Summarizing, the foregoing includes a column shift arrangement between the lines coming from the reading brushes through the plugboard and the lines which lead to the RD accumulator. Selective column shift will be effected according to the number of zeros preceding the highest order significant digit. For example, if in place of two zeros there were three zeros preceding the highest order significant digit of the dividend, there would be a further column shift, this being effected by closure of the S*tt*2 (Fig. 22g) group of contacts.

As explained above, the divisor and dividend were entered into their respective receiving devices in a shifted to the left relation. Provision must be made for setting up a control which is maintained during subsequent computing operations which will be set up in accordance with the number of columns (one in this example) that the divisor is to be shifted to the left upon entry, and the number of columns that the dividend is to be shifted to the left upon entry (two in this example). These controls are set up in the following manner:

Referring to Fig. 22c, during the first machine cycle of the card feed cycle, cam contacts XC4 close and since relay coil T*h* is energized, relay contacts T*h*1 are closed and an energizing circuit is provided to energize relay coil W*h*. Stick contacts W*h*1 close, providing a stick circuit for W*h* through cam contacts FC5. The energization of W*h* signifies that the divisor has been shifted to the left one column upon entry. Relay S*ht* was also energized as above explained and accordingly upon closure of cam contacts XC4 an energizing circuit is provided through the S*ht*1 contacts to energize relay coil V*ht*. A stick circuit for V*ht* is afforded through stick contacts V*ht*1 and cam contacts FC5. The energization of V*ht* signifies that the dividend was shifted to the left two columns.

During the machine cycle in which entries are made from the card, controls are set up to interrupt the start key circuit and to also maintain the operation of the machine under record card control.

Referring now to Fig. 22d, early (Fig. 20) in the entry cycle, cam contacts FC4 close, energizing relay F. F is maintained energized by a stick circuit through contacts F1 and cam contacts FC3. The shift of the F1 contacts cuts off the circuit to the start key contacts 302. Energization of F closes contacts F2 to maintain a stick circuit for relay coils F and G either through the FC3 contacts or the card lever contacts 305.

After the foregoing operations are effected and during the following machine cycles which ensue, multiples of the divisor amount are built up on the various ML devices and operations for this buildup will be later described in detail.

It should be mentioned that during the second half of a card feed cycle there is a reset of the N—R setup unit. Late in the first half of the card feed cycle, cam contacts XC5 close (Fig. 22d) and a circuit is completed from ground, through the reset clutch magnet 321N—R, to line 301. Energization of 321N—R releases the one revolution clutch (see Fig. 1a) so that any previously tripped N1 and R1 contacts may be latched up in order that they may again be tripped near the end of the card feed cycle when presensing of a following record card is effected.

Building up of multiples

It has been previously explained that in the entry cycle, the divisor amount was entered into ML1—2, ML3—6, ML5, ML7 and ML9. In the machine cycle following the entry cycle, there occurs the first step of building up of multiples. As previously stated, the ML1—2 device is provided with a doubling readout. This is designated MLR1—2 on Fig. 22b. During the second machine cycle of the card feed cycle, cam contacts XC2 (Fig. 22d) close, energizing relay coil L. With relay coil L energized, relay contacts L1—20 (Fig. 22a) close and current supply is afforded for the adding emitter 314 as follows: From line 301 (Fig. 22b), through contacts MM1, BB28 and ML19 in the position shown, thence to the emitter 314. From emitter 314, the impulses flow over to the transverse busses of the doubling section of MLR1—2, down through the piloting section of this readout and out via a group of lines generally designated 315. From these lines, the impulses flow down through the L1—20 contacts (Fig. 22a) which are now closed and ultimately reach the 313 magnets of the ML3—6, ML4—8, ML5 and ML9 accumulators or multiple receiving devices. This operation will have completed the building up of the 3 multiple in the ML3—6.

In the following machine cycle, the cam contacts XC3 (Fig. 22d) close, energizing relay coil M and causing closure of contacts M1—20 (Fig. 22a). With the emitter 314 in operation, the times 2 multiple of the divisor is read out from ML1—2 and flows via lines 315 and through the M1—20 contacts to the 313 magnets of the ML4—8 and ML5 accumulators. This will have completed the setting up of the 4 and 5 multiples on these receiving devices. During the same cycle in which these entries are being made, the 6 multiple of the divisor is read out from the doubling readout section from ML3—6 and such 6 multiple flows via lines 316 (Figs. 22b and 22a) through the M11—20 contacts and finally reaches the 313 magnets of the ML7 and ML9 receiving devices. This operation will have completed the setting up of the 9 multiple on ML9 and the setting up of the 7 multiple on ML7. The multiple building up operations are now complete.

During the second card feed cycle, the record card from which the terms were read, is advanced to the punch tray in the usual way. Upon reaching this tray, the contacts 317 close (Fig. 22d) to energize relay coil D. Upon energization of D, the D1 contacts shift to reverse position, cutting off current supply from the card feed clutch magnet 304 and providing current supply for the punch rack trip magnet 318 upon closure of cam contacts CC1 with contacts P3 and relay contacts B1 closed. Relay contacts B1 become closed upon energization of relay coil B which occurs upon closure of the customary beyond the last column punch contacts P5. With punch rack trip magnet 318 energized, contacts 319 become closed and remain latched closed in the customary manner by latch 320 (Fig. 22d). Current supply is then provided for the punch driving motor PM and endwise card feed occurs in the usual way to feed the card to a predetermined position in the punch.

LQ reset

With relay coils B and D energized in the manner previously explained, relay contacts B2 and D2 (Fig. 22e) become closed. Upon closure of cam contacts CC3, current will flow from the 301 line through the now closed B2 contacts, the HH2 contacts now closed, the D2 contacts now closed, to and through the 321LQ reset relay coil to ground. Reset will then be effected of the LQ accumulator.

The present machine employs electric reset and provision is accordingly made to maintain the 321LQ relay coil energized during the reset cycle. This is provided for by stick contacts LQ11, such contacts being in a stick circuit including cam contacts CC5.

Upon energization of the LQ relay, contacts LQ6, LQ10—14 (Fig. 22h) and LQ5 (Fig. 22f) shift to reverse position from that shown. With LQ6 (Fig. 22h) in reverse position, current supply is afforded to an emitter 322 which is wired in a nines complementary manner to the LQR readout. Complemental impulses representative of the nines complement of the amount standing in LQ flow through the now shifted LQ10—14 contacts, through the set of lines generally designated 323 to the 313LQ accumulator magnets and back to ground (see also Fig. 22f). By thus introducing the nines complement of the amount standing in LQ the accumulator elements are restored to a 9 position. To bring the accumulator to zero from the all 9 position, an elusive 1 is entered in the units order at the carry time in the cycle. This entry is provided through the contacts LQ5 which are closed in the manner previously explained. This impulse is supplied in the following manner: From line 301, through cam contacts CC16, via line 324, through the LQ5 contacts, through the normal carry relay contacts AV39 controlled by relay coil AV (Fig. 22d) down to the units order of the 313LQ magnets. The units order is thus advanced one step and the electric transfer devices of the accumulator cause advance of all the other higher orders one step.

It may be explained that as long as the machine is operating, cam contacts CC2 (Fig. 22d) close once each machine cycle at the carry time in the operation of the accumulators. Such closure of cam contacts CC2 energizes relay coil AV. The energization of coil AV closes contacts AV3—19, AV44—55 (Fig. 22a), AV20—23 and AV32—35, AV24—27, AV36—39 (Fig. 22f), which are respectively associated with the ML, RD, and LQ accumulators. Since coil AV becomes energized once each machine cycle, the aforementioned relay contacts thus close at the carry time. The closure of these contacts permits the electric carry devices to be effective for performing carry operations whenever they are required in their related accumulators.

During LQ reset, provision is made to prevent repetition of such reset. This repeat reset preventing means is provided for as follows: During LQ reset, the LQ8 contacts are closed (Fig. 22d). Accordingly, when cam contacts CC6 close, a circuit is provided from ground, through the LQ8 contacts, through CC6, through relay coil HH. Relay coil HH becoming energized, establishes its stick circuit through contacts HH1 and the punch controlled contacts P2 now closed. On Fig. 22e, the relay contacts HH2 open and thus interrupt the reset initiating circuit to 321LQ.

Initiation of computing operations

Computing operations of the machine are initiated by LQ reset (see Fig. 23). From the LQ8 contacts (Fig. 22d), a branch circuit extends to contacts CC7 and upon closure of these cam contacts, relay coil JJ is energized, relay contacts H5 being now closed. JJ once being energized, is maintained energized by a stick circuit through contacts JJ1, through the reset contacts RD9 and back to ground. Coil JJ is the computing initiating control.

Also upon LQ reset the LQ15 contacts (Fig. 22e) are closed. Accordingly, current will be supplied through cam contacts CC17, through LQ15 to the divisor reset coils 321AZ in the comparing units (see Fig 14). This will release all of the divisor side sectors and allow them to be restored so as to be in position to receive a setting of the divisor multiples thereon.

The machine is now ready to compare the comparison portion of the dividend with all of the divisor multiples. In general, this is effected by reading out a comparison portion of the dividend from the RDR device, setting such portion of the dividend up on one side of all sections of the comparing units and at the same time reading out from the multiple readouts the various divisor multiples, each of which multiples becomes set up on one section on the other side of the comparing units. This operation will now be traced on the circuit diagram.

A comparing cycle is initiated by the energization of relay coil LL (Fig. 22e) which becomes energized in the following manner. As previously explained, the computing initiating relay JJ was energized upon LQ reset. Energization of such relay closes contacts JJ3 (Fig. 22e). A circuit is completed from line 301 (Fig. 22e), through the CC9 contacts, and through all of the 9Cu1, 8Cu1, etc., transfer contacts now in the position shown and finally through the 1Cu1 contacts, through the JJ3 contacts now closed, through the LL relay coil and back to ground. LL once energized is provided with a stick circuit extending back to line 301 through stick contacts LL1 and cam contacts CC13. After the foregoing stick circuit is established, cam contacts CC14 close and establish a circuit through the non-shifted H2 contacts to energize magnet 340SB of the SB stepping switch. With magnet 340SB energized, the four switch arms SB of this relay (Fig. 22e, top) are stepped to the "first" contact position. Such stepping switch may be of the general type shown in U. S. patent to Bohlman, No. 1,569,450.

Shortly after the four switch arms of the stepping relay have advanced to this position, a circuit is completed from line 301, through the H4 contacts now closed, through cam contacts CC8, through one of the switch arms of the stepping relay, through the CSa column shift relay coil and back to ground. Another circuit is established through the CC11 contacts, through the LL2 contacts now closed, through another SB stepping relay switch arm, through the BB relay coil and back to ground. A branch circuit is also established by still another switch arm SB to energize relay coil DD. With coils BB and DD energized, they are maintained energized by their respective stick contacts BB29 and DD1, the stick circuit extending back to line through cam contacts CC10.

It may be explained that column shift relay CSa and relay coil DD cooperate to control the readout of the dividend comparison portion from RDR and contacts controlled by the BB relay are utilized to control the readout of the various divisor multiples from the MLR readout devices.

The manner in which a comparison portion of the dividend is set up on the comparing units will now be described. It will be understood that the comparison portion of the dividend includes a selected number of columns. The number of columns selected is determined by the CSa relay. Referring to Fig. 22f, a circuit is completed from line 301, via wire 347 to and through the now shifted DD9 contacts, to an add emitter 348. With such emitter in circuit, impulses are emitted through RDR, through the non-shifted RD1—4 and 12—15 contacts, via a set of lines 385, through the now shifted DD5—8, DD15—18 contacts, through the now closed CSa1—4 contacts, via lines 386, through the shifted DD2—4, DD19—20 contacts, via lines 387 (see also Fig. 22c) and to the dividend side comparing magnets generally designated 1AW, 2AW, etc.

It will be understood that the comparison portion of the dividend is set up in multiple in the comparing units, that is to say, there are nine identical setups, of the comparison portion of the dividend in order that there can be comparing between each setup and nine different divisor multiples. In the typical problem under consideration, the comparison portion of the dividend which was so set up is the amount of 2386 (see Fig. 32). The setup of the multiples of the divisor on the other side of the comparing unit sections will now be described.

It has been previously explained how relay coil BB (Fig. 22e) becomes energized. With such relay coil energized all of the contacts BB1—27 and BB31—48 (Fig. 22b) become closed. In addition, the BB28 contacts shift to a reverse position. Add emitter 314 will be placed in circuit in the following manner: From line 301 to the non-shifted MM1 contacts, through the shifted BB28 contacts, through the non-shifted ML19 contacts, to the add emitter 314. Such add emitter will emit impulses to and through all of the MLR readout devices and the multiple amounts available on such readouts will be individually transmitted through the now closed BB1—27 and BB31—48 contacts, to the various divisor multiple comparing magnets 1AZ, 2AZ, 3AZ, etc. It will be understood that the divisor multiple side of the comparing units will receive settings of the different divisor multiples. The comparing units operate in the manner previously explained to make suitable settings of the brushes upon these comparing commutators.

Having entered both the dividend comparison portion in a multiple manner into the comparing units and having entered the various multiples of the divisor in the other side of such comparing units, the brush devices of the comparing units receive their settings, in the manner previously explained, to indicate a greater than, an equal to or a less than condition. As shown in Fig. 22c, the comparing unit commutators are in sections, one section being provided for each multiple.

Referring to Fig. 22c top, it will be noted that the comparing unit commutators are shown as sectionalized one for each multiple. For each section there is an associated relay coil such as 9CU for a 9 multiple, an 8CU for an 8 multiple and so on. The brush action of the comparing devices is adapted to prevent energization of all magnets relating to multiples which are higher than the comparison portion of the dividend and to permit energization of magnets related to multiples equal to or less than the comparison portion of the dividend.

Referring to Fig. 32, it will be noted that, upon the comparison of the comparison portion of the dividend 2386 with all of the divisor multiples, the comparison portion of the dividend will be found to be less than any of the multiples, the one multiple 3920 being the only one which is the nearest. This indicates an initial "no go" condition when a first comparison is met.

"No go" conditions on dividing

For such "no go" condition there is no multiple deducting operation from the dividend amount standing in the RD accumulator and such condition means that the quotient digit for such place is zero. Since it has been found that no multiple of the divisor is divisible into the comparison portion of the dividend, the first quotient digit obtained will be zero. The initiating circuit for the entry control magnet 313LQ at the extreme left would normally be for the first quotient digit through the relay contacts CSa6. In view of the fact that no impulse is transmitted through such contacts to the highest order 313LQ accumulator control magnet, the latter will remain deenergized and its related accumulator wheel will remain at zero for the problem assumed. The machine then continues for further comparing operations so as to determine the next quotient digit.

During the first comparing cycle in which a "no go" condition was detected, relay coil LL (Fig. 22e) again became energized in the manner described above. Such coil is maintained energized by a stick contact through relay contacts LL1 and cam contacts CC13. Shortly after LL is energized, upon closure of cam contacts CC14, a circuit is completed through the H2 contacts in the position shown to energize stepping switch magnet 340SB. Energization of this stepping switch magnet advances the switch arms of the stepping switch SB to the second contact position. With the stepping switch arms on their second contact position, the following operations ensue. Relay coil CSb becomes energized upon closure of cam contacts CC8. Relay coil DD becomes energized upon closure of cam contacts CC11, the circuit being completed through the now closed relay contacts LL2. At the time when relay coil DD is energized, relay coil BB is not energized under this condition because there is no wiring to relay coil BB from the second contact of the controlling stepping switch arm. It will be recalled that the contacts of relay coil BB were initially used to effect the entry of the devisor multiples into the comparing devices. With this phase of operation, the devisor multiples remain in the comparing devices and do not have to be reset therein.

It may be mentioned here that at the end of each comparing operation the dividend side of the comparing units are restored to zero so that they can receive a new comparison portion. Such restoration is effected under the control of cam contacts CC9 (Fig. 22e) which provide energizing circuits for the 321AW reset coils.

Referring now to Fig. 32, the machine has now reached a stage of operation in which it is ready to pick out a second dividend comparison portion for comparison with divisor multiples. The second comparison portion which is to be selected comprises the digits 23864 (Fig. 32). Such amount is selected for readout from RDR by means of contacts CSb1—5 (Fig. 22f) which became closed upon energization of CSb effected as previously described. The circuit need not be traced in detail since it is substantially the same as previously traced to provide for the entry of the previous comparison portion into the dividend side of the comparing units. The ultimate effect is to set up 23864 upon the various comparing units by the proper timed energization of coils 1AW, 2AW, etc. (Fig. 22c).

Referring again to Fig. 32, it will be noted that the 1, 2, 3, 4, 5 and 6 multiples of the divisor are all less than the comparison portion of the dividend, i. e., 23864. The 7, 8 and 9 multiples are all greater than this amount. With this relation of amounts, the 1CU to 6CU coils (Fig. 22c) become energized and the 7CU, 8CU to 9CU coils remain deenergized. The energizing circuit for relay coils 1CU to 6CU inclusive is traced as follows:

Referring to Fig. 22c, a circuit is completed from line through cam contacts CC12, through relay contacts DD22 now closed, through the commutator strips 122 of the comparing units out via brushes 117 of these comparing units, and through the respective 1CU to 6CU coils inclusive and back to ground.

It may be explained that on a comparing cycle which takes a single machine cycle, the setup of the comparison portion of the dividend and all of the divisor multiples is made during the first portion of a comparing cycle. Immediately after the setup is made and in the same machine cycle, testing and comparing is effected. All testing is done concurrently for all multiples.

Referring now to Fig. 22e, the energization of coils 1CU to 6CU inclusive, will have shifted relay contacts 1CU1 to 6CU1, all inclusive, all to reverse position from that shown and upon closure of CC9 current flows through the non-shifted 7CU1 to 9CU1 contacts and through the shifted 6CU1 contacts to energize the 6X multiple selecting relay and relay MM. 6X is maintained energized by a stick circuit through 6X1 and cam contacts CC15. It may be mentioned that the 6X relay coil is energized in one machine cycle just after the commutator test is made and such relay is maintained energized throughout a portion of the next machine cycle to select the 6 multiple which is to be read out from the MLR6 readout and which multiple is to be subtracted from the dividend comparison portion.

The 6X multiple selecting relay also selects a related quotient digit for entry into the quotient receiving device LQ. Relay coil MM is maintained energized as long as the 6X coil is maintained energized, being in circuit therewith.

Previously when subtractive entries were made for resetting purposes, the elusive 1 which was introduced into the accumulator to bring the all 9 setting of the accumulator wheels to a zero setting was introduced after the complementary entry. In subtracting the divisor multiple, however, the elusive 1 entry is made during a comparing cycle. (See Fig. 32). In this connection it is to be noted that such elusive 1 is only introduced into the RD accumulator in the event that a multiple is to be subtractively introduced into such accumulator in the following cycle. If no such multiple is to be introduced, the entry of such elusive 1 in the comparing cycle is suppressed.

At the carry time in the comparing cycle, the carry impulse flows from line 324 (Fig. 22f) through the now closed MM2 contacts, through the CSb9 contacts now in shifted position, to and through the 313RD accumulator magnet in the thousands order. It may be explained that the order in which such entry is made is selected under control of the CS coils, in this instance, by the CSb9 contacts. Such carry impulse for subsequent steps of the computation will be introduced into other orders.

It has been explained that if there was no going multiple for any given comparison portion of the dividend that no elusive 1 entry would be made. Such entry is suppressed because of the fact that, in the event that no going multiple is found on test, none of the X magnets will be energized because none of the ICU to 9CU relays will be energized. With no X coil energized, there will be no energization of coil MM and accordingly with MM deenergized the MM2 contacts will remain open and no elusive 1 entry can be effected. On a comparing cycle with a relay coil such as 6CU energized, the energizing circuit to coil LL (Fig. 22e) will be interrupted, since a shift of contacts 6CU1 cut off the circuit.

Unless LL is energized, it is impossible to energize the stepping switch magnet SB. All of the SB switch arms remain on their second contact position and inasmuch as contacts LL2 are open, even though cam contacts CC11 close, there will be no energization of either BB or DD. However, relay coil CSb will be energized again under the control of CC8 on the next machine cycle following the above described comparing cycle. Accordingly, the CSb1—5 contacts (Fig. 22f) will be again closed on the following machine cycle after the comparing cycle. In such cycle, the relay MM is maintained energized as explained before. Accordingly, relay contacts MM1 (Fig. 22b) will shift to reverse position from that shown and a circuit will be established from line through the MM1 contacts in shifted position to the subtract emitter 344.

Such emitter will emit nines complemental impulses through the MLR6 readout only. Impulses flow out of this readout, through the 6X2—6 contacts which are maintained closed by the energization of 6X during this cycle. Nines complementary impulses representative of the nines complement of 23520, i. e., 76479, flow over the lines 333 (Figs. 22b, 22f) through the contacts DD2—4, DD19—20, in the position shown, over the lines 386, through the now closed CSb1—5 contacts, through the non-shifted DD5—8 and 15—18 contacts and into the proper columnar orders of the RD accumulator energizing the proper of the 313RD magnets. This operation will deduct the amount of the six multiple –23520– from the comparison portion of the dividend in this accumulator (see Fig. 32). It will be recalled that the elusive 1 entry into this accumulator has been previously made and that the regular transfer mechanism of the accumulator will provide for transfer to higher orders when required.

*Entry of quotient digit*

With the multiple selecting relay coil 6X energized, a supplemental contact 6X7 (Fig. 22f) will be closed. The DD9 and the RD6 contacts are now in the position shown and accordingly add emitter 348 is in circuit. A "6" impulse is emitted through the 6 bus of RDR, through the now closed 6X7 contacts, through the CSb6 contacts now closed to the second from the left accumulator magnet of LQ. This will enter the quotient digit of 6 in such accumulator.

On the foregoing quotient entering and subtracting cycle, inasmuch as the DD relay coil was not energized, contacts DD22 (Fig. 22c) are in open position. Accordingly, even if CC12 contacts close there will be no energization of any of the CU relays. Accordingly, with none of such coils energized the ICU1, the 2CU1, etc., contacts of Fig. 22e remain in the position shown and upon closure of CC9 current supply is afforded through the JJ3 (Fig. 22e) contacts to energize relay coil LL. Relay coil LL when energized will close its stick contacts as before described and there will be another energization of stepping relay coil 340SB under the control of contacts CC14. Accordingly, switch arms of SB will step to the third contact position.

After comparison is made with one dividend comparison portion at the time the multiple selecting relays are energized under control of contacts CC9 a supplemental circuit is established through coils 321AW to ground. These coils are the reset coils of the comparing unit pertaining to the comparison portion of the dividend (see Fig. 14). With such coils energized, the dividend comparison side of the comparing units becomes restored so that a new dividend comparison portion can be introduced therein. It will be understood that the divisor multiple side of the comparing unit retains the divisor multiples during all deducting and quotient entering operations.

Referring to Fig. 32, the RD accumulator now has standing in it the remainder amount of 00344900. There is now to be another comparison operation and with such comparison operation there is a different comparison portion of the dividend which is selected for comparison. There must, accordingly, be a column shift to take a different comparison portion of the dividend from the RD receiving device.

It has been previously explained how the SB stepping switch was brought to the third contact position. It was also explained that the relay coil LL was energized. With relay coil LL energized relay contacts LL2 (Fig. 22e) are closed and accordingly upon closure of cam contacts CC11 a circuit is completed through a switch arm of the stepping switch to energize relay coil DD. It will be noted that there is no energization of relay coil BB because the third contact of the stepping switch and those thereafter are not wired to relay coil BB.

Following energization of DD, cam contacts CC8 close and a circuit is established to energize column shift coil CSc. With coil CSc and relay coil DD energized, their associated contacts shift to reverse position.

Referring to Fig. 22f, with relay coil CSc energized, contacts CSc1—5 close and there is a new readout relation established with RDR. The readout relation is now such that 03449 may be read out from RDR. As before, the add emitter 348 emits impulses through RDR and such impulses flow to the various 1AW, 2AW, etc., comparing unit magnets. This operation will have set up a new comparison portion of the dividend, viz. 03449 upon the dividend comparing side of the comparing units. The divisor multiples still remain set up on the divisor side of the comparison units and when the further comparison is effected, the comparison commutators and circuits of the comparing units detect that a "no go" condition again exists because 03449 is less than any of the divisor multiples (see Fig. 32).

As previously stated on a "no go" comparing condition on checking since the related multiple is zero, there is no subtractive entry from the RD accumulator and then a further comparing operation takes place in the manner previously described and which need not be redescribed in detail.

As previously stated, the relay coil LL (Fig. 22e) is energized during a comparing cycle and such coil is maintained energized by a stick circuit through relay contacts LL1 and cam contacts CC13. Shortly after relay coil LL is energized, upon the closure of cam contacts CC14, a circuit is completed through the H2 contacts in the position shown to energize the stepping switch magnet 340SB. Energization of this stepping switch magnet then advances the switch arms SB to their fourth contact position and the positioning of the arm to the fourth contact position causes the energization of the relay coil CSd and such coil is energized upon the closure of cam contacts CC8.

The operation of the column shift relay coil CSd will cause a new comparison portion of the dividend to be selected and in the comparing operation now described, the comparison portion represents the value 34490. This value being entered upon the dividend side of the comparing devices is compared with all of the multiples of the divisor and during the operation of the comparing devices, it is determined that the 1 to 8 multiples are less than the comparison portion of the dividend and that the 9 multiple of the divisor is greater than the comparison portion of the dividend. With this relation, coils 1CU to 8CU will have been energized and shift their contacts 1CU1 to 8CU1 (Fig. 22e) and since relay coil 9CU is deenergized, its relay contacts 9CU1 are unshifted. Therefore, upon the closure of cam contacts CC9, relay coil 8X will be energized. This relay coil is the coil which effects the quotient entry in the LQ accumulator and the subtractive entry of the selected 8 multiple of the divisor in the RD accumulator. With this relay coil energized, its contacts 8X7 (Fig. 22f) will be closed so as to effect the entry of "8" in the fourth order from the left of the LQ accumulator. This is added to the "600" already thereon and the LQ accumulator now represents "608."

In the manner previously described, the selected 8 divisor multiple is subtracted from the RDR accumulator as is outlined in Fig. 32. This entry is effected during the cycle subsequent to the comparing cycle and is effected by the emitter 314 (Fig. 22b) which directs impulses under control of the MLR8 readout, through the 8X2—6 contacts now closed, and through the 313RD accumulator magnets (Fig. 22f). This entry circuit has been previously traced in detail.

Termination of calculating operations on dividing take place under control of place limiting devices now to be described in detail.

Referring to Fig. 32, it will be noted that in the typical computation there illustrated, there is an entry of −00005− in the fifth from the left quotient place. It will be assumed that the calculation being effected does not involve such "5" entry. The computation is then completed and termination of the computation is controlled by the place limiting device which is provided for this purpose.

*Place limiting device*

Referring to Fig. 22e, and Fig. 24, the insertible plugboard will be provided with a plug connection from socket 389 to the fourth socket 390 from the left. The fourth socket from the left is plugged up because the computation is to be carried to four quotient places. If the computation was to be carried to further quotient places, the fifth or sixth socket 390, etc., from the left would be plugged up. During the multiple deducting cycle just described, relay coil DD will be deenergized and accordingly the DD22 contacts (Fig. 22c) remain in open position. There will, accordingly, be no energization of any of the CU relay coils. With none of such relay coils energized, the 1CU1 to 9CU1 contacts (Fig. 22e) will remain in the position shown so that upon closure of cam contacts CC9, relay coil LL will become energized. With such relay coil LL energized, the relay contacts LL3 will be closed and upon closure of CC17, the circuit will be completed through LL3, through the switch arm of the stepping switch now still in the fourth contact position, through the J6 contacts in the position shown, through the plug connection from socket 390 to socket 389 to energize relay coil H. H being energized, closes its stick contacts H1 and the stick circuit is completed back to line through the RD11 contacts which are in the position shown, to line 301. The opening of this stick circuit is timed by contacts CC36 which are shunted across RD11.

The energization of relay coil H will have shifted relay contacts H2 (Fig. 22e) to a reverse position from that shown at a time prior to the closure of cam contacts CC14. Accordingly, with such CC14 contacts closed, a circuit is completed through the stick contacts of LL1 of LL, through the CC14 contacts, to the release magnet 341SB of the stepping switch. With this operation, due to the shift of contacts H2, the stepping switch magnet 340SB will be out of circuit. Energization of the 341SB release magnet will release the stepping switch and allow it to return to normal home position, i. e., the position shown in the circuit diagram. It may be mentioned that no circuits are inadvertently established by the switch arms on SB on restoration because on restoration the H4 relay contacts are in open position. The foregoing restoration of the stepping switch and opening of contacts H4 terminates further energization of the CS magnets, the BB or the DD magnets.

*Quotient recording*

The machine has now reached the stage in its operation in which it is ready to record the quotient upon the record. The various ML multiple receiving accumulators can now be reset and the RD device can also be reset. Before recording is effected there must be a change in the readout relation between LQR and the punch, according to the entry shift which was previously made upon entry of the divisor and dividend amounts. Reset of the ML devices is brought about in the following manner. Energization of relay coil H (Fig. 22e) in the manner previously explained will have caused closure of relay contacts H3 (Fig. 22e). Upon closure of CC3, a circuit is established from line 301, through contacts H3 now closed, to and through the 321ML reset relay coil to ground. A branch circuit is also completed to and through the 321RD reset relay coil and back to ground. Energization of 321ML and the 321RD reset coils will bring about electric reset of the corresponding accumulators, their energization being maintained by their respective stick contacts ML25 and RD10, and cam contacts CC5 back to line 301. The detailed reset circuits will now be traced.

Upon energization of 321ML, the ML1—18, 27—38 contacts (Fig. 22a) and the ML19 contacts (Fig. 22b) shift to reverse position from that shown. The shift of contacts ML19 place the nines complementary emitter 344 in circuit and nines complementary impulses are emitted from this emitter through the straight readout sections of the MLR1—2, the MLR3—6, MLR4—8, MLR5, MLR7, MLR9. Considering the MLR9 readout, the nines complementary impulses of the amount standing in the related receiving device flows through it and via a group of lines generally designated 345 (Figs. 22b and 22a), through the ML33—37 contacts to the 313ML9 accumulator magnets and back to ground. By such nines complementary impulses, the ML9 receiving device is brought to an all nine position. The closure of contacts ML38 allows a circuit to be established to the carry impulse line 324, the circuit being completed through the now closed carry relay contacts AV55 to the units order 313ML9 accumulator magnet. This provides for an entry of one in the units order of this accumulator and thereafter the regular electric transfer contacts provide for carries into higher orders. This resets the ML9 receiving device to zero. The other multiple receiving devices are reset in a generally similar manner and individual reset circuits need not be traced therefor.

In order to reset the RD accumulator, the following control circuits are provided. Energization of 321RD as above explained, causes the shift of contacts RD6 (Fig. 22f) and a shift of contacts RD1—4 and 12—15. With such contacts shifted a circuit is established from line 301 (Fig. 22f) via wire 347 to and through the DD9 contacts in the position shown, through the now shifted RD6 contacts to emitter 350. Emitter 350 is a nines complementary emitter and with current supplied to it, nines complementary impulses are emitted through RDR and through the now shifted RD1—4 and 12—15 contacts to a set of lines generally designated 351. The impulses flow via these lines to the 313RD accumulator magnets and advance the accumulator elements to all nine position. Thereafter a carry impulse is introduced into the units order of the accumulator through the closed RD5 and AV35 contacts which establish a circuit from the carry impulse line 324 to the 313RD accumulator magnet in the units order. The customary electric transfer contacts in the accumulator afford carry into the higher orders of the accumulator so that all accumulator elements are brought back to a zero status.

The energization of the 321RD relay also serves to deenergize the computing initiating relay coil JJ as follows: Opening of contacts RD9 (Fig. 22d) breaks the stick circuit for coil JJ. Actual deenergization of coil JJ is timed by the CC18 cam contacts following the opening of RD9.

On dividing operations, due to a shift in the entry of the divisor and dividend there must be a selected energization of Z and AA coils (Fig. 22c). With the computation under consideration the coils which will be energized on dividing are AA$h$ and Z$ht$. The selected energization of the Z and AA coils is brought about under control of the presensing control, which presensing control, it will be recalled, has effected certain selected energization of W and V relay coils, viz. the W$h$ and V$ht$ relay coils in the example under consideration.

The energization of 321RD (Fig. 22e) brought about as previously explained, will have caused closure of contacts RD7 (Fig. 22c). Upon closure of cam contacts CC4, the circuit is established through the now closed RD7 contacts, through the W$h$2 contacts now closed to energize relay coil AA$h$. There is also an energizing circuit for relay coil Z$ht$ through the V$ht$2 contacts, now closed. It will be recalled that relay coils V$ht$ and W$h$ will have been energized under the presensing control previously described to bring about closure of V$ht$2 and W$h$2, and their maintained closure by contacts FC5 which are closed upon termination of card feed. A branch circuit is also completed through RD7, to line 352, which circuit extends to Fig. 22c and brings about energization of relay coils A and AB in the manner previously explained.

All of the relay coils A, AB, AA$h$, Z$ht$, will be maintained energized through the A1 stick contacts, the circuit extending back to line through the LQ7 contacts, to ground. The opening of this stick is timed to open by contacts CC19 which open after LQ7 open.

Referring to Fig. 22$h$, it will be noted that there is a column shifting arrangement intermediate plug sockets 355, which are sockets which are connected to the punch readout strip sockets 356 (Fig. 22c) and LQR (Fig. 22$h$). Such column shifting arrangement is provided by the multicontacts controlled by the various Z relays and the AA relays. The AA relays are selectively energized according to the entry shift of the divisor upon entry and the Z relay coils are selectively energized according to the entry shift of the dividend upon entry. With relay coils AA$h$ and Z$ht$ energized, there will be a closure of the related contacts AA$h$1—15 and Z$ht$1—15 and the closure of these contacts in combination will establish a readout relation between LQR and the sockets 355 so that there will be a punching not in the extreme left hand field of the record card, but in a field shifted four columns to the right from the extreme left hand field.

It will be assumed that the left hand eight sockets of the group 355 (Fig. 22$h$ bottom) are connected to sockets 356 (Fig. 22c). If the circuits from the four left hand sockets of the 355 group are traced, it will be found that their circuit extends back to a line 391, which line connects to a line 392 and that this circuit is completed back to line 301, through the now closed AB1 and AB2 contacts to and through the zero interposer magnet 353. This will provide for punching four zeros on the record card in columns of the quotient field not controlled by LQR.

Now referring to the fifth socket from the left of the 355 group, it will be noted that this circuit is completed through the AA$h$5 contacts, through the Z$ht$3 contacts, to a line 354 which extends up to the extreme left hand order of LQR. Inasmuch as the brush in this order is standing upon 0, the "0" punch selecting interposer magnet 353 will be energized during the punching operation. If the line from the sixth socket from the left of the 355 sockets be traced, it will be noted that this circuit is completed through the AA$h$6 contacts, through the Z$ht$4 contacts, through the non-shifted GG1 contacts to the second order of LQR from the left. In this order, the brush is standing on the 6 spot so that the line will be completed through AB8 contact to and through the "6" interposer magnet 353.

Referring now to the two sockets 355, which are the seventh and eighth from the left in the group, it will be noted that circuits are completed through AA$h$7—8 and Z$ht$5—6 through the non-shifted FF1 and EE1 contacts to the third and fourth orders of LQR from the left. The brushes in these orders stand at zero and eight, therefore there will be a circuit completed from both orders back to the "0" and "8" interposer punch selecting magnet 353.

The law of operation which the present machine has for controlling shift back upon recording may be expressed by the following formula: The number of columns in which the quotient amount is shifted back to the right upon final recording is determined by the following:

$S_{DD} + (S_{DR} - S'_{DR})$, where $S_{DD}$ = the number of positions, the dividend (DD) is shifted to the left upon entry. This amount of shift may also be taken to be the maximum number of dividend places available in RD less the actual number of dividend places in the dividend amount and where $S_{DR}$ equals the maximum number of available divisor places in the means entry receiving divisor minus one (or 4—1 herein) and where $S'_{DR}$ equals the number of columns, the divisor is shifted to the left upon entry. This number of columns may also be taken to be the number of columns the actual divisor is less than the maximum number of available places in the ML entry receiving devices. Substituting the above values in the formula, we have 2+3—1=4, which is the number of places that the quotient is shifted back to the right upon final recording under the presensing control.

The foregoing description has explained the circuits for selectively reading out amounts to the punch on final recording. Punching occurs successively column by column in the usual way, the control circuits being those just traced in detail for result recording, but it may be mentioned that the return circuit from any plug socket 356 is via the punch readout brush to the common strip of the readout, thence via wire 357 (Fig. 22c), through the usual escapement contacts 358 of the punch, through the stick contacts A1 and thence back to ground. The energization of any interposer magnet 353 (Fig. 22h) closes the interposer controlled punch magnet contacts 359 (Fig. 22c) and energizes the punch magnet 360 in the usual manner. Punching then proceeds in the usual way column by column and eventually the card reaches the beyond last column position and closes P5, energizing coil B. Energization of B closes contacts B1 and energizes the eject magnet 361 of the punch. Card eject then occurs and contacts P3 become closed to condition control circuits for a succeeding computation.

It may be explained that with the present embodiment punching operations occur during a cycle in which not only the reset of the ML and the RD devices is effected, but also during a cycle in which card feed of a succeeding card is effected. In this way operating time is saved since recording operations are overlapped with resetting and card feeding operations. Heretofore in dividing machines such an overlap has not been attained. Such overlap is afforded with the instant arrangement because of the fact that the quotient is contained in the LQ accumulator which receives no entry from the card on a card handling operation. Furthermore, such LQ accumulator can be subsequently reset after controlling quotient punching.

Card feed of a new card is brought about in the cycle which immediately follows the ML and RD reset cycle and such card feeding operation is initiated during the ML and RD reset cycle in the following manner. Upon energization of 321RD (Fig. 22e) contacts RD8 (Fig. 22d) close and upon closure of cam contacts CC20 a circuit is completed through RD8, XC10, to and through relay coil E. Coil E is maintained energized by a stick circuit through E1 and FC2. Energization of relay coil E closes relay contacts E2 to condition the circuit for subsequent energization of card feed clutch magnet 304 and the XC clutch magnet 312. Energization of these two magnets occurs upon closure of cam contacts CC29 (Fig. 22d) which complete a circuit in the manner previously explained.

Inasmuch as a new computation is to follow, provision is made to deenergize the previously energized shift control relays V and W (Fig. 22c). Such deenergization is effected in the beginning of the card feed cycle upon opening of cam contacts FC5 (Fig. 22c) which interrupts the stick circuits to any of the V or W relay coils which have been previously energized. This operation will place these relays in condition to be set up again under the presensing control of the next card. Computations proceed card by card until all computations on all cards are complete. Following the computation of the last card while there is an energization of the card feed clutch magnet 304 (Fig. 22d) there will be no energization of the XC clutch magnet 312 in view of the fact that the relay contacts G4 are now open, these being open because coil G is now deenergized, card lever contacts 305 having opened on such last card condition. This prevents unwanted XC cam contact operations.

Rounding off device

In calculating machines, particularly multiplying machines, rounding off devices have been utilized to carry a particular calculation to the nearest unit in a particular order. This has been accomplished by entering an amount, say 5, in one order to the right of the order which is to be rounded off and which order is the last order to be recorded by punching. In the present machine, rounding off mechanism is also employed but supplemental controls have to be provided in connection with such rounding off for the following reason. Let it be assumed that a computation is to be carried to four quotient places only and that the place limiting devices of the machine are set for such four place quotient. However, if the rounding off feature is employed, the 5 increment must be introduced in an order to the right of the last desired quotient place and if such 5 is introduced into such order then the machine must carry the computation further and terminate the computation not in the last desired quotient place, but in a place or order beyond such last desired place. The place limiting control therefore has to be modified to allow the machine to carry the computation one step or order further than is desired for the last quotient place itself. This change of control brings about and makes necessary a further control. In view of the fact that the machine has computed beyond, say, five orders of quotient digits and in view of the fact that it is only desired to record four orders of quotient digits, provision must be made for preventing recording beyond the last significant quotient place and for entering a zero in such order in which recording of remainder digits is not desired.

The foregoing can best be understood by reference to Fig. 32. In Fig. 32, considering the rounding off or "5" entry, the calculation is there shown as being limited to four places of the quotient. The augmented entry of 5 is placed in an order of LQ just to the right of the order which receives the 8 quotient digit entry which is the fourth quotient place. The computation is then carried on beyond this order and a 7 quotient digit entry is effected in the next order to the right. The 7 added to the 5 gives a result of 12 giving a carryover of one into the next higher order and producing a final quotient amount of 0609. There is, however, a remainder standing in the fifth order of LQ of 2. It is not desired to record the 2, because as regards a quotient result, such 2 is meaningless. Therefore, in recording, provision is made for suppressing the recording of the 2 standing in LQR and for recording in lieu thereof a zero derived from the zero punching source.

In connection with the rounding off feature, it should be further noted that rounding off is of no consequence or utility unless the quotient result is computed to at least two places. Accordingly, if dividing calculations are made to less than two orders, or one order, the machine will not be conditioned to effect an additional computation so that there will not be a five entry. If dividing calculations are made to two or more orders, the additional computation will be made as well as the five entry.

With dividing calculations, the rounded off order of the quiotient may assume a variable column relation on the final record. This will directly depend on the relative magnitude of the entered divisor and dividend and such rounding off column may vary from card to card due to the variable change of the reading out relation in recording the quotient. In short, in dividing, rounding off may occur in a variable final column of the result whereas previously in multiplying, such rounding off column is in a fixed column of the result. In dividing, rounding off is effected in a selected fixed column of the LQ accumulator, but between the LQ accumulator and the punch there is a column shift mechanism so that the ultimate effect on final recording is to vary the column in which rounding off is effected.

To prepare the machine for rounding off operations, the insertible plugboard utilized for such operations will have established as shown in Fig. 24 a plug connection between socket 393 (Fig. 22f) and one of the group of the 394 sockets. The particular one of the 394 sockets which is plugged for the computation on Fig. 32 is the fifth socket from the left because the place limiting device is set for four quotient places. Another plug connection will be established between sockets 395 and 396 (Fig. 22d) which is always made for rounding off operations but only when the place limiting device is set for obtaining more than one quotient place. This latter plug connection will bring about a maintained energization of relay coil J throughout all dividing calculations with rounding off operations.

Referring now to Fig. 22e, with relay coil J energized, relay contacts J3—10 will be in reverse position from that shown and accordingly, with a plug connection between socket 389 and the fourth 390 socket from the left, signifying a four place quotient computation, the machine will not terminate its computing operations with the arm of the stepping switch SB establishing contact with the fourth contact spot, but in contradistinction the machine will continue computation until the switch arm establishes contact with the fifth contact spot. The foregoing control will carry the computations performed by the machine on division to one further cycle beyond that required for the fourth quotient place.

Referring now to Fig. 22e, energization of relay coil J will close the J1 contacts. Such contact closure will place the 340SD stepping switch coil in parallel with the 340SB stepping switch coil so that upon each energization of 340SB there will be an energization of 340SD.

As shown in Fig. 32, the 5 entry is made in the second comparing cycle. Such 5 entry is always made during such comparison cycle. The 5 entry into the selected column of the LQ accumulator is brought about in the following manner. During the cycle mentioned, relay coil CSb becomes energized, closing contacts CSb7 (Fig. 22f). Likewise during the portion of the cycle in which the dividend is being compared, relay coil DD is energized, causing closure of contacts DD11. Cam contacts CC22 are timed to close at the "5" index point in the cycle. Accordingly, a current impulse will flow at such time from line 301, through CSb7, through DD11, through CC22, via plug connection from socket 393, to the selected socket 394 and thence down to the related columnar order of LQ, in this instance, the fifth accumulator magnet from the extreme left. This will enter 5 in such accumulator order during the above mentioned comparison cycle.

According to the rounding off operation as shown in Fig. 32, relay coil H will become energized not in the fourth quotient entry cycle, but in the following or fifth quotient entry cycle. This will be effected by the control which is afforded by relay coil J, J3—10 contacts and the SB stepping relay. By the time the H relay coil has become energized, the quotient digit of 7 (see Fig. 32) will have been entered in the order of LQ which receives the 5 entry. The usual carry will take place and the setting in the fourth left hand order of LQ will be augmented from 8 to 9.

It has been explained heretofore that the stepping relay magnet 340SD will be energized concurrently with the energization of stepping magnet 340SB. Inasmuch as the SB switch steps to the fifth contact position, the SD switch (Fig. 22c) will likewise step to the fifth contact position and place relay coil AW in circuit with line 301. It has been previously explained that under control of contacts RD7 (Fig. 22c) relay coils AAh and Zht (Fig. 22c) and relay coils A and AB (Fig. 22d) were energized to control punching. At the time such relay coils become energized, a circuit is also completed by line 352 and line 353a through relay coil AW, switch SD, to the line 301. Such coil is maintained energized throughout punching operations by the stick circuit extending through contacts A1 as previously explained. With relay coil AW energized, the contacts AW1 (Fig. 22h) will shift to reverse position and with such contacts shifted, the circuit from the common readout segment in the fifth left hand order of LQR will be cut off and such circuit will be completed over to line 392, which, it will be recalled, is a circuit to the zero 353 interposer punch selector magnet. Thus, in lieu of punching a 2, the amount standing in the fifth left hand order of the LQ accumulator, there will be a zero punched on the record card in the related column.

Provision is made to delay release of the SD stepping relay switch arms until after punching is completed in this type of operation. Referring to Fig. 22e, the manner of energization of 321LQ has been previously explained. When such coil becomes energized, a circuit is completed from line 301, cam contacts CC5, LQ11 contacts, through cam contacts CC21, to the 341SD release magnet to ground. Energization of 341SD, however, will release the arms of this stepping switch (Fig. 22c) and allow them to return to home position as shown.

Fig. 29 represents the results of a series of division computations effected by the operations just described with the place limiting and place recording selecting controls. It will be noted that in a series of records, the denominational magnitude of both the dividend and the divisor may vary from card to card and Fig. 29 illustrates this by five different computations. It will be noted that the dividend is shown for eight denominational places and the divisor for four places. In accordance with the denominational magnitude of such factors, there is an entry shift in the manner previously described and this entry shift will ultimately determine the place of recording, thereby recording the quotient digits with respect to the decimal point. In these computations the place limiting devices are assumed to be adjusted to secure a four-place quotient but in view of the rounding off operation, the extra computation determines the next quotient digit to which is added the increment 5, thereby rounding off the quotient digit place in the next order at the left. These additional computations are also illustrated, as well as the addition of the 5 increment, showing the manner in which the quotient digits are rounded off. It is to be also understood that the recording of the quotient digits is derived from LQR (Fig. 22h) but there will be a recording of zeros to the left, dependent upon the denominational magnitude of the divisor and dividend. The actual digit value of the denominational place of the LQ accumulator in which the 5 increment is made is not recorded, but instead thereof there is a recording of a zero in the manner previously described. There are also, of course, additional recordings of zeros to the right of the last quotient digit in the LQ accumulator so as to fill out the columns of the card at the right.

*Division computations controlled by records having recorded thereon quotient digits secured to a selected number of decimal places with the final fixed decimal place rounded off*

In the preceding description, the method of computations for rounding off the final place of the quotient amount has been described in detail and there will now be described another arrangement wherein the quotient amount may be selected to a predetermined number of digits, with decimal recording and with the final decimal place at the right rounded off.

From Fig. 29, it will be noted that the denominational magnitude of dividend and divisor amounts vary from card to card. It will also be recalled that quotient digits will be obtained to the number determined by the place limiting device and while a predetermined number of digits is obtained, the columns in which the computed quotient amount is recorded will vary as is shown in the right hand column of Fig. 29. It will also be observed that the varying positions for quotient recording is determined by and dependent upon the denominational magnitude of the divisor and the dividend and while the place limiting device will select and determine the number of quotient digits computed, it will have no effect over the varying place of quotient recording or enable the computation to be carried out to a predetermined order.

Applying the above to specific problems, it will be noted in Fig. 29 that the rounding off feature is applied to the fourth quotient digit and due to the varying sizes of the dividend and divisor, the correction will be applied at different decimal places. Considering the problem at the top of Fig. 29, it will be noted that in this instance, the correction is applied to the first decimal place. In the second problem, the correction is applied to the units or first order to the left of the decimal point and in the third problem to the tens or second order to the left of the decimal point. The two problems below also indicate how the correction may be applied to different decimal places of the quotient amount. It is evident, therefore, that with the previously described arrangement, the correction may be applied at varying places with regard to the decimal point. Hence, a quotient result in one record may be correct to the nearest ten dollars; another record may be correct to the nearest cents, etc., and while in some accounting procedures this result may be desirable, in other forms of accounting operations it is necessary that the correction should always be applied in the order which is always the same despite the variations of the DD, DR in magnitude. In order to illustrate the wide variations and applications of the mechanism which will subsequently be described, Fig. 30 illustrates three sets of different problems in which the correction is (1) applied to the final decimal place when two decimals are recorded for all quotient amounts, (2) the correction at the final decimal place when three decimals are recorded, and (3) also the correction at the units place which is to the left of the decimal point, although these are merely illustrative and selected examples.

In effecting division computations in which quotient digits are secured for two decimal places, the series of cards controlling the computations may vary in the size of the DD and DR amounts, from card to card. However, once the proper plug connections are made, the automatic place limiting device operates automatically and functions to—

(a) Enter a corrective "5" in the fixed final decimal digit place.

(b) Determine how many quotient digits must be computed.

(c) Terminate dividing computations.

A single problem which is outlined in Figs. 30 and 33 will be used as an explanation of the operation of the machine for securing this specific type of rounding off operation.

The plug connections which are to be made for effecting the entry of the dividend and the divisor are precisely those shown in Fig. 26, plug connections being made between the plug sockets 367 associated with the presensing brushes 371 and the plug sockets 383 for effecting the determination of the entry shift of the divisor, and also between the plug sockets 376 and the plug sockets 384 to effect determination of the entry shift for the dividend. Plug connections are made between the plug sockets 309 and plug sockets 373 for effecting the entry of the dividend in the RD accumulator. Plug connections are also made between the plug sockets 309 and the plug sockets 311 for effecting the entry of the divisor in the ML receiving devices.

It will be recalled that in regular dividing operations, the presensing of the DR and DD causes selective energization of the S and T relays and due to the entry shift of the dividend for four places (see Fig. 33), the S*th* relay (Fig. 22c) will be energized and it will close its S*th*1 contacts to effect the energization of the relay V*th*. This relay in turn closes its V*th*2 contacts to cause the energization of the relay coil Z*th*. Similarly there is an entry shift of the divisor and considering the problem shown in Fig. 33, there will be an entry shift of two places for the divisor which will cause the energization of the relay coil T*t* which, in turn, causes the energization of the relay coil W*t* and the latter, in turn, causes the energization of the relay coil AA*t*. It will also be recalled that coils Z*th* and AA*t*, being energized, close their stick contacts so as to retain the energization of the setup of the relay coils until the next card cycle.

For effecting the operations now being described, additional plug connections are made as shown in Fig. 26. A plug connection is made between the plug sockets 395 and 396 (Fig. 22d) which are always made for rounding off operations. A plug connection is also made between the plug sockets 409 and 410 which are also shown in Fig. 22g, thereby extending the line 301 to certain circuits which will be later described in detail. A plug connection is also made between the plug socket 393 and the plug socket 408, and also a plug connection between the plug sockets 407 and 389. All of the last mentioned plug sockets are shown in Fig. 22f except plug socket 389 which is shown in Fig. 22e.

During regular dividing operations, it will be noted from Fig. 23 that there is a reset of the LQ accumulator and upon such reset the LQ17 contacts (Fig. 22g) are now closed. A circuit will then be completed from the line 301 (Fig. 22g) through the plug connection between the plug sockets 410 and 409, through LQ17 contacts and to a line which is connected to one side of the V*u*4 to V*tm*4 contacts, only one selected contact being closed so as to continue the circuit through one of a series of commutators or emitters 415 to 422, inclusive. The emitter which will be selected, depends upon the particular V relay coil which is energized and is, therefore, dependent upon the entry shift of the dividend. In the problem under consideration, it will be recalled that the relay V*th* is energized so that its contacts V*th*4 will select the emitter 418. The emitters 415 to 422 inclusive, have, for reasons which will be more apparent later on, their live contact points connected to four different lines which are connected to one side of the relay contacts W*u*4 to W*th*4, inclusive. The particular contact of the selected emitter which is to be rendered effective is dependent upon the particular relay coil W energized or the shift of the divisor. In the problem under consideration, the relay coil W*t* is energized and its contacts W*t*4 being closed will be connected to the 5 contact spot of the selected emitter 418. From the common side of the contacts W*u*4 to W*th*4, the circuit continues through the relay coil BG, to the ground. The energization of the relay coil BG, which occurs during the 5 point of the cycle, will cause the closure of its contacts BG2 and a circuit will then be closed through the commutator 306a through the BG2 contacts to the stepping switch coil 340SF. The emitter 306a is adapted to transmit a series of ten impulses at differential times and assuming such emitter is selected by a switch S in the position shown, with contacts BG2 closed at the 5 point in the cycle, the emitter 306a will transmit five additional impulses to the stepping switch coil 340SF, thereby causing its switch arm SF shown at the bottom of Fig. 22f to be moved to the 5 contact making position. The BG relay coil closes its stick contacts BG1, the circuit from the relay coil BG being extended back through such stick contacts and cam contacts CC38 to the line 301. Cam contacts CC38 are closed during the transmission of impulses by emitter 306a. The switch arm SF just described will, of course, remain in its moved position.

Following the LQ reset operation and the positioning of the stepping switch arm SF in the manner just described, dividing computations are initiated as has been described for regular dividing operations. During the second comparison cycle, the column shift coil CS*b* is energized, thereby causing the closure of its contacts CS*b*8 (Fig. 22g); and a circuit will now be established from the line 301 at the plug socket 409, through the relay coil BF, through DD21 contacts now closed, through CS*b*8 relay contacts now closed, and through cam contacts CC37 to the ground. The energization of the relay coil BF will shift its contacts BF1—10 (Fig. 22f). At the 5 time in this cycle a circuit is completed from the line 301, through relay contacts CS*b*7 (Fig. 22f) through DD11 contacts now closed, cam contacts CC22 closed at the 5 time, to the plug socket 393 thence by the plug connection to the socket 408, the circuit is extended through the BF11 shifted contacts to the switch arm SF shown in Fig. 22f.

From Fig. 26, it will be noted that eight left hand plug sockets 406 have plug connections to the corresponding eight plug sockets 394. It will be noted that for simplicity in plugging six left hand sockets 406 are double plug sockets, as is diagrammatically shown in Fig. 22f. Since the switch arm SF is now in contact with the 5 switch point, the circuit will be completed upwardly through the BF5 contacts now shifted to the "6" plug socket 406, thence through the plug connection between this plug socket and the "6" plug socket 394 (sixth from the left in Fig. 22f), thence downwardly to the 313LQ accumulator magnet which is in the sixth order from the left. Thus, the corrective 5 is entered in the sixth left hand order of the LQ accumulator as shown in the outline of the problem in Fig. 33. In all cases, the "5" entry is made in an order of the LQ one unit higher than the numerical position of switch SF.

In the problem under consideration, it is desirable to effect the plug connection between all the sockets 394 and the plug sockets 406 but the entry of the corrective 5 may be effective in any order of the LQ accumulator except the units. The particular order will depend upon the entry shift of the divisor and dividend; and in other words, upon the denominational magnitude of the divisor and dividend amounts.

When cam contacts CC37 open in the second comparing cycle, the relay coil BF will be deenergized and its relay contacts BF1—10 and BF11 will return to the position shown in Fig. 22f.

Thereafter, further dividing operations ensue which consist of pairs of comparing cycles and quotient digit entry cycles and in the problem shown in Fig. 33 the machine continues into operation until six quotient digits have been determined. In the manner previously described, the switch arm SB (Fig. 22e) will be positioned step by step concomitantly with the division computing operations and upon the determination of the sixth quotient digit and its entry, the switch SB will be in contact with the 6 contact point. A series of plug connections are made from the eight sockets 390 and corresponding ones of a series of plug sockets 423, the particular sockets 423 which are utilized for the plug connection being the eight left hand plug sockets from the left as shown in Fig. 22f. These plug connections are also shown in Fig. 26. Since the particular problem under consideration involves a rounding off operation, the plug connection between plug sockets 395 and 396 will have been made so as to cause the energization of the relay J and the shifting of its contacts J3—10 (Fig. 22e) so that it will be observed that when the switch arm SB is at the 6 contact making position, the circuit will be extended through the shifted J5 contacts to the 5 plug sockets 390, it being understood that there is a plug connection between such plug socket and the "5" plug socket 423 from the left.

It will be recalled that one of the functions of the rounding off device now being described is to automatically determine the number of quotient digits which must be computed and automatically terminate dividing computations upon the determination of such digits. This is effected by a circuit now to be described in detail. After the sixth quotient digit has been determined and entered in the LQ accumulator and the related multiple subtracted from the RD accumulator, a circuit is completed from the line 301 through cam contacts CC17, through LL3 contacts now closed, the stepping switch arm of the stepping switch SB now at the 6 contact point position, thence through J5 contacts now closed, to the 5 plug socket 390, the plug connection to the 5 plug socket 423 (Fig. 22f) thence through contacts BF5 now in the position shown, through the stepping switch arm SF at the 5 contact point position, thence through BF11 contacts now in the position shown, to the plug socket 407. From Fig. 26, it will be observed that a plug connection is made between the plug socket 407 and the plug socket 389 (Fig. 22e) thereby extending a circuit to the relay coil H to ground. The energization of the relay coil H terminates computing cycles in the manner previously described.

It will be understood that under the control of the rounding off mechanism now being described that the dividing mechanism is controlled to compute the quotient amount to five digits. Six digits were actually computed so that the corrective 5 is entered in the sixth column to correct the fifth quotient order place of the LQ accumulator if the digits 5-9 are standing in the sixth place. In the problem shown in Fig. 33, the last quotient digit is 1 which is added to the last quotient amount on the LQ accumulator, bringing the last order place of the LQ accumulator to represent 6. This, however, will not effect a carry into the next left hand order of the LQ accumulator and therefore no correction is applied in the problem under consideration. Had a carry been effected from the extreme right hand order of the LQ accumulator to the next order to the left of the LQ accumulator, a correction would have been made as would be accomplished in other computing problems.

The quotient amount on the the LQ accumulator is recorded in the usual manner, the particular place of recording being selected for the problem of Fig. 33 by the AAt and Zth relay coils. The stepping of the switch SD (Fig. 22c) to the 6 contact making position causes the energization of the relay coil AZ which shifts its contacts AZI, so that for the sixth order of the LQR readout the common readout segment for this order is disconnected in the manner previously described, and instead line 391 is connected to the plug socket 356 of such column place recording. Line 391, it will be remembered, causes the selection of the "0" interposer magnet 353 to punch a zero in the sixth order of the LQ instead of the 1 therein, which is of no import.

Also the energization of the relay H (Fig. 22e) shifts its contacts H2, so that when CC14 closes, the switch arm release coils 341SB, 341SF are energized concurrently. Thus, the associated switch arms will return to home position prior to the next card controlled computation.

At the top of Fig. 30 there is outlined three different computations which can be carried out by the last described arrangement and which are selected so as to illustrate the varying quotient place recording. The present machine is capable of recording quotient amounts to eight places and such recording is illustrated, it being noted that quotient recording is made with regard to the decimal point which is indicated on the tabulating cards.

The three computations illustrated involve the same digital values except that the denominational magnitudes of the dividend is changed while the denominational magnitude of the divisor remains the same. The shift of quotient recording is evident by a comparison of the three quotient results indicating not only the manner in which the denominational magnitude of the dividend changes the place of quotient recording but also the manner in which the denominational magnitude of the dividend and divisor determines the actual number of quotient digits which are secured and recorded. In the first computation, the quotient digits include the extra computation for the application of the 5 increment for rounding off. The second and third computations are carried out to secure one and two additional places, respectively, for the quotient amount.

The computation is also outlined to indicate how the addition of the increment 5 would cause a carryover to the next quotient order at the left, thereby correcting this order. While in the computations shown the next higher order was not increased by a unit, it would be evident that with other problems, such orders would be augmented, thereby correcting the quotient at the second decimal place which the machine is required to do for the computations which have just been described.

At this time, the explanation of the construction and wiring arrangement of the series of emitters 415 to 422 would be appropriate.

It is well known from mathematical considerations that, in the operation of division, the quotient digits are derived by determining the number of times that the divisor is contained in the dividend and the number of quotient digits will, obviously, depend upon the denominational magnitude of the dividend and divisor. For example, with a four-digit dividend and a two-digit divisor, three quotient digits will be obtained, with the dividend being entirely consumed in the dividing operation. As a general rule, it may be stated that the number of quotient digits that can be obtained with the full consumption of the dividend is equal to the number of dividend places minus the number of divisor places plus 1.

In the automatic place limiting mechanism described in this section of the specification, it was assumed that the dividing operation would be carried out to secure two decimal places and for illustrative purposes, the commutators 415 to 422 inclusive, are designed so as to carry out the dividing operation to two decimal places with the wiring of Fig. 22g, although it will be obvious that, by rearrangement of wiring, different numbers of quotient digits may be secured either to the left or right of the decimal point, depending upon the particular wire connections made from the contact points of the emitter and the lines leading to the W4 contacts. At the top of the commutators, there is shown in Fig. 22g the particular emitter which is selected in accordance with the number of zeros at the left of the dividend amount, and aside of the W4 contacts, there is designated the particular contacts which are effective according to the number of zeros at the left of the divisor. Therefore, with dividend and divisor amounts of varying magnitude, it will be easily determined which particular emitter, 415 to 422, will be selected for operation for different problems. In the problem assumed, four zeros appeared at the left in the dividend, thereby selecting the commutator 418 and since there were two zeros in the divisor amount at the left, the Wt4 contacts would be effective, thereby selecting the "5" contact point of the emitter 418. Now, applying the general rule to the problem (8—4+1), with a four-digit dividend and a two-digit divisor, the machine would continue to obtain three quotient digits, thereby consuming the complete dividend. It is to be understood, however, that five digits are secured, and for this the switch SF is positioned to the "5" contact making position and this is obtained by the wiring made from the emitter 418. The numerical position of the switch SF will be in correspondence with the number of quotient digits to be obtained.

It is, therefore, understood that the wiring from commutators 415 to 422 is so selected that the dividing machine will go through a number of dividing operations to obtain quotient digits which are greater in number than those which would be normally obtained in the complete utilization of the dividend amount and in this particular case, two additional decimal places.

The effective action of the emitters upon the position of the switch SF can be altered so as to cause the position of the switch SF at a position less or greater than that which would be normally exercised by the emitters 415 to 422, inclusive. Thereby, the machine may selectively compute to a less or greater number of quotient places.

The emitters 415—422 can be rewired for securing quotient digits to more or less decimal places, or to whole units, tens, etc. The number of digits obtained corresponds to the numerical position of the switch SF and the position of the switch for selected numbers of quotient digits is fixed according to the following law:

Number of quotient digits or numerical position of switch SF=Number of dividend digits—Number of divisor digits+1±K where K=2 for two decimals
K=3 for three decimals
K=1 for one decimal
K=0 for units
K=1 for tens Using the problem of Fig. 33, there is represented in the above law: 4—2+1+2=5 quotient digits or position of switch SF. Hence, the "5" contact point of the 418 emitter is effective. If three decimals are desired, the position of switch SF is to be 6. Hence, the "6" contact point of the 418 emitter is effective and would be wired.

For units, switch SF would go to the "3" position, thereby terminating digit computing earlier and the "3" contact point of emitter 418 would be wired.

*Division computations controlled by records having recorded thereon quotient digits secured to three decimal places with the final decimal place rounded off*

Computations described in the above heading will cause the computation of the quotient amount when it is fixed to three decimal places and a correction at the final decimal place. If the quotient amounts represent money in the U. S. monetary system, the correction, of course, will be applied to the nearest mill.

The securing of the quotient digit in the additional decimal place is effected by enabling the machine to go through an additional quotient digit determining and entry operation. Observing problem No. 1 in Fig. 30, it will be noted that the machine goes through six quotient computing operations. Five of these are automatically effected in sequence as determined by the initial position of the switch SF in Fig. 22f. The position of this switch, it will be recalled, being determined by the denominational magnitude of the dividend and the divisor. An additional computing cycle is controlled by the relay J (Fig. 22e), which is energized to shift its contacts upon the application of the rounding off feature. Therefore, with problem No. 1 in Fig. 30, six quotient digit computing operations are utilized. Problem No. 4 indicates a card having the same divisor and dividend with respect to denominational magnitude but the machine is adjusted and conditioned to secure a quotient digit for one additional decimal place over that shown in problem No. 1. In problem No. 4, five quotient digit computing operations are determined by the position of the switch SF (Fig. 22f) which is adjusted in the manner previously described, and also as previously outlined, the relay J being energized will shift its contacts so as to condition the machine for an additional computing operation. However, by special plug connections, which arrangement is preferably for securing the result, although an alternative arrangement will be described, the machine may go through still an additional computing operation, causing for the problem of No. 4 a sequence of seven quotient computing and digit entering operations. This will enable the machine to compute an additional decimal place which is rounded off in the manner previously described and the correction applied if found to be necessary.

For the problem in No. 1, the plugging connections are made as shown in Fig. 26, and with respect to the plug sockets 390 and 423, it will be noted that plug connections are made between plug sockets having corresponding numeral designations. That is to say, "1" plug socket 390 is plug connected to the "1" plug socket 423, the plug sockets No. 2 of each being interconnected, plug sockets No. 3 of each being interconnected, etc. In contrast to these plug connections, the plug connections for the problem of No. 4 are made as outlined in Fig. 25, it being noted that the plug connections between the plug sockets 423 and 390 are jumped by one socket. That is to say, the "1" plug socket 423 is now connected to the "2" plug socket 390, etc., for the series. The effect of these plug connections is to enable the machine to go through an additional computing cycle. Obviously, with the switch SF (Fig. 22f) at the 5 position, the circuit will be completed at this point to the "5" plug socket 423 and by the plug connection shown in Fig. 25, the circuit will be extended to the "6" plug socket 390 and since relay J is now energized, the circuit will be extended through the J6 contacts, now shifted, to the seventh contact point of the switch SB. The machine will, therefore, go through seven quotient digit computing and entering cycles.

Figure 25:
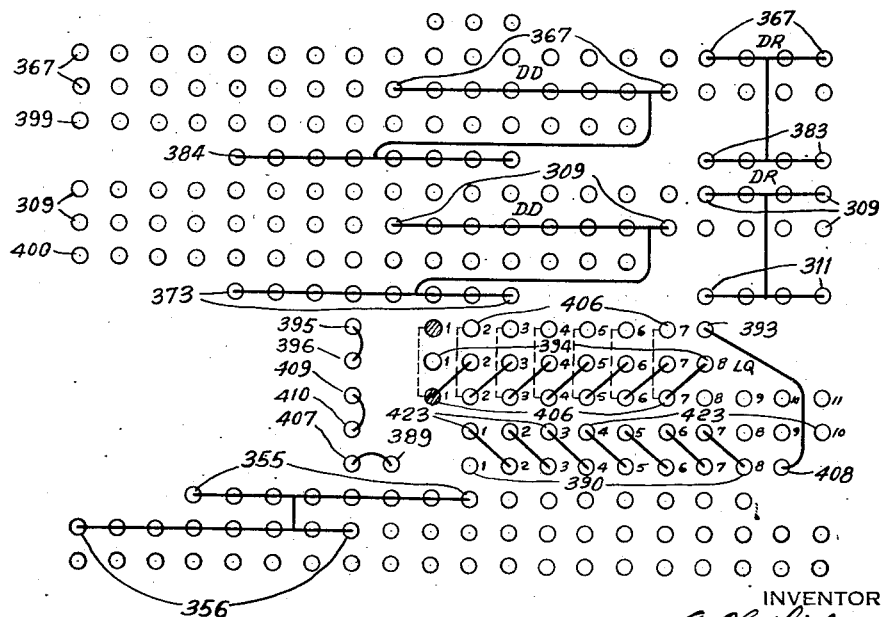

Since an additional computing cycle is now made, the addition of the 5 for rounding off will necessarily be made in the order of the LQ accumulator which corresponds to the fourth decimal place. It is for this reason that the diagonal plug connections are made between the plug sockets 406 and 394 as shown in Fig. 25. The 5 digit representing impulse will now be transmitted by the switch SF which is at the 5 digit representing position for the problem adopted and thence to the order of the LQ accumulator, one order to the right over that in which it would be normally entered. With the exception of the diagonal plugging connections made as shown in Fig. 25, the other plug connections are substantially the same as shown in Fig. 26 and the machine will operate in precisely the same manner.

*Division computations controlled by records having recorded thereon quotient digits secured to the nearest unit with the units order digit rounded off*

The computation described in the above heading will cause the computation to be carried out to the nearest unit and if the quotient amounts represent money in the decimal monetary system, the computation will be carried out to dollars. If so desired, the rounding off feature may be applied for this order and will, therefore, correct the quotient amount to the nearest dollar.

In Fig. 30, problems Nos. 6 and 7 show two types of computations carried out in this manner. Fig. 27 illustrates the necessary plug connections for operating the machine to secure this result.

It will be noted for this type of computation that the plug connections between the plug sockets 394 and 406 and between the plug sockets 423 and 390 are in Fig. 27 made differently from the plug connections shown for the computations for which the plugboards shown in Figs. 25 and 26 are utilized. From Fig. 27, it will be noted that the plug connections are made between the plug sockets 390 and 423 in the pairs 1—3, 2—4, 3—5, etc., it being observed that by this particular plugging arrangement, two plug sockets of the series 423 are skipped. This particular plug connection will have the effect of decreasing the normal number of quotient computing and quotient digit entry cycles by 2. With the problem outlined in Fig. 33 and the plug connection shown in the plugboard of Fig. 26, it will be recalled from the previous description that the stepping switch SF was stepped to the 5 contact making position, thereby extending the circuit to the 5 contact point 423. When a card representing the values shown in Fig. 33 is passed through the machine with the machine plugged according to Fig. 27, it will be noted that with the specific plug connection between the "5" plug socket 423 and the "3" plug socket 390, the circuit will be extended to the last mentioned socket. Thereupon, when the machine has computed three quotient digits, the machine will terminate its computing operations in the event that the rounding off mechanism was not utilized. If the rounding off mechanism was utilized, the plug connections would be made between the plug sockets 395 and 396 which would energize the relay J and shift the J3—10 contacts. As has been repeatedly stated, this will, in effect, cause the machine to go through an additional quotient digit determining and entry cycle. In the problem designated No. 6 in Fig. 30, this has been assumed and therefore the machine will terminate its computing operations when four digits have been obtained. By comparison of the problem No. 6 with the problem No. 1 in Fig. 30, it will be seen that the plug connections shown in Fig. 27 will decrease the number of computing operations by 2 and accordingly, two less quotient digits will be obtained than is obtained in the problem No. 1 when the plugboard of Fig. 26 is utilized.

In order to secure the entry of the 5 increment in the proper denominational place of the LQ accumulator, the diagonal plug connections are made as shown in Fig. 27 between the plug sockets 394 and 406. This will cause the entry of the 5 increment in an order two to the left than would be normally obtained by the plugging connections shown in Fig. 26.

Summarizing, therefore, the denominational magnitude of the dividend and the divisor determines the number of digits which can be obtained, and by the special plug connections, two less digits will be secured. The quotient digits will be recorded, properly denominated, that is, recorded with respect to the decimal point as is outlined in the problems Nos. 6 and 7 of Fig. 30.

*Division computations controlled by records having recorded thereon quotient digits always secured to the first decimal place*

This is not illustrated because the change necessary would be obvious in view of the preceding description, particularly Fig. 27.

The plug connections for the above would be made for the pairs of sockets 390 and 423 between the "1" socket 390, the "2" socket 423, and in pairs 2—3, 3—4, 4—5, etc. This will have the effect of causing the dividing mechanism to carry out division to an additional quotient digit over the Fig. 27 arrangement, or to the first decimal place.

The diagonal plug connections would also be made according to Fig. 27 but only one plug socket 406 would be skipped. This is provided for when rounding off operations are desired for the dimes, or first decimal place.

Hence for obtaining quotient digits to always the same place, plugging connections can be altered to secure this for the dollars, dimes, cents and mills, all utilizing the emitters 415—422 wired as shown in Fig. 22g.

*Modification of means for selectively varying effect of emitters 415 to 422 to determine extent of quotient digit computations*

There was previously described the construction of the emitters 415 to 422 and it will be recalled that it was stated that such emitters were wired so as to carry out computations to two decimal places when the emitter 306a is utilized.

There was also described the manner in which the wiring from the emitters or the plugging may be altered so as to carry out quotient digit computations to more or less number of places. It is to be understood, however, that the emitters are fixed in the machine so that changes in wiring would not be desirable or practical. For this reason, it is preferable to retain the plugging of Fig. 26 and apply a selective control in which the varying effect of the emitters upon the position of the switch SF may be conveniently controlled and determined by the operator by a simple manual adjustment. This will vary the number of quotient digits which are computed and the present arrangement is simpler than the arrangement which involves the change in plug connections as shown in the plug boards of Figs. 25 and 27.

To this end, the machine is provided with three supplemental emitters 306b, 306c and 306d (see Fig. 22g), the timing of these emitters being shown in Fig. 19. Considering the change in the emitter 306b over the emitter 306a, it will be noted that it is provided with an additional contact point which enables an additional impulse to be transmitted and therefore cause the switch SF to be moved to an additional position. This will enable the dividing mechanism to go through an additional quotient digit computing operation over that enabled by the emitter 306a and since the latter is provided for carrying out computations to two decimal places, the selection of the emitter 306b by means of the switch S will cause the computation of an additional quotient digit or carried out to three decimal places.

The emitters 306c and 306d are provided with fewer impulse contact points than is provided for emitter 306a so that by the selection of the emitter 306c, one less impulse will be transmitted than that which would be transmitted by the emitter 306a so that the switch SF will be moved to a position one step less. The quotient digit computations will then be decreased by one, thereby carrying the computation to one decimal place. The emitter 306d will, by reason of its construction, carry out the computation decreased by still one, thereby enabling the computation to be carried out to the nearest units position.

*Computations controlled by records having the number of quotient digits and place of recording automatically determined by the denominational magnitude of DD and DR*

A feature of the present application is the capability of the machine of effecting division computations controlled by records in which the number of quotient digits recorded thereon and place of quotient recording are automatically determined by the denominational magnitude of the dividend and divisor, the recording being effected at decimal places for each quotient number.

Various forms of quotient recordings carried out in the last described manner are shown in Fig. 31.

The plugging which is necessary for causing the automatic determination of the number of quotient digits which are to be secured is shown by way of example in Fig. 28 with particular reference to the plug connections between the plug sockets 409 and 410, 407 and 389 and the series of plug connections between the plug sockets 390 and 423.

With the machine now plugged up for regular dividing operations, such operations will be carried out in the manner previously described and by comparisons of the multiples of the divisor with successive comparison portions of the dividend, the quotient digits will be determined and entered in the LQ accumulator. Considering the dividend and divisor amount in the top problem of Fig. 31, it will be noted that six quotient digits 0608.71 are secured and the number of quotient digits is determined by the V and W relays which are selectively energized in accordance with the denominational magnitude of the DD and DR. The selective energization of these relays, as previously described, is dependent upon the entry shift of the dividend and the divisor. This problem was previously considered and it will be recalled that due to the entry shift, V$ht$ and W$h$ relays are energized and such relays will close their related contacts. In Fig. 22g the V$ht4$ relay contacts will be closed and also the W$h4$ contacts will also be closed and with these relay contacts closed, there will be an automatic termination of the computing operations on securing the predetermined number of digits. In this problem, emitter 420 will be effective and assuming emitter 306a is used, the switch SF (Fig. 22f) will, accordingly, be given six steps of movement and due to the plug connection between the "6" plug socket 423 and the "6" plug socket 390, a circuit will be closed upon securing and entering the sixth quotient digit as follows: from the line 301, cam contacts CC17, LL3 relay contacts now closed, the switch arm SB at the "6" contact point position, through the relay contacts J8 now in the position shown, to the "6" plug socket 390, thence by the plug connection to the "6" plug socket 423 to the BF6 contacts now in the position shown, through the switch arm SF now at the "6" contact position, thence through the BF11 contacts now in the position shown, to the plug socket 407, thence by the plug connection between the plug socket 407 and plug socket 389 to the relay H, thence to the ground. It will be recalled that the energization of the relay H terminates computing operations.

With regard to quotient recording, the Z$ht$ and AA$h$ relays are energized and in accordance with their energization, their relay contacts 1—15 (Fig. 22h) will be closed so as to determine the place of recording under control of the LQR readout.

By the selection of emitters 306a, 306b, 306c, 306d, as previously described, the number of decimal places for the computation may be selected.

In the intermediate problem of Fig. 31, it will be noted that the dividend and divisor values are of different magnitudes than for the computation shown at the top. Therefore, in accordance with the selective energization of the AA and Z relays, a fewer number of quotient digits will be obtained. The quotient recording is also shown for this computation. The bottom example in Fig. 31 also shows another computation in which the size of the dividend is still different, thereby differently controlling the extent of digit computations and the place of recording.

Summarizing by means of the automatic place limiting device, the machine will effect computations under control of a series of cards and in accordance with the sizes of the dividend and divisor values, and the selected emitter 306, a predetermined number of quotient digits will be secured to the left or right of the decimal point. Each quotient amount will also be recorded with relation to the decimal point.

While there has been shown and described and pointed out the fundamental novel features of the invention as applied to various modifications, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine for performing division, the combination of a plurality of means for representing denominational magnitudes of divisor and dividend, respectively, and a device shiftable to different digital positions for limiting according to its position the number of quotient digits that are derived, means for causing the shifting of said device to different digital positions, said means including a plurality of control means having progressively different ranges, means controlled by the dividend magnitude representing means for selecting a control means with a higher range with an increase in denominational magnitude of the dividend, and means controlled by the divisor magnitude representing means for determining the particular digital position within the range of the selected control means to which said device is to be shifted and for causing shift to decreasing digit positions of the range with a corresponding increase in denominational magnitude of the divisor.

2. A dividing machine according to claim 1 in which the means for causing the shifting of said device comprises further a plurality of selectively operable means for selectively effecting the shifting of said device to higher or lower digital positions than that determined by a selected control means, to thereby respectively increase or decrease the number of quotient digits that may be computed.

3. In a dividing machine having dividing mechanism for the automatic operation of dividend and divisor amounts and including means for registering the number of quotient digits derived, the combination of a plurality of means for representing denominational magnitudes of divisor and dividend respectively, and a device shiftable to different digital positions for limiting according to its position the number of quotient digits that are derived, means for causing the shifting of said device to different digital positions, said means including a plurality of control means having progressively different ranges, means controlled by the dividend magnitude representing means for selecting a control means with a higher range with an increase in denominational magnitude of the dividend, means controlled by the divisor magnitude representing means for determining the particular digital position within the range of the selected control means to which said device is to be shifted and for causing shift to decreasing digit positions of the range with a corresponding increase in denominational magnitude of the divisor, and means under conjoint control of the registering means and the shiftable device for terminating dividing operations.

4. In a calculating machine having dividing mechanism for the automatic operation of division of dividend and divisor amounts and including elements of a denominationally ordered quotient digit receiving means, the combination of rounding off means including a "5" entry means, a plurality of means for representing denominational magnitudes of divisor and dividend respectively, and a device shiftable to different digital positions for limiting according to its position the number of quotient digits that are derived, means for causing the shifting of said device to different digital positions, said means including a plurality of control means having progressively different ranges, means controlled by the dividend magnitude representing means for selecting a control means with a higher range with an increase in denominational magnitude of the dividend, means controlled by the divisor magnitude representing means for determining the particular digital position within the range of the selected control means to which said device is to be shifted and for causing shift to decreasing digit positions of the range with a corresponding increase in denominational magnitude of the divisor, means controlled by said shiftable device for connecting according to its position a particular order element of the quotient receiving means with said "5" entry means, and means for delaying the effectiveness of said device to limit the number of quotient digits that are to be derived until an additional quotient digit is derived and which is entered in the order element of the quotient receiving means receiving the "5" entry.

5. In a dividing machine having dividing mechanism for the automatic operation of dividend and divisor amounts and including means for registering the number of quotient digits derived, and control means for terminating the dividing operations of said dividing mechanism, the combination of a plurality of means for representing denominational magnitudes of divisor and dividend respectively, and a device shiftable to different digital positions for limiting according to its position the number of quotient digits that are derived, means for causing the shifting of said device to different digital positions, said means including a plurality of control means having progressively different ranges, means controlled by the dividend magnitude representing means for selecting a control means with a higher range with an increase in denominational magnitude of the dividend, means controlled by the divisor magnitude representing means for determining the particular digital position within the range of the selected control means to which said device is to be shifted and for causing shift to decreasing digit positions of the range with a corresponding increase in denominational magnitude of the divisor, and means under conjoint control of the registering means and the shiftable device for causing the operation of the control means for terminating dividing operations.

6. In a record controlled dividing machine having dividing mechanism for the automatic operation of division of dividend and divisor amounts and including means for registering the number of quotient digits derived, and control means for terminating dividing operations, the combination of means for sensing divisor and dividend designations on the record, a plurality of sets of devices, one in each set for each denominational order of the divisor and dividend, means for setting up the aforesaid sets of devices under control of said sensing means to represent the denominational magnitude of the dividend and divisor amounts on the record, a variably positioned device for limiting the number of quotient digits derived, a plurality of emitters, each having a plurality of contact points for controlling the transmission of digit representing impulses representative of digits within a certain range, means under control of the dividend representing devices for effecting the selection of said emitters for controlling the transmission of digit impulses increasing in value with the denominational magnitude of the dividend, means under control of the divisor representing device for causing the selection of the contact points of a selected emitter for controlling the transmission of a digit impulse of the range decreasing in value with an increase in denominational magnitude of the divisor, and means for causing said limiting device to be positioned according to the value of the impulse transmitted.

7. A dividing machine according to claim 6 in which said last named means includes a plurality of selectable impulse emitting means for causing the limiting device to be positioned according to the value of the impulse transmitted under control of the selected emitter or for selectively causing the limiting device to be positioned to digit representing positions increased over or decreased from the digit position determined by a selected emitter, whereby the quotient digits derived may be increased or decreased.

8. In a record controlled dividing machine having dividing mechanism for the automatic operation of dividend and divisor amounts on a record and including means for deriving successive quotient digits and control means to terminate dividing operations when a predetermined number of quotient digits have been derived, the combination of a settable switch lever successively advanced step by step to make successive contact with its coordinated contact points as the successive quotient digits are derived, a supplemental switch lever set preliminary to the termination of dividing operations to a differential position to make contact with one of its coordinated contact points representing the number of quotient digits to be derived, sensing and detecting means to detect the denominational magnitude of the dividend and divisor on the record, means controlled by the sensing and detecting means for representing the denominational magnitude of the dividend and divisor amounts, means under control of the representing means for positioning the supplemental switch lever to a position to limit the number of quotient digits derived to a number dependent upon the difference in the denominational magnitude of the dividend and divisor amounts, and multiple plug connections between the contact points of one switch lever and the contact points of the other switch lever, said multiple plug connections being variably made to connect at will non-corresponding contact points of both switches whereby the supplemental switch lever is ineffective when in contact with a contact point representing the number of quotient digits to be derived to terminate dividing operations until the first named switch lever is in contact with a related contact point having a plug connection to the contact point of the supplemental switch lever representing the number of quotient digits to be derived, a circuit then being completed through said first named switch lever, its contact point, the related plug connection interconnected with the contact point of the supplemental switch lever, to said control means to cause the latter to terminate dividing operations.

9. In a dividing machine having dividing mechanism for the automatic operation of dividend and divisor amounts and including means for registering the number of quotient digits derived and entered in a quotient receiving means, and control means for terminating the dividing operations of said dividing mechanism, the combination of a plurality of means for representing denominational magnitudes of divisor and dividend respectively, and a device shiftable to different digital positions and operable with said registering means for limiting according to its position the number of quotient digits that are derived, means for causing the shifting of said device to different digital positions, said means including a plurality of control means having progressively different ranges, means controlled by the dividend magnitude representing means for selecting a control means with a higher range with an increase in denominational magnitude of the dividend, means controlled by the divisor magnitude representing means for determining the particular digital position within the range of the selected control means to which said device is to be shifted and for causing shift to decreasing digit positions of the range with a corresponding increase in denominational magnitude of the divisor, means for delaying the effectiveness of said registering means and said device to limit the number of quotient digits that are derived until an additional quotient digit is derived which is entered in a successive order of the quotient receiving means, and means under conjoint control of the registering means, said delaying means, and the shiftable device for causing the operation of the control means for terminating dividing operations.

10. In a record controlled dividing machine having dividing mechanism for the automatic operation of dividend and divisor amounts on a record and including a denominationally ordered quotient receiving means, control means for terminating dividing operations, means for registering the number of quotient digits derived, a variably positioned device for limiting the number of quotient digits derived, and means under control of said device and said registering means for causing the operation of the control means to terminate dividing operations of said dividing mechanism when a predetermined number of quotient digits are derived, the combination of a "5" entry means, means for sensing and detecting divisor and dividend representing designations on a record, a plurality of sets of devices, one in each set for each denominational order of the divisor and dividend, means for setting up the aforesaid devices to represent the denominational magnitude of the dividend and divisor amounts on a record, means under control of said representing devices for positioning said variably positioned device to a digit position dependent upon the difference in denominational magnitude of the dividend and divisor amounts, means controlled by said quotient limiting device for connecting a particular order element of the quotient receiving means with said "5" entry means, and means for delaying the effectiveness of said registering means on said control means until an additional quotient digit is derived and which is entered in the order element of the quotient receiving means receiving the "5" entry.

11. In a record controlled dividing machine having dividing mechanism for the automatic operation of division of dividend and divisor amounts and including means for registering the number of quotient digits derived, and control means for terminating dividing operations, the combination of means for sensing divisor and dividend designations on the record, a plurality of sets of devices, one in each set for each denominational order of the divisor and dividend, means for setting up the aforesaid sets of devices under control of said sensing means to represent the denominational magnitude of the dividend and divisor amounts on the record, a variably positioned device for limiting the number of quotient digits derived, a plurality of emitters for controlling by a selected contact point thereof the transmission of an impulse representative of a number within a certain range, means under control of the representing devices for causing by selection of an emitter said impulse to represent a greater number with increase in denominational magnitude of dividend, means under control of the representing devices for causing, by selection of a contact point of a selected emitter, said impulse to represent a less value with increase in denominational magnitude of divisor, means for causing the limiting device to be positioned according to the value of the impulse transmitted, and means under conjoint control of the registering means and the limiting device for terminating dividing operations.

12. In a record controlled machine for performing division, the combination with a plurality of means for representing denominational magnitudes of divisor and dividend respectively and a device shiftable to different digital positions for limiting according to its position the number of quotient digits that are derived, of a plurality of cyclically operable and selectively effective control means having progressively different ranges within which they may be active in a cycle, means responsive to a selected control means to cause said device to be shifted according to the point in the cycle at which the selected control means is active, means controlled by the dividend magnitude representing means for selecting a control means with a higher range with increase in denominational magnitude of dividend, and means controlled by the divisor magnitude representing means for causing a selected control means to be active at lower positions of its range with increase in denominational magnitude of the divisor.

ARTHUR H. DICKINSON.